(12) United States Patent
Suitoh

(10) Patent No.: US 10,970,828 B2
(45) Date of Patent: Apr. 6, 2021

(54) IMAGE PROCESSING APPARATUS, IMAGE PROCESSING SYSTEM, IMAGE PROCESSING METHOD, AND RECORDING MEDIUM

(71) Applicant: Hiroshi Suitoh, Kanagawa (JP)

(72) Inventor: Hiroshi Suitoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/701,219

(22) Filed: Dec. 3, 2019

(65) Prior Publication Data

US 2020/0202500 A1    Jun. 25, 2020

(30) Foreign Application Priority Data

Dec. 21, 2018  (JP) .............................. JP2018-239569
Jun. 3, 2019   (JP) .............................. JP2019-103545

(51) Int. Cl.
| G06T 5/00 | (2006.01) |
| G06T 11/00 | (2006.01) |
| G06T 7/00 | (2017.01) |
| G06T 7/90 | (2017.01) |

(52) U.S. Cl.
CPC ............... *G06T 5/009* (2013.01); *G06T 7/90* (2017.01); *G06T 7/97* (2017.01); *G06T 11/001* (2013.01); *G06T 2207/10024* (2013.01)

(58) Field of Classification Search
CPC .. G06T 5/009; G06T 7/97; G06T 7/90; G06T 11/001
See application file for complete search history.

(56) References Cited

U.S. PATENT DOCUMENTS

| 2005/0180629 A1* | 8/2005 | Masuno | G06T 5/40 |
| | | | 382/169 |
| 2006/0038748 A1* | 2/2006 | Chiu | G09G 3/288 |
| | | | 345/60 |
| 2006/0045377 A1* | 3/2006 | Kawai | G06T 5/009 |
| | | | 382/274 |
| 2006/0268180 A1* | 11/2006 | Chou | H04N 5/58 |
| | | | 348/673 |

(Continued)

FOREIGN PATENT DOCUMENTS

| JP | 2010-268430 | 11/2010 |
| JP | 2013-042463 | 2/2013 |

*Primary Examiner* — Sarah Lhymn
(74) *Attorney, Agent, or Firm* — Oblon, McClelland, Maier & Neustadt, L.L.P.

(57) ABSTRACT

An image processing apparatus includes circuitry configured to: acquire a plurality of pieces of image data; determine, for each of the plurality of pieces of image data, a first representative color indicating a feature of a color representative of the image data, based on pixel values of the image data; calculate, based on the determined first representative color of the plurality of pieces of image data, a second representative color indicating a feature of a color representative of the plurality of pieces of image data; calculate, based on the first representative color and the second representative color of image data to be corrected, a correction parameter for color correction of the image data to be corrected among the plurality of pieces of image data; and perform the color correction on the image data to be corrected using the calculated correction parameter.

7 Claims, 37 Drawing Sheets

(56) References Cited

U.S. PATENT DOCUMENTS

| | | | |
|---|---|---|---|
| 2007/0047803 A1* | 3/2007 | Nikkanen | H04N 1/6027 382/162 |
| 2008/0055476 A1* | 3/2008 | Shehata | H04N 9/643 348/603 |
| 2010/0020205 A1* | 1/2010 | Ishida | H04N 9/045 348/241 |
| 2015/0326742 A1* | 11/2015 | Ogino | H04N 1/00453 358/1.13 |
| 2017/0032539 A1* | 2/2017 | Kuramoto | A61B 1/043 |
| 2019/0311694 A1* | 10/2019 | Van Mourik | H04N 19/85 |
| 2020/0357100 A1* | 11/2020 | Tichelaar | G06T 5/009 |

* cited by examiner

FIG. 9

| IMAGE ID | CLUSTER No. | NUMBER OF PIXELS | CLUSTER CENTRAL PIXEL | | |
|---|---|---|---|---|---|
| | | | R | G | B |
| P01 | 1 | 53480 | 109 | 107 | 100 |
| | 2 | 12243 | 86 | 66 | 52 |
| | 3 | 8933 | 135 | 156 | 166 |
| | 4 | 5344 | 194 | 236 | 247 |
| P02 | 1 | 48812 | 118 | 108 | 96 |
| | 2 | 20465 | 142 | 144 | 153 |
| | 3 | 7909 | 111 | 94 | 58 |
| | 4 | 2814 | 188 | 214 | 229 |
| P03 | 1 | 10849 | 111 | 94 | 58 |
| | 2 | 30836 | 142 | 133 | 110 |
| | 3 | 37888 | 127 | 115 | 86 |
| | 4 | 427 | 197 | 199 | 197 |
| P04 | 1 | 25078 | 133 | 145 | 153 |
| | 2 | 43478 | 115 | 110 | 102 |
| | 3 | 9293 | 108 | 72 | 51 |
| | 4 | 2151 | 199 | 226 | 240 |

FIG. 10

| CLUSTER No. | CLUSTER CENTRAL PIXEL | | | IMAGE ID |
|---|---|---|---|---|
| | R | G | B | |
| 1 | 114 | 108 | 99 | P01, P02, P04 |
| 2 | 127 | 115 | 86 | P03 |

FIG. 11

| IMAGE ID | REPRESENTATIVE COLOR | | | GENERAL REPRESENTATIVE COLOR | | | CORRECTION PARAMETER | | |
|---|---|---|---|---|---|---|---|---|---|
| | R | G | B | R | G | B | R | G | B |
| P01 | 109 | 107 | 100 | 114 | 108 | 99 | 1.046 | 1.009 | 0.990 |
| P02 | 118 | 108 | 96 | | | | 0.966 | 1.000 | 1.031 |
| P03 | 127 | 115 | 86 | | | | 0.898 | 0.939 | 1.151 |
| P04 | 115 | 110 | 102 | | | | 0.991 | 0.982 | 0.970 |

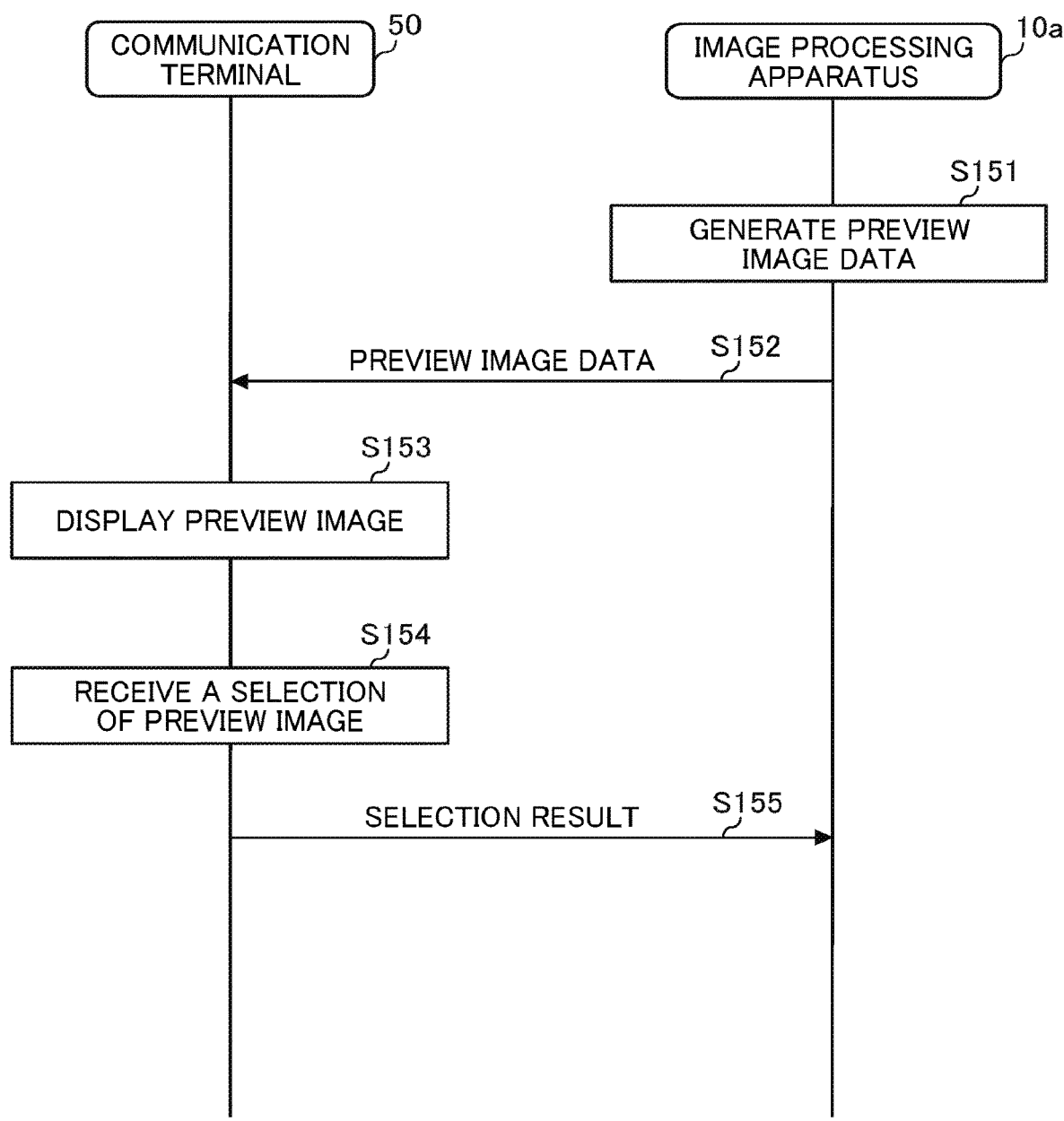

FIG. 23

| IMAGE ID | CLUSTER NO. | NUMBER OF PIXELS | CLUSTER CENTRAL PIXEL | | | LUMINANCE VALUE | REPRESENTATIVE LUMINANCE VALUE |
|---|---|---|---|---|---|---|---|
| | | | R | G | B | | |
| P01 | 1 | 53480 | 109 | 107 | 100 | 109.8 | 117.31771 |
| | 2 | 12243 | 86 | 66 | 52 | 71.944 | |
| | 3 | 8933 | 135 | 156 | 166 | 155.84 | |
| | 4 | 5344 | 194 | 236 | 247 | 232.11 | |
| P02 | 1 | 48812 | 118 | 108 | 96 | 112.5 | 120.62131 |
| | 2 | 20465 | 142 | 144 | 153 | 145.73 | |
| | 3 | 7909 | 111 | 94 | 58 | 72.253 | |
| | 4 | 2814 | 188 | 214 | 229 | 214.81 | |
| P03 | 1 | 37888 | 127 | 115 | 86 | 109.8 | 122.58848 |
| | 2 | 30836 | 142 | 133 | 110 | 71.944 | |
| | 3 | 10849 | 111 | 94 | 58 | 155.84 | |
| | 4 | 427 | 197 | 199 | 197 | 232.11 | |
| P04 | 1 | 43478 | 115 | 110 | 102 | 112.5 | 123.42572 |
| | 2 | 25078 | 133 | 145 | 153 | 145.73 | |
| | 3 | 9293 | 108 | 72 | 51 | 72.253 | |
| | 4 | 2151 | 199 | 226 | 240 | 214.81 | |

FIG. 28

| CLUSTER NO. | CLUSTER CENTRAL LUMINANCE | IMAGE ID |
|---|---|---|
| 1 | 117. 31771 | P01 |
| 2 | 122. 58848 | P02, P03, P04 |

FIG. 29

| IMAGE ID | REPRESENTATIVE LUMINANCE VALUE | GENERAL REPRESENTATIVE LUMINANCE VALUE |
|---|---|---|
| P01 | 117.31771 | 122. 58848 |
| P02 | 120.62131 | |
| P03 | 122.58848 | |
| P04 | 123.42572 | |

IMAGE PROCESSING APPARATUS, IMAGE PROCESSING SYSTEM, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2018-239569, filed on Dec. 21, 2018 and Japanese Patent Application No. 2019-103545, filed on Jun. 3, 2019, in the Japan Patent Office, the entire disclosure of which are hereby incorporated by reference herein.

BACKGROUND

Technical Field

The present disclosure relates to an image processing apparatus, an image processing system, an image processing method, and a recording medium storing program.

Related Art

In recent years, real estate preview services have been provided that allow a user to preview an apartment or the like on his/her PC without going to the site. With such a service, by capturing images of each room, joining and displaying multiple captured images while switching the viewpoint, the user can obtain a virtual experience as if the user were looking around the rooms.

Further, in such a service, it is desirable to make the brightness and color-tone of the images to be displayed uniform so as to display the images without making the user (the viewer) feel uncomfortable.

SUMMARY

In one aspect of this disclosure, there is provided image processing apparatus comprising circuitry configured to: acquire a plurality of pieces of image data; determine, for each of the plurality of pieces of image data, a first representative color indicating a feature of a color representative of the image data, based on pixel values of the image data; calculate, based on the determined first representative color of the plurality of pieces of image data, a second representative color indicating a feature of a color representative of the plurality of pieces of image data; calculate, based on the first representative color and the second representative color of image data to be corrected, a correction parameter for color correction of the image data to be corrected among the plurality of pieces of image data; and perform the color correction on the image data to be corrected using the calculated correction parameter.

In another aspect of this disclosure, there is provided an improved image processing method including: acquiring a plurality of pieces of image data; determining, for each of the plurality of pieces of image data, a first representative color indicating a feature of the image data, based on pixel values of the image data; calculating, based on the determined first representative color of the plurality of pieces of image data, a second representative color indicating a feature of a color representative of the plurality of pieces of image data; calculating, based on the first representative color and the second representative color of image data to be corrected, a correction parameter for color correction of the image data to be corrected among the plurality of pieces of image data; and performing the color correction on the image data to be corrected using the calculated correction parameter.

In still another aspect of this disclosure, there is provided an image processing apparatus including circuitry configured to: classify pixels of image data into clusters; calculate, for each of the clusters, a representative pixel value indicating a feature of a color representative of the cluster; determine a first representative luminance value indicating luminance characteristics representative of the image data based on the representative pixel value of each of the clusters; and calculate a correction parameter for brightness correction of the image data using the determined first representative luminance value; and perform the brightness correction on the image data using the calculated brightness correction parameter.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 is an example of a representative-color management table according to the first embodiment;

FIG. 10 is an example of a general-representative-color management table according to the first embodiment;

FIG. 11 is an example of a correction-parameter management table according to the first embodiment;

FIG. 19 is a sequence diagram of an example of the process of selecting a preview image in the communication terminal according to the first embodiment;

FIG. 23 is an example of a representative luminance value management table according to the second embodiment;

FIG. 28 is an example of a general representative luminance value management table according to a first modification of the second embodiment;

FIG. 29 is an example of a correction-parameter management table according to the first modification of the first embodiment;

Figure 1:
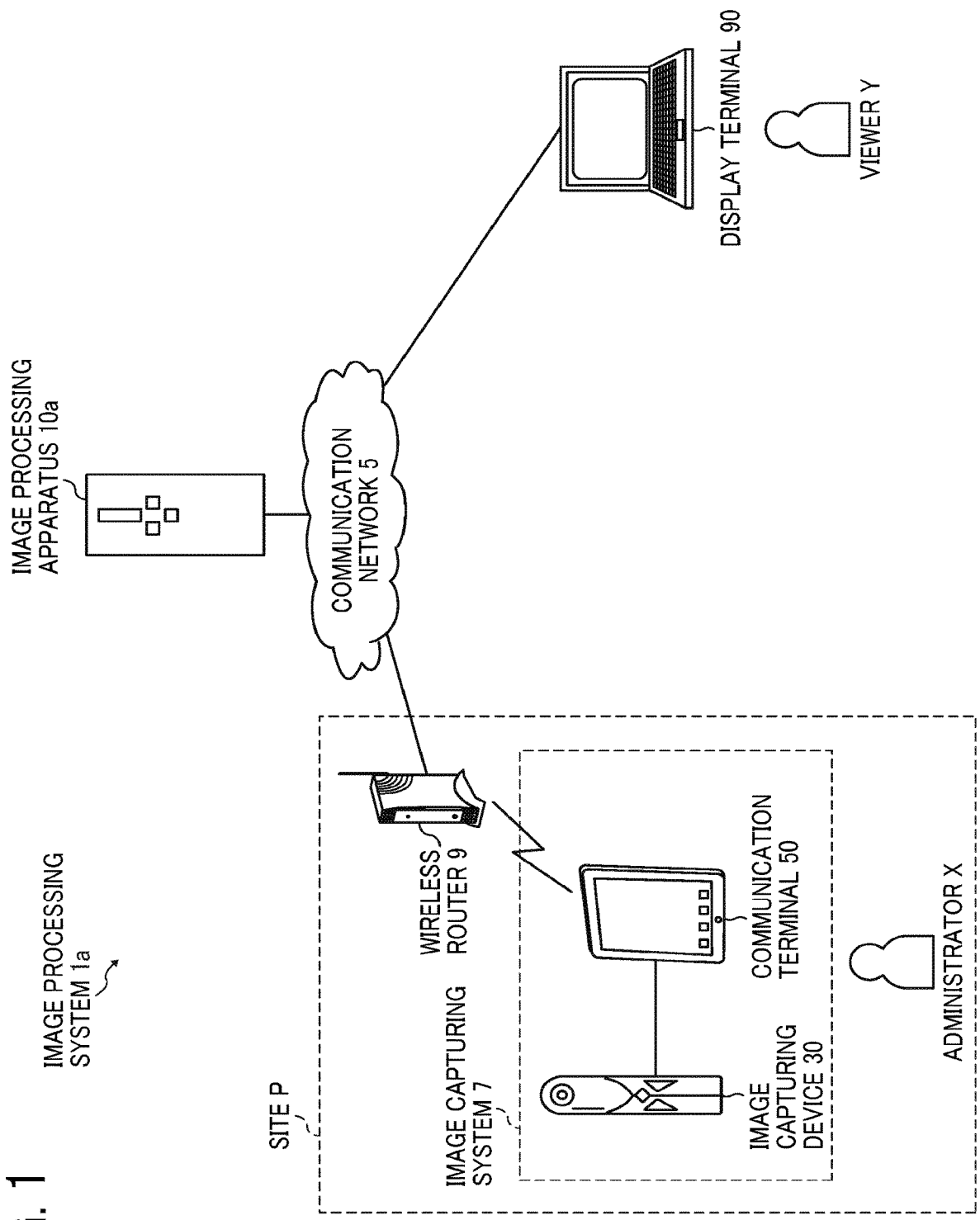
FIG. 1 is a diagram illustrating an example of a system configuration of an image processing system according to a first embodiment of a present disclosure.

The embodiments of the present disclosure provide an imaging device capable of preventing the viewers of captured images from feeling uncomfortable when the tilt correction is performed on the images.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present disclosure are described with reference to the drawings. In the description of the drawings, the same elements are denoted by the same reference numerals, and redundant description is omitted.

FIG. 1 is a diagram of an example of a system configuration of an image processing system according to a first embodiment of a present disclosure. In the image processing system 1a in FIG. 1, the image capturing device 30 captures any desired space image at a site P, and the display terminal 90 at a remote location displays the captured image. This enables a viewer Y to check the condition at the site P.

As illustrated in FIG. 1, the image processing system 1a according to the first embodiment includes an image processing apparatus 10a, an image capturing device 30, a communication terminal 50, a wireless router 9, and a display terminal 90.

The image processing apparatus 10a communicates data with the communication terminal 50 and the display terminal 90 via the communication network 5. The image processing apparatus 10a is implemented by, for example, a server computer. The image processing apparatus 10a applies the color-correction (color-correction processing) to captured-image data 200 to be corrected, based on a plurality of pieces of captured-image data 200 transmitted from communication terminal 50. Further, the image processing apparatus 10a sends to the display terminal 90 the corrected-image data generated by performing the processing to correct the color of the captured image. The image processing apparatus 10a may be configured by a single server computer or may be configured by a plurality of server computers.

The image capturing device 30 is a digital camera for capturing a spherical (360°) panoramic image. Alternatively, the image capturing device 30 may be a typical digital camera that captures a planar image. When the communication terminal 50 is equipped with a camera, the communication terminal 50 may be a digital camera. The communication terminal 50 is a terminal that transmits and receives data to and from the image capturing device 30. Further, the communication terminal 50 communicates data with the image capturing device 30, and also communicates data with the image processing apparatus 10a via the wireless router 9 and the communication network 5. The communication network 5 is, for example, the Internet. Furthermore, the image capturing device 30 and the communication terminal 50 constitute an imaging system 7. Note that the imaging system 7 including the image capturing device 30 and the communication terminal 50 may be configured by one apparatus or terminal having the functions of the image capturing device 30 and the communication terminal 50.

Further, the display terminal 90 communicates data with the image processing apparatus 10a via the communication network 5. The display terminal 90 is, for example, a notebook personal computers (PC). The display terminal 90 is a terminal used by a user (the viewer Y) who uses a service provided by an administrator X. Examples of the display terminal 90 may include a smartphone, a tablet PC, and a desktop PC, in addition to a notebook PC.

The image capturing device 30, the communication terminal 50, and the wireless router 9 are at the site P to be administrated by an administrator X. The site P is, for example, an apartment building, such as a condominium and an apartment, a detached house, or an office. The image processing system 1a provides a user (the viewer Y) with a predetermined service using a captured image 800 captured by the image capturing device 30 at the site P, the captured image 800 being associated with the captured-image data 200 of the space (subject to be captured) at the site P. The display terminal 90 displays an image representing the situation of the site P sent via the image processing apparatus 10a, so that the viewer Y can view an image representing the space (situation) of the site P.

Figure 2:
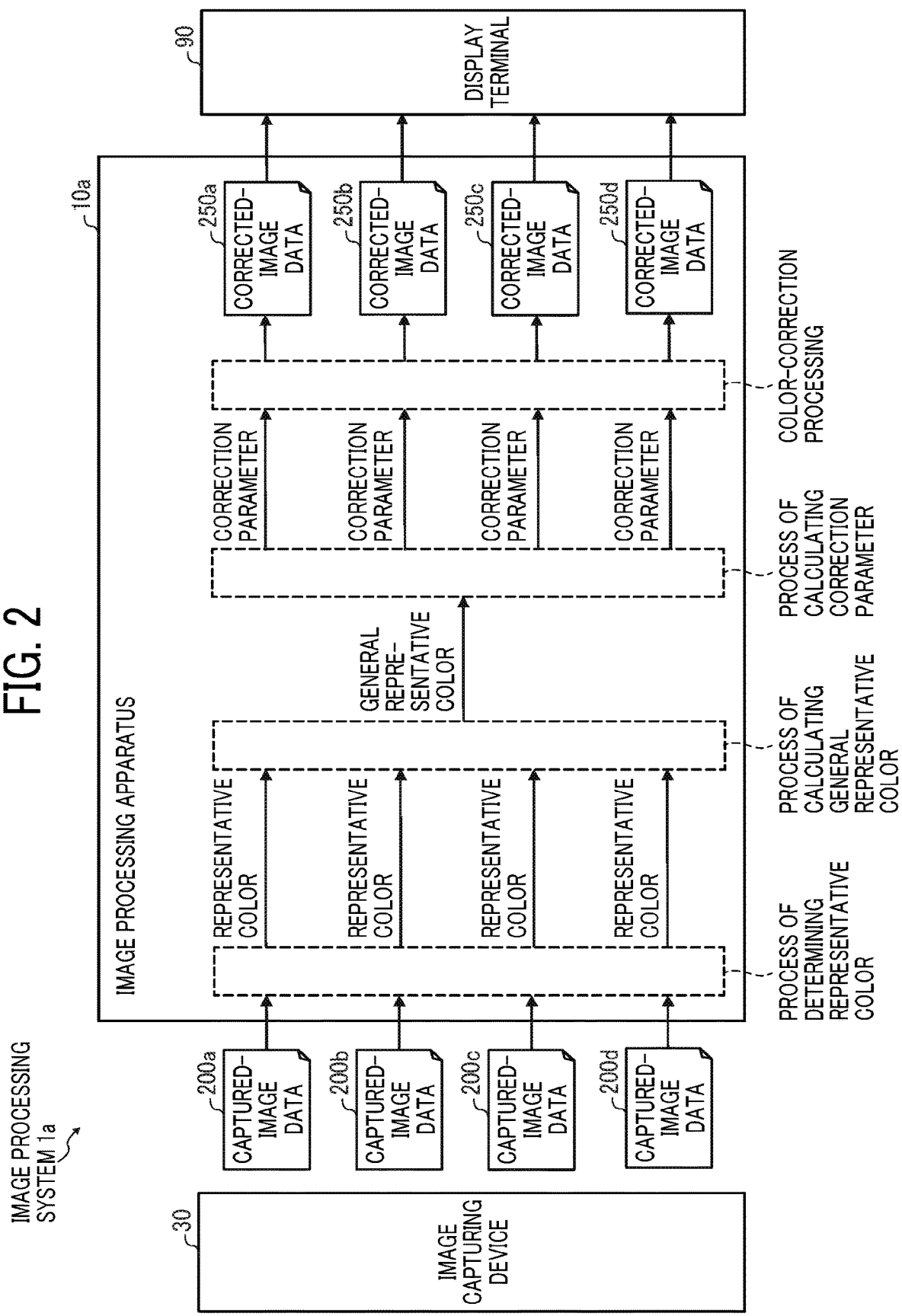
FIG. 2 is a diagram illustrating an example of a process of the image processing system according to the first embodiment.

The processing of the image processing system 1a according to the first embodiment is described below. FIG. 2 is an illustration of a schematic configuration of the image processing system 1a according to the first embodiment. The functions implemented by the image processing system are described in detail with reference to the drawings.

FIG. 2 is a diagram illustrating an example of an outline of the processing of the image processing system 1a according to the first embodiment. The image processing system 1a is a system that performs the color correction processing on the captured-image data 200 to be corrected, based on the plurality pieces of captured-image data 200 captured by the image capturing device 30, using the image processing apparatus 10a. In the color correction processing, the image processing apparatus 10a uniforms the color-tone of the captured images 800 associated with the plurality of pieces of captured-image data 200 in which different subjects are captured.

First, the image processing apparatus 10a acquires a plurality pieces of captured-image data 200 (200a, 200b, 200c, 200d) in which different subjects are captured by the image capturing device 30. The image processing apparatus 10a determines, for each set of captured-image data 200, a representative color of a captured image 800 associated with the acquired captured-image data 200. This process is referred to as a representative-color determination processing. Note that the representative color is a pixel value indicating a feature of a color that is representative of a piece of captured-image data 200 based on each pixel value of pixel constituting the captured image 800 associated with the captured-image data 200.

Next, the image processing apparatus 10a calculates a general representative color indicating a feature of the color representative of the plurality of pieces of image data 200, using the plurality of representative colors determined by the representative-color determination processing. This is referred to as general-representative-color calculation processing. Using the general representative color calculated by the general-representative-color calculation processing and the representative color determined for each (set of) captured-image data 200, the image processing apparatus 10a calculates a correction parameter for correcting the color of the captured-image data 200. This process is referred to as correction-parameter calculation processing.

Next, the image processing apparatus 10a performs color-correction processing for each set of captured-image data 200 using the correction parameters calculated by the correction-parameter calculation processing. Then, the image processing apparatus 10a transmits the corrected-image data 250 (250a, 250b, 250c, 250d) to which the color-correction processing has been applied, to the display terminal 90. In response to receiving the data, the display terminal 90 displays the plurality of pieces of corrected-image data 250 in which different subjects are captured. This enables the user to check the condition of the site P at which the image capturing device 30 is located.

For the tour display provided by the real estate preview service employing the image processing system 1a, the plurality of images of different subjects each captured at each room of the real estate property preferably has the same color tone and appropriate brightness. For example, if each of the images is viewed alone, the user does not feel uncomfortable, but if a plurality of images is viewed in series, the user (for example, the viewer Y in FIG. 1) viewing the images might feel uncomfortable.

However, the typical color correction method is a method for improving the color reproducibility of the same subject, and such a color correction method fails to perform image processing for correcting the brightness and color tone of the images of different subject. For example, even if a pixel to be corrected is extracted from image data captured under a certain light source, the extraction region, from which the pixel to be corrected has been extracted, cannot be applied to another image data of a different subject. Further, the typical method is a method for reproducing the same color as the color of a target original (subject) under a predetermined observation light source (illumination), and such a method fails to determine or correct to obtain a desired brightness and color tone for a plurality of images having different levels of brightness and color tone.

In view of such circumstances, the image processing system 1a is configured to determine a representative color for each of a plurality of captured images 800 having different levels of brightness and color tone, and further to determine one general representative color representing the determined representative colors of the plurality of captured images 800. Then, the image processing system 1a calculates a correction parameter used for the color correction using the representative color of each captured image 800 and the general representative color common to the captured images 800. The image processing system 1a performs the color correction using the calculated correction parameter. As a result, the image processing system 1a generates a corrected image 850 having the same brightness and color tone, which is an image obtained by correcting the plurality of images having different levels of brightness and color tone due to the capturing of different subjects. This provides image correction that enables adjusting of the brightness and color tone of the plurality of captured images 800 according to the needs of a service provider or a user who desires to improve convenience for the users viewing the images.

Figure 3:
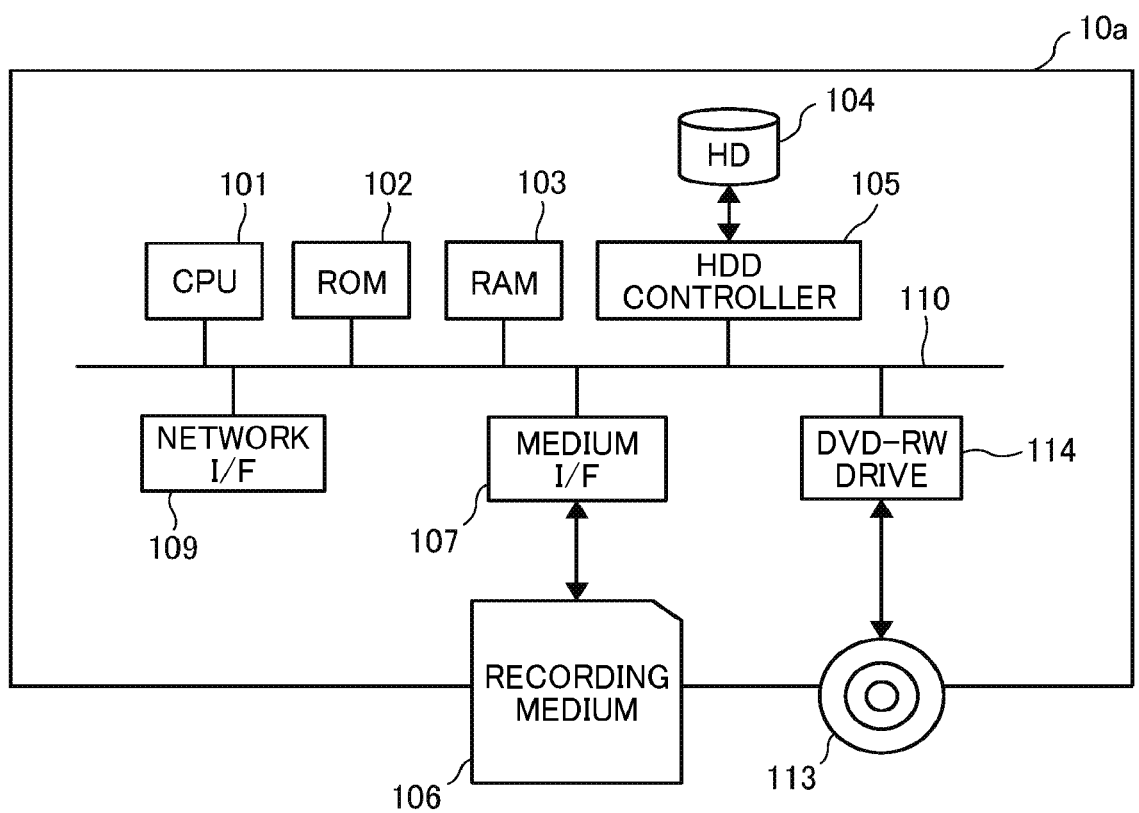
FIG. 3 is a hardware block diagram of an image processing apparatus according to the first embodiment.
Figure 4:
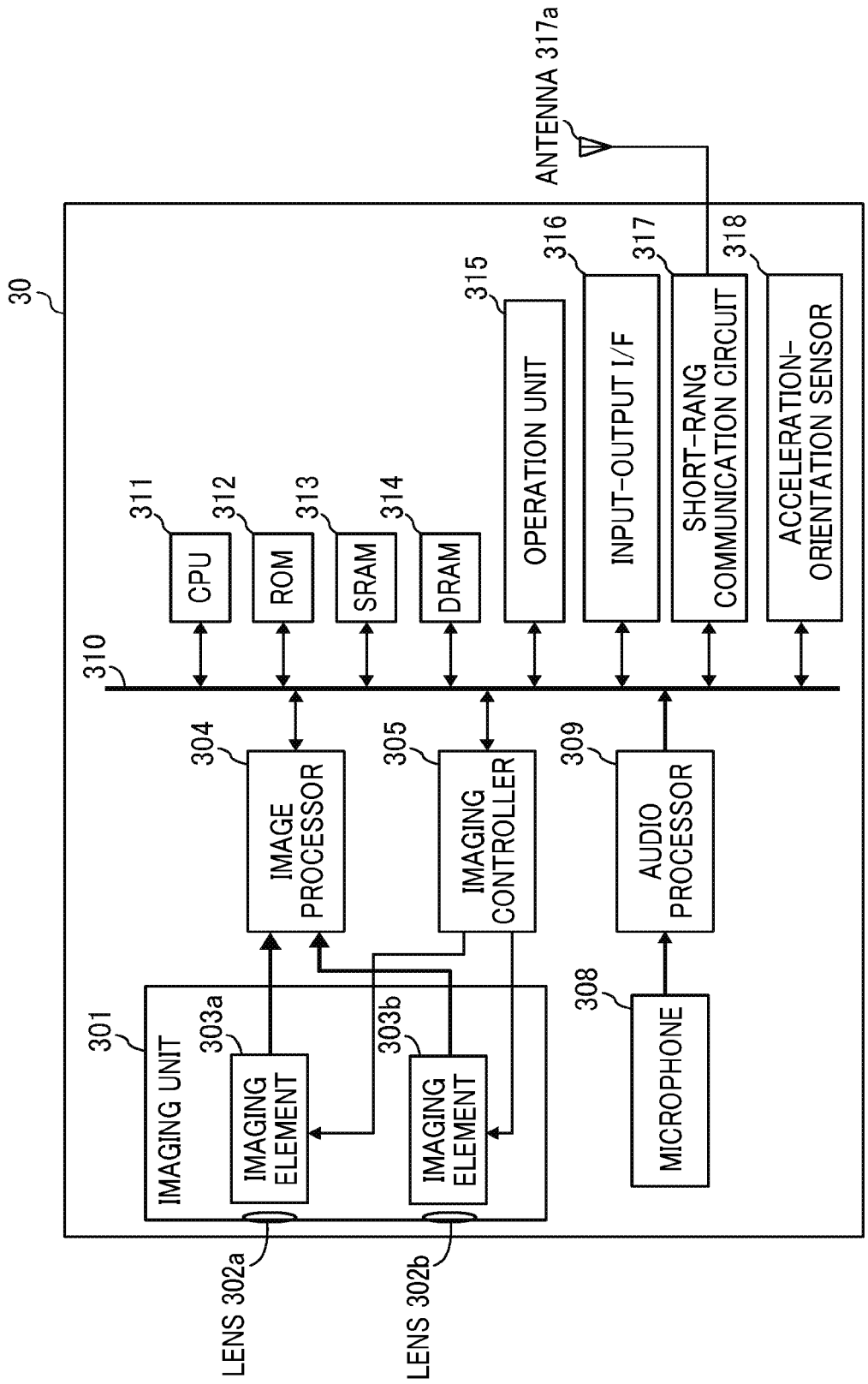
FIG. 4 is a hardware block diagram of an image capturing device according to the first embodiment.
Figure 5:
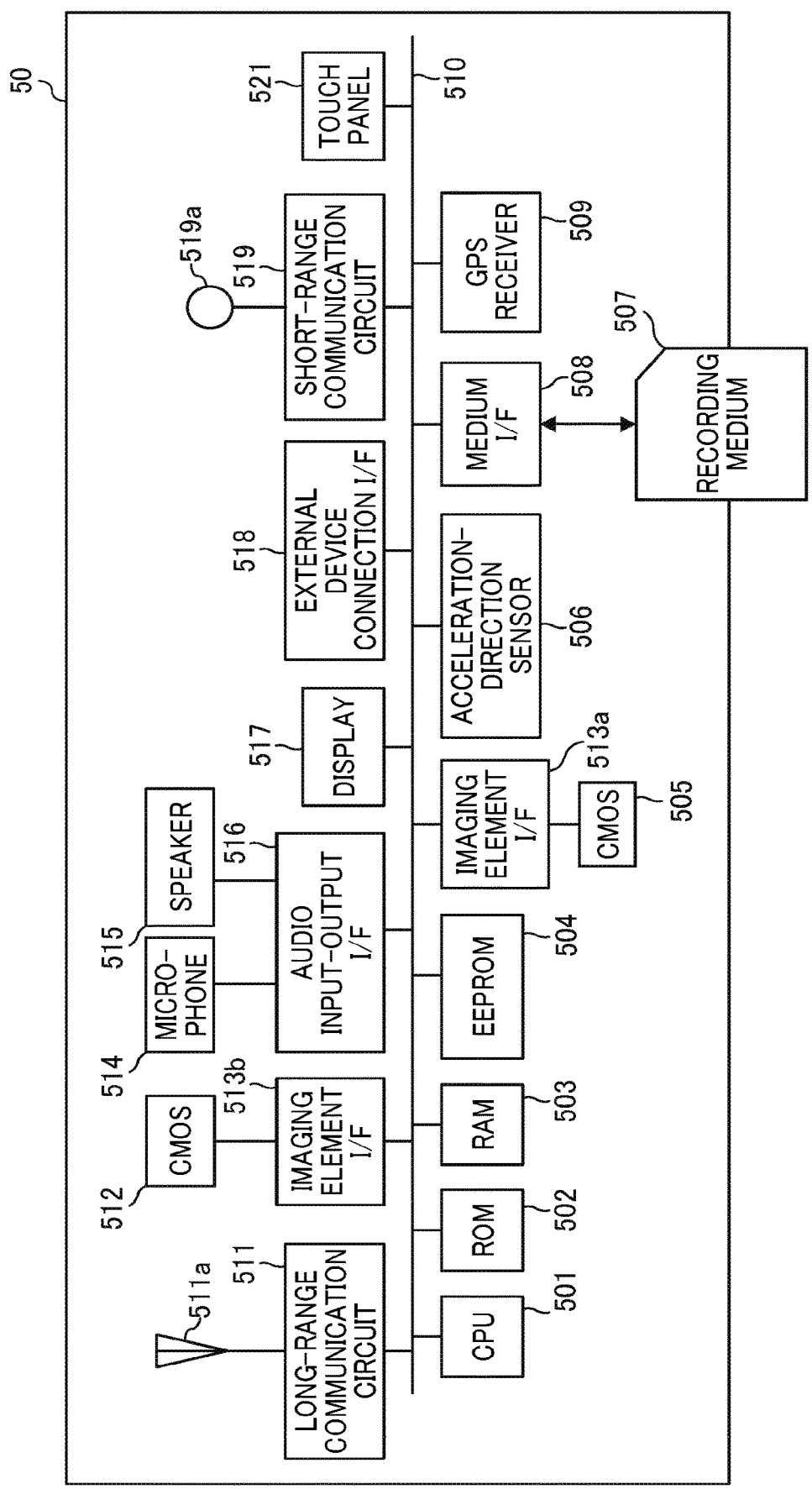
FIG. 5 is a hardware block diagram of a communication terminal according to the first embodiment.

Next, a description is given of the hardware configurations of the image processing apparatus 10a, the image capturing device 30, the communication terminal 50, and the display terminal 90 according to the first embodiment with reference to FIGS. 3 to 5. Note that the hardware configuration illustrated in FIGS. 3 to 5 may have the same configuration for each embodiment, and components may be added or deleted as needed.

First, the hardware configuration of the image processing apparatus 10a is described with reference to FIG. 3. FIG. 3 is a block diagram of an example of the image processing apparatus according to the first embodiment.

Referring to FIG. 3, the image processing apparatus 10a, which is implemented by the general-purpose computer, includes a central processing unit (CPU) 101, a read only memory (ROM) 102, a random access memory (RAM) 103, a hard disk (HD) 104, a hard disk drive (HDD) controller 105, a recording medium 106, a medium interface (I/F) 107, a network I/F 109, a digital versatile disc rewritable drive (DVD-RW) 114, and a bus line 110.

The CPU 101 controls entire operation of the image processing apparatus 10a. The ROM 102 stores programs, such as an initial program loader (IPL), to boot the CPU 101. The RAM 103 is used as a work area for the CPU 101. The HD 104 stores various data such as programs. The HDD controller 105 controls reading and writing of various data from and to the HD 104 under control of the CPU 101. The medium I/F 107 controls reading and writing (storing) of data from and to the recording medium 106 such as a flash memory. The network I/F 109 is an interface that controls communication of data through the communication network 5. The DVD-RW drive 114 reads and writes various data to and from a DVD-RW 113, which is one example of a removable storage medium. The DVD-RW is not limited to the DVD-RW, and may be a DVD-R. Further, the DVD-RW drive 114 may be a Blu-ray drive that controls reading or writing of various data from and to the Blu-ray disc (registered trademark).

The image processing apparatus 10a includes the bus line 110. The bus line 110 is, for example, an address bus or a data bus for electrically connecting the components such as the CPU 101 illustrated in FIG. 3.

First, the hardware configuration of the image capturing device 30 is described with reference to FIG. 4. FIG. 4 is a block diagram of the hardware configuration of the image capturing device 30 according to the first embodiment. The following describes a case in which the image capturing device 30 is a spherical (omnidirectional) image capturing device having two image elements. However, the image capturing device 30 may include any suitable number of image sensors, providing that it includes at least two imaging elements. In addition, the image capturing device 30 is not necessarily an image capturing device dedicated to omnidirectional image capturing. In another example, an external omnidirectional imaging unit may be attached to a general-purpose digital camera or a smartphone to implement an image capturing device having substantially the same function as that of the image capturing device 30.

As illustrated in FIG. 4, the image capturing device 30 includes an imaging unit 301, an image processor 304, an imaging controller 305, a microphone 308, an audio processor 309, a CPU 311, a ROM 312, a static random access memory (SRAM) 313, a dynamic random access memory (DRAM) 314, an operation unit 315, an input-output interface (I/F) 316, a short-range communication circuit 317, an antenna 317a, and acceleration-orientation sensor 318.

The imaging unit 301 includes two wide-angle lenses (so-called fish-eye lenses) 302a and 302b, each having an angle of view of equal to or greater than 180 degrees to form a hemispherical image. The imaging unit 301 further includes two imaging elements 303a and 303b corresponding to the wide-angle lenses 302a and 302b, respectively.

The imaging elements 303a and 303b each includes an image sensor such as a complementary metal oxide semiconductor (CMOS) sensor and a charge-coupled device (CCD) sensor, a timing generation circuit, and a group of registers. The image sensor converts an optical image formed by the wide-angle lenses 302a and 302b into electric signals to output image data. The timing generation circuit generates horizontal or vertical synchronization signals, pixel clocks and the like for the imaging sensor. Various commands, parameters and the like for operations of the imaging elements 303a and 303b are set in the group of registers.

Each of the imaging elements 303a and 303b of the imaging unit 301 is connected to the image processor 304 via a parallel I/F bus. Each of the imaging elements 303a and 303b of the imaging unit 301 is connected to the imaging controller 305 via a serial I/F bus (for example, an I2C bus). The image processor 304, the imaging controller 305, and the audio processor 309 are each connected to the CPU 311 via a bus line 310. Further, the bus line 310 is connected to the ROM 312, the SRAM 313, the DRAM 314, the operation unit 315, the input-output I/F 316, the short-range communication circuit 317, and the acceleration-orientation sensor 318.

The image processor 304 acquires image data from each of the imaging elements 303a and 303b via the parallel I/F bus. The image processor 304 performs predetermined processing on each image data. Thereafter, the image processor 304 combines image data to generate data of the equirectangular projection image.

The imaging controller 305 usually functions as a master device while each of the imaging elements 303a and 303b usually functions as a slave device. The imaging controller 305 sets commands or the like in the group of registers of each of the imaging elements 303a and 303b via the I2C bus. The imaging controller 305 receives various commands from the CPU 311. Also, the imaging controller 305 obtains the status data and the like of the group of registers of each of the imaging elements 303a and 303b via the I2C bus and sends the data to the CPU 311.

The imaging controller 305 instructs the imaging elements 303a and 303b to output the image data in response to pressing of the shutter button of the operation unit 315. In some cases, the image capturing device 30 is capable of displaying a preview image on a display (e.g., the display 517 of the communication terminal 50) or displaying a still image or moving image (movie). In case of displaying movie, image data are continuously output from the imaging elements 303a and 303b at a predetermined frame rate (frames per minute).

Furthermore, the imaging controller 305 operates in cooperation with the CPU 311, to synchronize the time when the imaging element 303a outputs image data and the time when the imaging element 303b outputs the image data. It should be noted that, although the special image capturing device 30 does not include a display in this embodiment, the special image capturing device 30 may include the display.

The microphone 308 collects sound from the surrounding environment of the image capturing device 30 and converts the collected sound to audio data (signal). The audio processor 309 obtains audio data output from the microphone 308 via an I/F bus and performs predetermined processing on the audio data. FIG. 4 illustrates the case where the microphone 308 is embedded in the image capturing device 30. Alternatively, the microphone 308 may be externally attached to the image capturing device 30. Further, the image capturing device 30 may include one or more microphones 308 each having predetermined arrangement configuration. Preferably, the microphone 308 is an ambisonics microphone.

The CPU 311 controls entire operation of the image capturing device 30 and performs necessary processing. The ROM 312 stores various programs for execution by the CPU 311. Each of the SRAM 313 and the DRAM 314 operates as a work memory to store programs loaded from the ROM 312 for execution by the CPU 311 or data in current processing. More specifically, in one example, the DRAM 314 stores image data currently processed by the image processor 304 and data of the equirectangular projection image on which processing has been performed.

The operation unit 315 collectively refers to various operation keys, such as a shutter button 315a. The user operates the operation unit 315 to input various shooting modes or shooting conditions.

The input-output I/F 316 collectively refers to an interface circuit such as a USB I/F that enables the image capturing device 30 to communicate data with an external medium such as a secure digital (SD) card or an external personal computer. The input-output IN 316 supports at least one of wired and wireless communications. Data of the equirectangular projection image stored in the DRAM 314 is recorded on an external medium via the input-output I/F 316, or sent to an external terminal (device) such as the communication terminal 50 via the input-output I/F 316 as necessary.

The short-range communication circuit 317 communicates data with an external terminal (device) such as the communication terminal 50 via the antenna 317a of the image capturing device 30 through a short-range wireless communication network such as Wi-Fi (registered trademark), near field communication (NFC), and Bluetooth (registered trademark). The short-range communication circuit 317 is also capable of transmitting the data of equirectangular projection image to an external device such as the communication terminal 50.

The acceleration-orientation sensor 318 calculates an orientation of the image capturing device 30 from the Earth's magnetism to output orientation information. This orientation information is an example of related information, which is metadata described in compliance with exchangeable image file format (Exif). This information is used for image processing such as image correction of captured images. The related information also includes data of a time (date) when an image is captured by the image capturing device 30, and data size of image data, for example.

Next, the hardware configuration of the communication terminal 50 is described with reference to FIG. 5. FIG. 5 is a block diagram of a hardware configuration of the communication terminal 50 according to the first embodiment.

The communication terminal 50 includes a CPU 501, a ROM 502, a RAM 503, an electrically erasable and programmable read only memory (EEPROM) 504, a CMOS sensor 505, an image sensor I/F 513a, an acceleration-orientation sensor 506, a medium I/F 508, and a GPS receiver 509.

The CPU 501 controls entire operation of the communication terminal 50. The ROM 502 stores a control program such as an IPL to boot the CPU 501. The RAM 503 is used as a work area for the CPU 501. The EEPROM 504 reads or writes various data such as a communication terminal program under the control of the CPU 501.

The CMOS sensor 505 captures an object (for example, the user operating the communication terminal 50) under control of the CPU 501 to obtain captured image data. The image sensor I/F 513a is a circuit that controls driving of the CMOS sensor 512. The acceleration-orientation sensor 506 includes various sensors such as an electromagnetic compass for detecting geomagnetism, a gyrocompass, and an acceleration sensor. The medium I/F 508 controls reading and writing (storing) of data from and to the recording medium 507 such as a flash memory. The GPS receiver 509 receives a GPS signal from a GPS satellite.

The communication terminal 50 further includes a long-range communication circuit 511, an antenna 511a for the long-range communication circuit 511, a CMOS sensor 512, an imaging element I/F 513b, a microphone 514, a speaker 515, an audio input-output I/F 516, a display 517, an external device connection I/F 518, a short-range communication circuit 519, an antenna 519a for the short-range communication circuit 519, and a touch panel 521.

The long-range communication circuit 511 is a circuit that enables the communication terminal 50 to communicate with other device through the communication network 5. The CMOS sensor 512 is an example of a built-in imaging device capable of capturing a subject under control of the CPU 501. The imaging element I/F 513b is a circuit that controls driving of the CMOS sensor 512. The microphone 514 is an example of built-in audio capturing device capable of inputting audio under control of the CPU 501. The audio input-output I/F 516 is a circuit for inputting or outputting an audio signal to the microphone 514 or from the speaker 515 under control of the CPU 501.

The display 517 may be a liquid crystal or organic electro luminescence (EL) display that displays an image of a subject, an operation icon, or the like. The external device connection I/F 518 is an interface circuit that connects the communication terminal 50 to various external devices. The near-distance communication circuit 519 is a communication circuit that communicates in compliance with the Wi-Fi, NFC, the Bluetooth and the like. The touch panel 521 is one example of an input device (input means) that allows a user to operate the communication terminal 50 by touching a screen of the display 517. The communication terminal 50 further includes a bus line 510. Examples of the bus line 510 include an address bus and a data bus, which electrically connects the elements such as the CPU 501.

Figure 6:
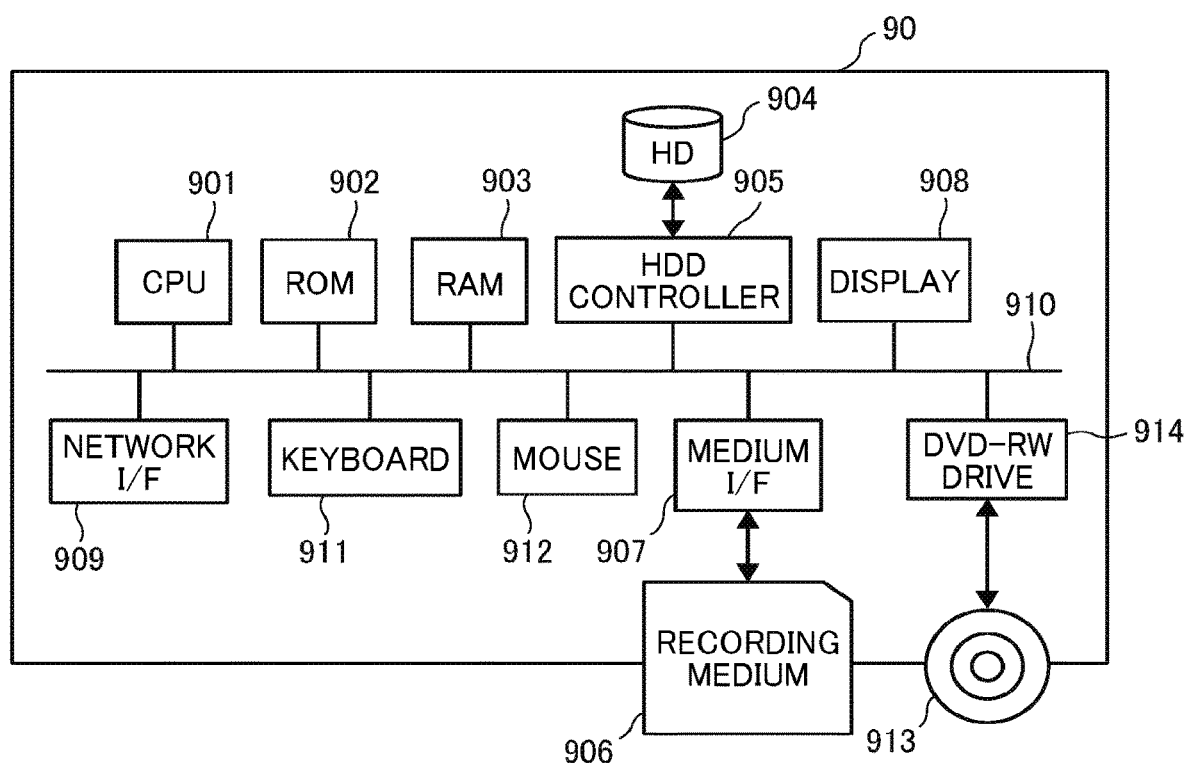
FIG. 6 is a hardware block diagram of a display terminal according to the first embodiment.

The hardware configuration of the display terminal 90 is described with reference to FIG. 6. FIG. 6 is a block diagram of the hardware configuration of the display terminal 90 according to the first embodiment.

As illustrated in FIG. 6, the display terminal 90 is constructed by a computer and includes a CPU 901, ROM 902, RAM 903, HD 904, HDD controller 905, recording medium 906, medium I/F 907, display 908, network I/F 909, keyboard 911, a mouse 912, a DVD-RW drive 914, and a bus line 910.

The CPU 901 controls entire operation of the display terminal 90. The ROM 902 stores a control program such as an IPL to boot the CPU 901. The RAM 903 is used as a work area for the CPU 901. The HD 904 stores various data such as a control program.

The HDD controller 905 controls reading and writing of various data from and to the HD 904 under control of the CPU 901. The medium I/F 907 controls reading and writing (storing) of data from and to the recording medium 906 such as a flash memory. The display 908 displays various information such as a cursor, menu, window, characters, and image. The display 908 is an example of a display unit. The network I/F 909 is an interface that controls communication of data through the communication network 5. The keyboard 911 is one example of input device (input means) provided with a plurality of keys for allowing a user to input characters, numerals, or various instructions. The mouse 912 is one example of an input device (input means) that allows a user to select a specific instruction or execution, select a target for processing, or move a cursor being displayed. The DVD-RW drive 914 reads and writes various data to and from to a DVD-RW 913, which is one example of a removable storage medium. The DVD-RW is not limited to the DVD-RW, and may be a DVD-R. Further, the DVD-RW drive 914 may be a Blu-ray drive that controls reading or writing of various data from and to the Blu-ray disc The display terminal 90 further includes a bus line 910. Examples of the bus line 910 include an address bus and a data bus, which electrically connects the elements such as the CPU 901 illustrated in FIG. 6.

It should be noted that a recording medium such as a CD-ROM or HD storing any of the above-described programs may be distributed domestically or overseas as a program product.

Figure 7:
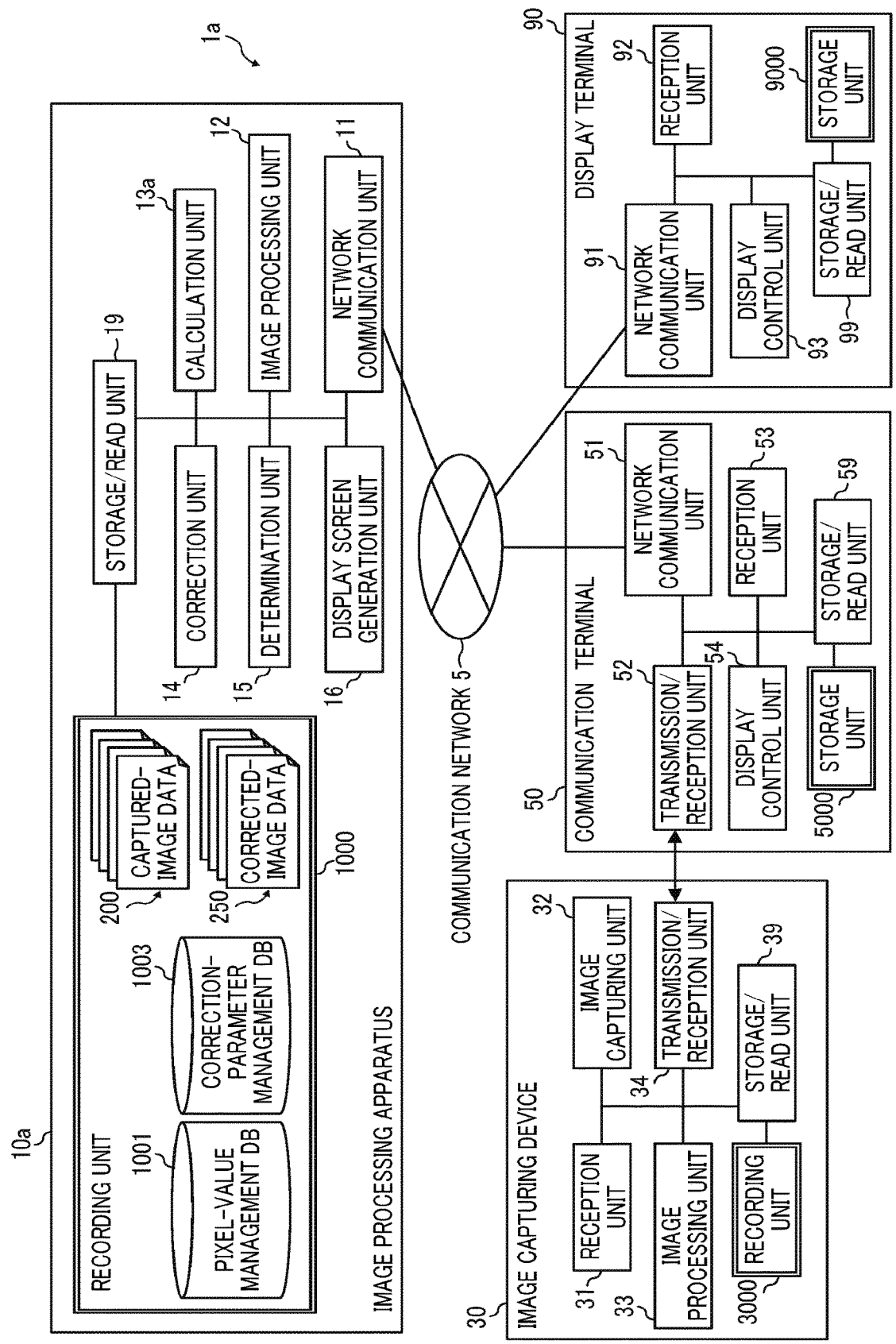
FIG. 7 is a functional block diagram of the image processing device according to the first embodiment.

Subsequently, the functional configurations of the device and the terminal according to the first embodiment are described. FIG. 7 is a block diagram of the functional configuration of the image processing device according to the first embodiment.

First, the functional configuration of the image processing apparatus 10a is described. The functions implemented by the image processing apparatus 10a includes a network communication unit 11, an image processing unit 12, a calculation unit 13a, a correction unit 14, a determination unit 15, a display screen generation unit 16, a storage/read unit 19, and a storage unit 1000.

The network communication unit 11 transmits and receives various data (or information) to and from the communication terminal 50 or the display terminal 90 via the communication network 5. The network communication unit 11 receives the captured-image data 200 captured by the image capturing device 30, which has been transmitted from, for example, the imaging system 7. Further, the network communication unit 11 transmits the corrected-image data 250 generated by the correction unit 14 to the display terminal 90 via the communication network 5. The network communication unit 11 is mainly implemented by the network I/F 109, which operates under control of the CPU 101 illustrated in FIG. 3. The network communication unit 11 is an example of a first transmission unit.

The image processing unit 12 performs various processes on the captured-image data 200 received by the network communication unit 11. For example, the image processing unit 12 acquires the captured-image data 200 received by the network communication unit 11 and develops it as pixel data. Further, the image processing unit 12 converts the acquired captured-image data 200 into any desired data size (image size). Specifically, the image processing unit 12 reduces the data size of the acquired captured-image data 200 to a size for a preview image to be viewed by the administrator X (see FIG. 1). The image processing unit 12 is implemented by the CPU 101 in FIG. 3.

The calculation unit 13a calculates a correction parameter for correcting the brightness or color of the captured-image data 200 processed by the image processing unit 12. The calculation unit 13a calculates, based on, for example, a plurality of pieces of captured-image data 200, a correction parameter for correcting the color of the captured-image data 200 to be corrected by the correction unit 14. A detailed description of the calculation unit 13a is described later. The calculation unit 13a is implemented by the CPU 101 illustrated in FIG. 3.

The correction unit 14 performs the color correction on the captured-image data 200 using the correction parameter calculated by the calculation unit 13a. For example, the correction unit 14 generates corrected-image data 250 by performing the color correction on the captured-image data 200. The correction unit 14 is implemented is implemented by the CPU 101 in FIG. 3.

The determination unit 15 serves to perform various determinations, which is implemented by the CPU 101 in FIG. 3.

The display screen generation unit 16 generates various display screens to be displayed on the communication terminal 50 or the display terminal 90. The display screen generation unit 16 generates a preview screen for displaying data on the communication terminal 50, for example. The display screen generation unit 16 generates a display screen for displaying corrected-image data on the display terminal 90, for example. The display screen generation unit 16 is implemented by the CPU 101 in FIG. 3.

The storage/read unit 19 stores various data in the storage unit 1000 and reads various data from the storage unit 1000. The storage/readout unit 19 is implemented by the CPU 101 in FIG. 3. The storage unit 1000 is implemented by the ROM 102, the HD 104, and the recording medium 106 illustrated in FIG. 3. The storage unit 1000 includes a pixel-value management DB 1001 and a correction-parameter management DB 1003. The pixel-value management DB 1001 includes a representative-color management table and a general-representative-color management table, which will be described later. The correction-parameter management DB 1003 includes a correction-parameter management table to be described later. The storage unit 1000 stores captured-image data 200 and corrected-image data 250 therein.

Figure 8:
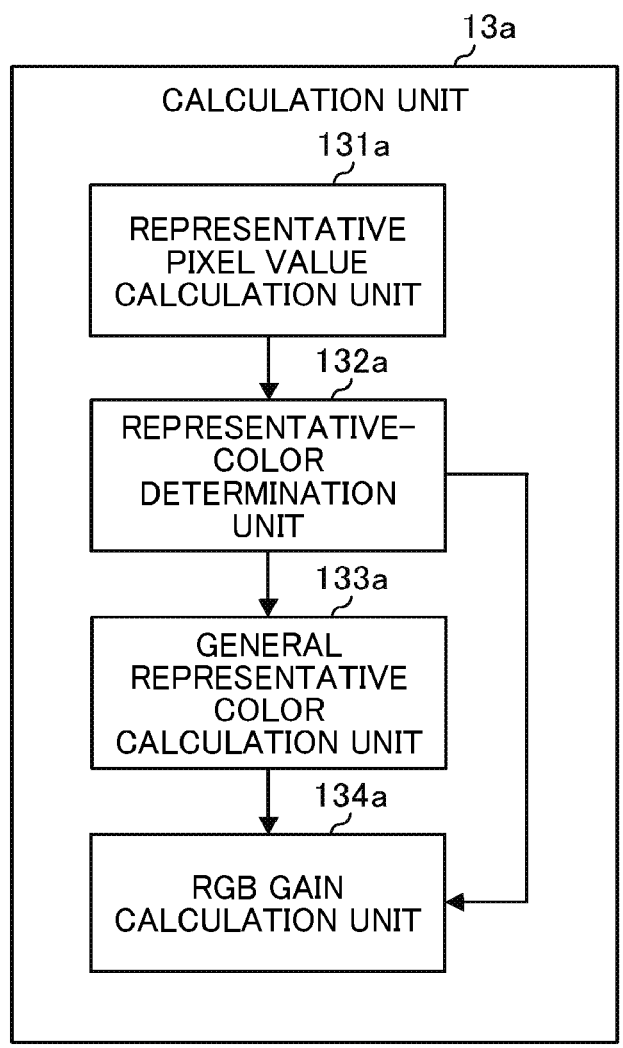
FIG. 8 is a functional block diagram of a calculation unit according to the first embodiment.

The functional configuration of the calculation unit 13a is described in detail, referring to FIG. 8. FIG. 8 is a block diagram of the functional configuration of the calculation unit 13a according to the first embodiment. The calculation unit 13a in FIG. 8 includes a representative pixel value calculation unit 131a, a representative-color determination unit 132a, a general representative color calculation unit 133a, and an RGB gain calculation unit 134a.

The representative pixel value calculation unit 131a calculates a representative pixel value indicating a characteristic feature of a color representing a cluster. The cluster is obtained by performing a clustering process on each pixel value of pixels constituting the captured image 800 associated with the captured-image data 200. For example, the representative pixel value calculation unit 131 generates k clusters (k is a natural number, and is greater than 0 (k>0)) by performing the clustering process on each pixel value of the pixels constituting the captured image 800 associated with the captured-captured-image data 200 read by the image processing unit 12. Then, the representative pixel value calculation unit 131 calculates, as the representative pixel value of the cluster, a pixel in the center (central pixel) of the generated cluster. The central pixel of the cluster is a pixel value that is the barycenter of the pixel group that constitutes the cluster.

The representative-color determination unit 132a determines, for each set of captured-image data 200, a representative color that indicates a feature of the representative color of (a color that represents) a corresponding set of the captured-image data 200 based on each pixel value of the pixels constituting the captured image 800 associated with the captured-image data 200. For example, the representative-color determination unit 132a determines (selects), as a representative color, a representative pixel value that corresponds to a specific cluster, in which the greatest number of pixels are included, among the representative pixel values calculated for the clusters by representative pixel value calculation unit 131a. The representative color determined by the representative-color determining unit 132a is an example of a first representative color.

The general representative color calculation unit 133a calculates a general representative color indicating a feature of a color that represents a plurality of pieces of captured-image data 200 based on the representative color determined by the representative-color determination unit 132a. The general representative color calculated by the general representative color calculation unit 133a is an example of a second representative color.

The RGB gain calculation unit 134a calculates an RGB gain value as a correction parameter based on the representative color determined by the representative-color determination unit 132a and the general representative color calculated by the general representative color calculation unit 133a. The RGB gain calculation unit 134a is an example of a correction parameter calculation unit.

FIG. 9 is an example of a representative-color management table according to the first embodiment. The representative-color management table as illustrated in FIG. 9 constitutes the pixel-value management DB 1001 included in the storage unit 1000. The representative-color management table in FIG. 9 indicates, for each image identification (ID) for identifying the captured-image data 200, the result of the clustering process performed on the pixel value of the pixels constituting the captured image 800 associated with the captured-image data 200. In the representative-color management table, the number of pixels included in a cluster and the central pixel of the cluster are stored and managed in association with each other for each cluster No. for identifying an individual cluster. Specific processing for obtaining the processing result illustrated in FIG. 9 is described later.

FIG. 10 is an example of a general-representative-color management table according to the first embodiment. The general-representative-color management table in FIG. 10 constitutes the pixel-value management DB 1001 included in the storage unit 1000. The general-representative color management table in FIG. 10 indicates the result of the clustering process performed on a plurality of representative colors determined by the representative-color determination unit 132a. In the general-representative color management table, the central pixel of a cluster (hereinafter, referred to also as cluster central pixel), which is the barycenter of the cluster, and the image ID for identifying the captured-image data 200 that corresponds to the representative color of the corresponding cluster are stored and managed in association with each other for each cluster number (No.) for identifying the divided clusters. In the example of FIG. 10, the cluster with the cluster number "1" has the cluster central pixel (R, G, B) of (114, 108, 99), to which the representative color of each of three sets of captured-image data 200 identified with the image ID "P01", "P02", and "P04" belongs. The cluster with the cluster number "2" has the cluster central pixel (R, G, B)=(127, 115, 86), to which the representative color of the piece of captured-image data 200 identified by the image ID "P03".

FIG. 11 is an example of a correction-parameter management table according to the first embodiment. The correction-parameter management table in FIG. 11 constitutes the correction-parameter management DB 1003 included in the storage unit 1000. In the correction-parameter management table in FIG. 11, the representative color determined by the representative-color determination unit 132a and the correction parameter calculated by the RGB gain calculation unit 134a are stored and managed in association with each other, for each image ID for identifying the captured-image data 200. In the correction-parameter management table in FIG. 11, the general representative color calculated by the general representative color calculation unit 133a is stored and managed in common for a plurality of image IDs.

Next, the functional configuration of the image capturing device 30 in FIG. 7 is described. The functions implemented by the image capturing device 30 include a reception unit 31, an image capturing unit 32, an image processing unit 33, a transmission/reception unit 34, a storage/read unit 39, and a storage unit 3000.

The reception unit 31 receives an operation input from a user (for example, the administrator X illustrated in FIG. 1). The reception unit 31 is implemented by the operation unit 315 and the CPU 311 illustrated in FIG. 4.

The image capturing unit 32 captures an image of a subject and has a function of capturing a subject or scene to acquire captured-image data 200. The captured-image data may be a still image or a moving image. The image capturing unit 32 is implemented by the imaging unit 301, the image processor 304, the imaging controller 305, and the CPU 311.

The image processing unit 33 performs various processes on the image data captured by the image capturing unit 32. For example, when the captured image 800 associated with the captured-image data is a spherical image, the image processing unit 33 generates data of the equirectangular projection image using two hemispherical images respectively captured by the imaging elements 103a and 103b. The image processing unit 33 is implemented under control of the CPU 311 in FIG. 4.

The transmission/reception unit 34 communicates data with the communication terminal 50 through the short-range wireless communication technology such as Wi-Fi. The transmission/reception unit 34 is implemented by the short-range communication circuit 317, the antenna 317a, and the CPU 311 in FIG. 4.

The storage/read unit 39 stores various data in the storage unit 3000 or reads various data from the storage unit 3000. The storage/read unit 39 is implemented by the CPU 311 in FIG. 4. The storage unit 3000 is implemented by the ROM 312, the SRAM 313, and the DRAM 314 in FIG. 4.

The functions implemented by the communication terminal 50 in FIG. 7 includes a network communication unit 51, a transmission/reception unit 52, a reception unit 53, a display control unit 54, a storage/read unit 59, and a storage unit 5000.

The network communication unit 51 transmits and receives various data (or information) to and from the image processing apparatus 10a via the communication network 5. The network communication unit 51 is implemented by the long-distance communication circuit 511, the antenna 511a, and the CPU 501 in FIG. 5. The network communication unit 51 is an example of a second transmission unit.

The transmission/reception unit 52 communicates data with the image capturing device 30 through the short-range wireless communication technology such as Wi-Fi. The transmission/reception unit 52 is implemented by the short-range communication circuit 519, the antenna 519a, and the CPU 501 in FIG. 5.

The reception unit 53 receives input by a user to the input device such as the touch panel 521 illustrated in FIG. 5. The reception unit 53 receives, for example, a selection of a specific image from images on the preview screen 600a (see FIG. 20) displayed on the display 517. The reception unit 53 is implemented by, for example, a program that is executed by the CPU 501 in FIG. 5.

The display control unit 54 causes the display 517 illustrated in FIG. 5 to display various screen information. For example, the display control unit 54 causes the display 517 to display the preview screen 600a associated with the preview image received by the network communication unit 51. The display control unit 54 is implemented by the display 517 and a program that is executed by the CPU 501 in FIG. 5.

The storage/read unit 59 stores various data in the storage unit 5000 or reads various data from the storage unit 5000. The storage/read unit 59 is implemented by the CPU 501 in FIG. 5. The storage unit 5000 is implemented by the ROM 502, the RAM 503, and the EEPROM 504 in FIG. 4.

Next, the functional configuration of the display terminal 90 in FIG. 7 is described. The functions implemented by the display terminal 90 in FIG. 7 includes a network communication unit 91, a reception unit 92, a display control unit 93, a storage/read unit 99, and a storage unit 9000.

The network communication unit 91 transmits and receives various data (or information) to and from another apparatus (for example, the image processing apparatus 10a) via the communication network 5. For example, the network communication unit 91 receives the corrected-image data processed by the image processing apparatus 10a from the image processing apparatus 10a. The network communication unit 91 is implemented by the network I/F 109, which operates under control of the CPU 901 illustrated in FIG. 6.

The reception unit 92 receives input by a user to the input device such as the keyboard 911 illustrated in FIG. 6. The reception unit 92 is implemented by the keyboard 911 and a program that is executed by the CPU 901 in FIG. 6.

The display control unit 93 displays various screen information on the display 908 in FIG. 6. For example, the display control unit 93 causes the display 908 to display an image associated with the corrected-image data received by the network communication unit 91. The display control unit 93 is implemented by the display 908 and a program that is executed by the CPU 901 in FIG. 6.

The storage/read unit 99 stores various data in the storage unit 9000 or reads various data from the storage unit 9000. The storage/read unit 99 is implemented by the CPU 901 in FIG. 7. The storage unit 9000 is implemented by the ROM 902, the HD 904, and the recording medium 906 illustrated in FIG. 7.

The processes and operations of the image processing system according to the first embodiment are described with reference to FIGS. 12 to 20.

Figure 12:
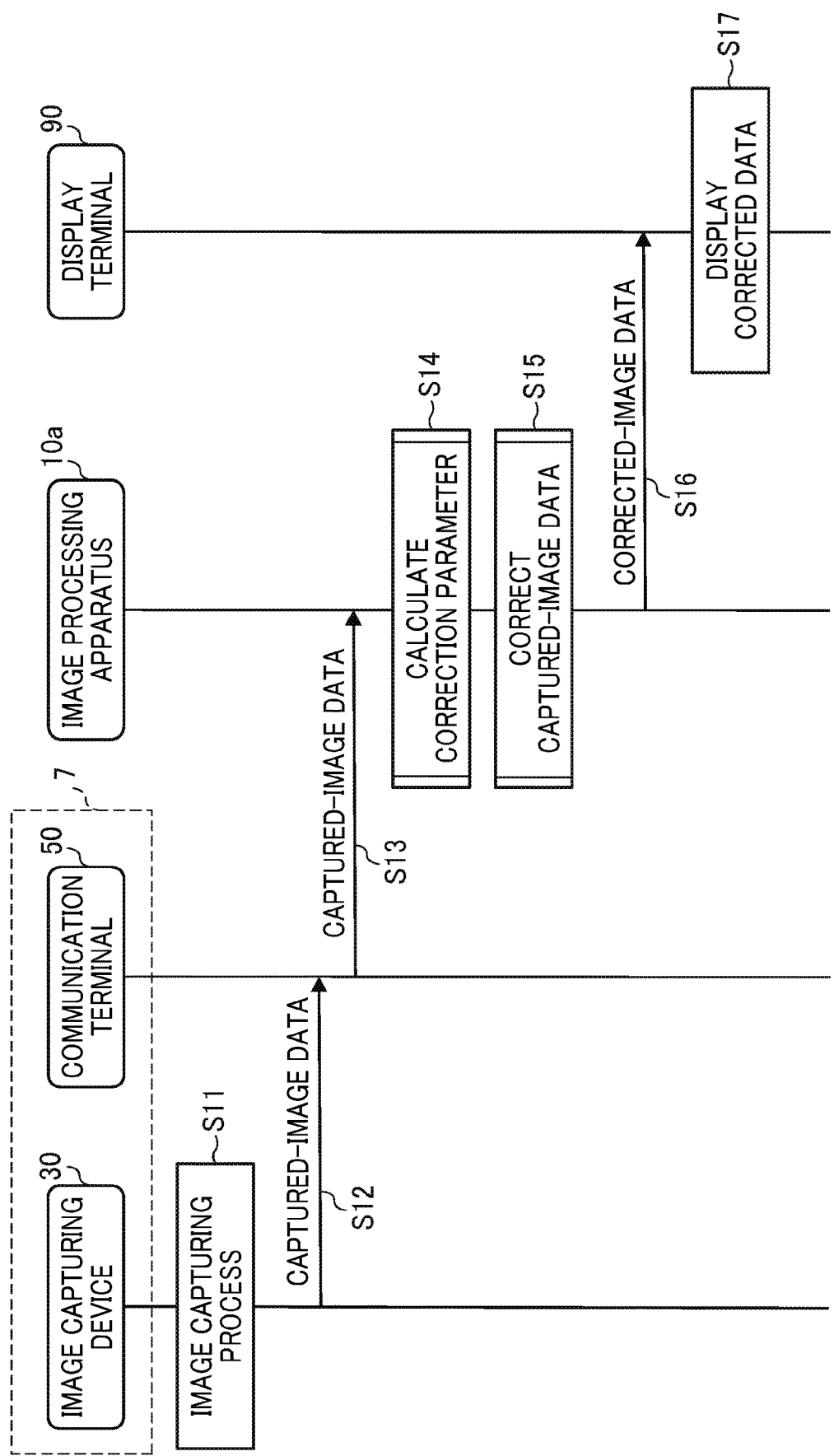
FIG. 12 is a sequence diagram of an example of correction processing performed on a captured image in an image processing system according to the first embodiment.

First, the overall flow of the processing or operation of the image processing system 1a is described with reference to FIG. 12. FIG. 12 is a sequence diagram of an example of correction processing performed on a captured image by an image processing apparatus 10a according to the first embodiment.

First, in step S11, the image capturing device 30 executes an image capturing process using the image capturing unit 32. The image capturing unit 32 of the image capturing device 30 acquires a plurality of pieces of captured-image data 200 at the site P where the image capturing device 30 is located. In this case, the plurality of pieces of captured-image data 200 has a different subject for each piece of the captured-image data 200. The different subject refers to an object, a person, or a space whose image is captured under the different conditions such as the level of brightness or the illumination in the site P. In step S12, the transmission/reception unit 34 of the image capturing device 30 transmits the plurality of pieces of captured-image data 200 acquired by the image capturing unit 32, to the communication terminal 50. Accordingly, the transmission/reception unit 52 of the communication terminal 50 receives the plurality of pieces of captured-image data 200 transmitted from the image capturing device 30.

Next, in step S13, the network communication unit 51 of the communication terminal 50 transmits the plurality of pieces of captured-image data 200 received by the transmission/reception unit 52, to the image processing apparatus 10a via the communication network 5. Accordingly, the network communication unit 11 of the image processing apparatus 10a receives the plurality of pieces of captured-image data 200 transmitted from the communication terminal 50. Through the above-described image capturing process, the captured-image data 200 acquired by the image capturing device 30 is uploaded to the image processing apparatus 10a. In the above description, a description is given of the configuration in which the image capturing device 30 transmits the captured-image data 200 to the image processing apparatus 10a via the communication terminal 50. However, when the image capturing device 30 also has the function of the network communication unit 51 of the communication terminal 50, the image capturing device 30 may transmit the captured-image data 200 directly to the image processing apparatus 10a without using the communication terminal 50.

In step S14, the image processing apparatus 10a calculates a correction parameter for the color correction of the captured-image data 200 to be corrected, using the plurality of pieces of captured-image data 200 received by the network communication unit 11. A method for calculating the correction parameter is described later.

In step S15, the correction unit 14 of the image processing apparatus 10a performs the color correction on the captured-image data 200 using the correction parameter calculated in step S14. In this case, the correction unit 14 performs the color correction on each set of the captured-image data 200 using the correction parameter calculated for each set of the captured-image data 200 in step S14.

In step S16, the network communication unit 11 of the image processing apparatus 10a transmits a plurality of pieces of corrected-image data 250 to the display terminal 90 via the communication network 5. Accordingly, the network communication unit 91 of the display terminal 90 receives the plurality of pieces of corrected-image data 250 transmitted from the image processing apparatus 10a.

In step S17, the display control unit 93 of the display terminal 90 displays a corrected image (see FIGS. 18A to 18D) associated with each set of the corrected-image data 250 on the display 908. As a result, the image processing system 1a can display a plurality of corrected images, whose color tone has been made uniform, generated by the image processing apparatus 10a on the display terminal 90 used by the user (the viewer Y).

Next, the process of calculating a correction parameter by the image processing apparatus 10a is described with reference to FIGS. 13 to 20.

Figure 13:
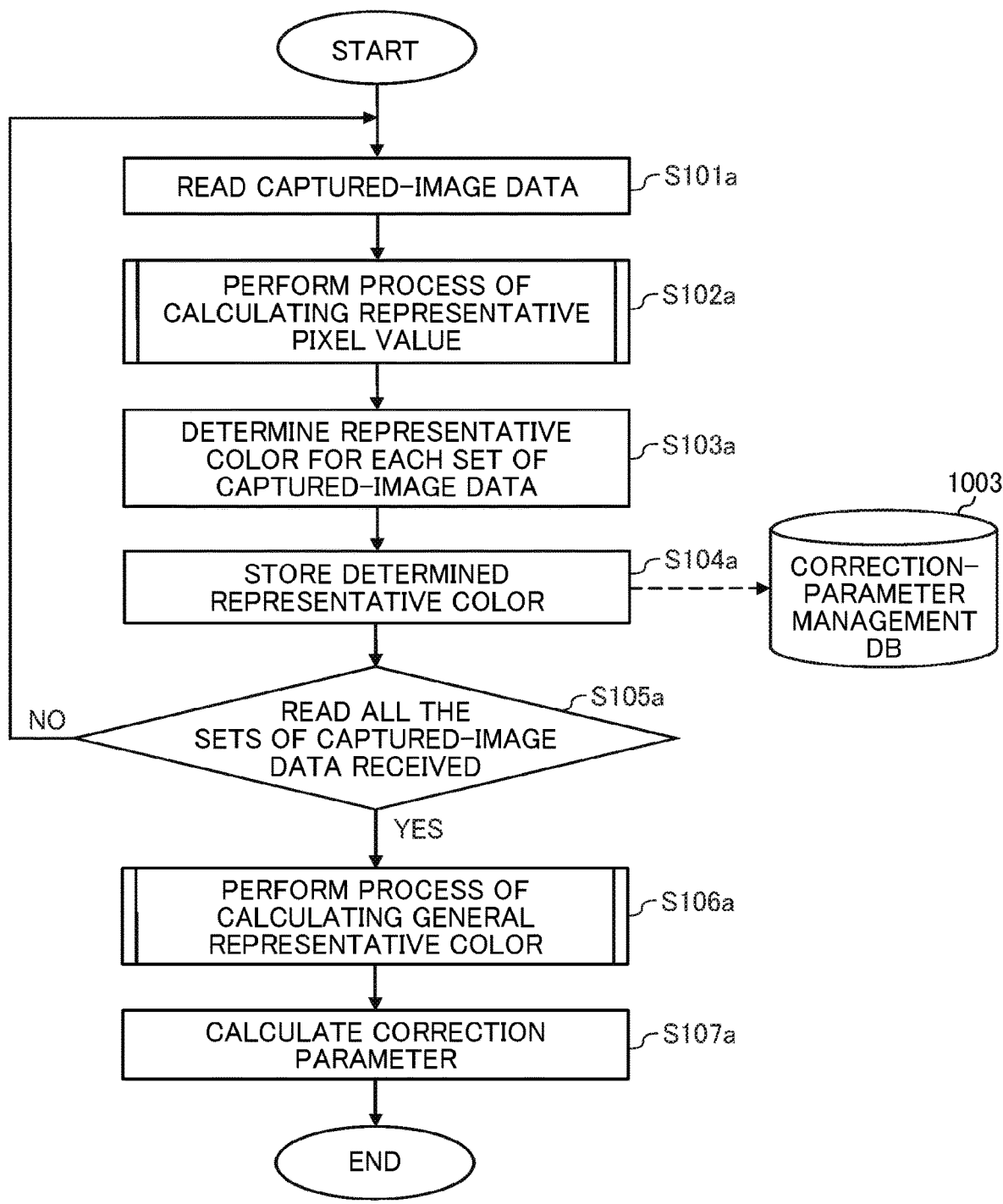
FIG. 13 is a flowchart of an example process of calculating a correction parameter performed by the image processing apparatus according to the first embodiment.

FIG. 13 is a flowchart for explaining an example of the process of calculating a correction parameter, performed by the image processing apparatus according to the first embodiment.

First, in step S101a, the image processing unit 12 of the image processing apparatus 10a reads the captured-image data 200 received by the network communication unit 11. Specifically, the image processing unit 12 deploys the captured-image data 200 as pixel data and acquires RGB pixel values. For example, when the captured-image data 200 is a JPEG image, the JPEG image is decoded by a JPEG decoder, and the decoded image data in the YCbCr format is converted into image data in the RGB format in accordance with a conversion method defined as JPEG.

Further, the image processing unit 12 reduces the image size of the converted image data. In this case, it is assumed that the image processing unit 12 reduces the number of pixels of the converted image to a size of 400 (horizontal direction)×200 (vertical direction). Alternatively, instead of reducing the image size by the image processing unit 12, the following processing may be performed according to the image size of the captured-image data 200 received by the network communication unit 11.

In step S102*a*, the calculation unit 13*a* of the image processing apparatus 10*a* calculates a representative pixel value for the captured-image data 200 read by the image processing unit 12. The representative pixel value indicates a feature of a color representing a cluster. The cluster is obtained by performing a clustering process on each pixel value of pixels constituting the captured image 800 associated with the captured-image data 200.

Figure 14:
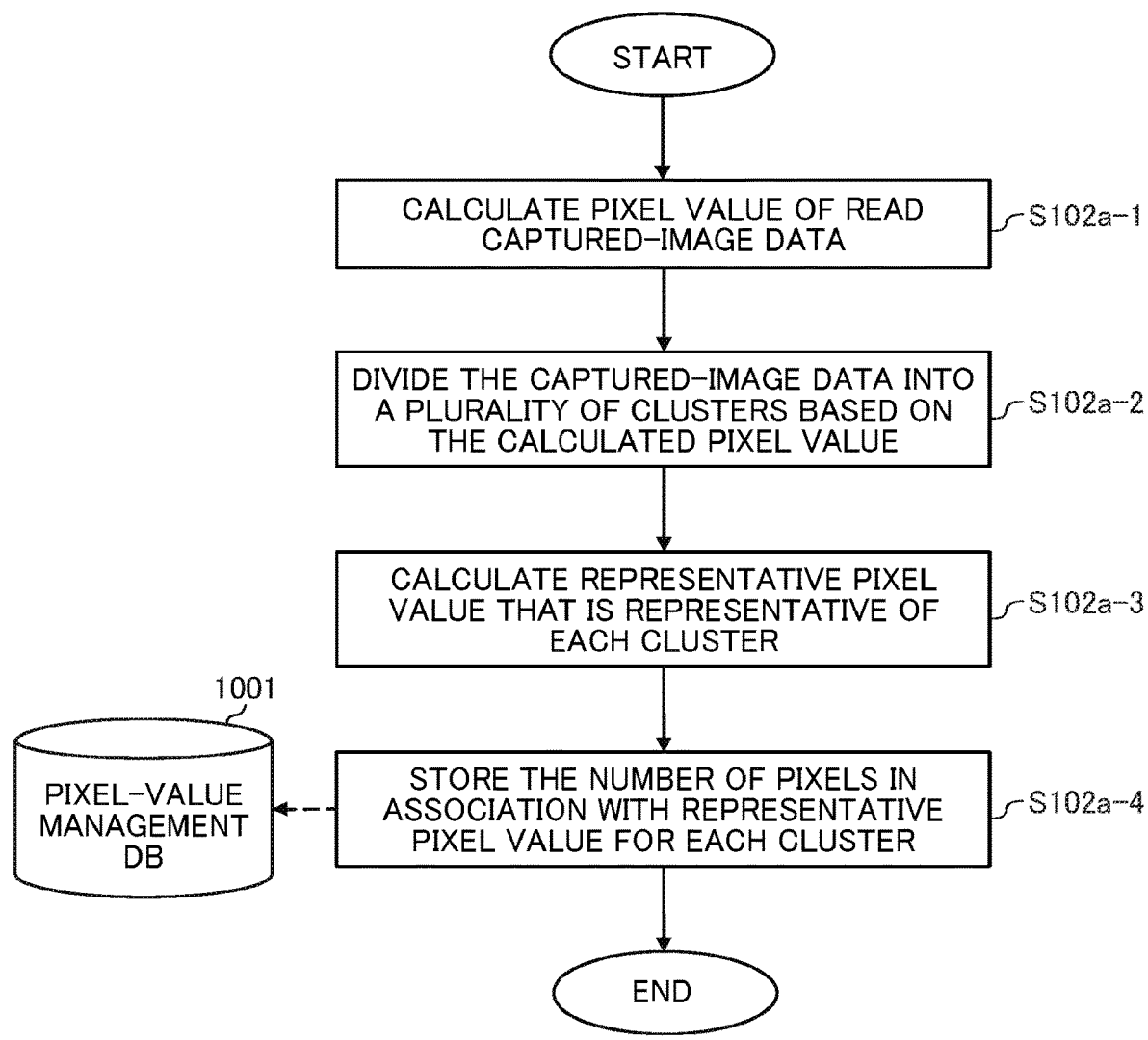
FIG. 14 is a flowchart of an example of the process of calculating a representative color performed by the image processing apparatus according to the first embodiment.
Figure 15B:
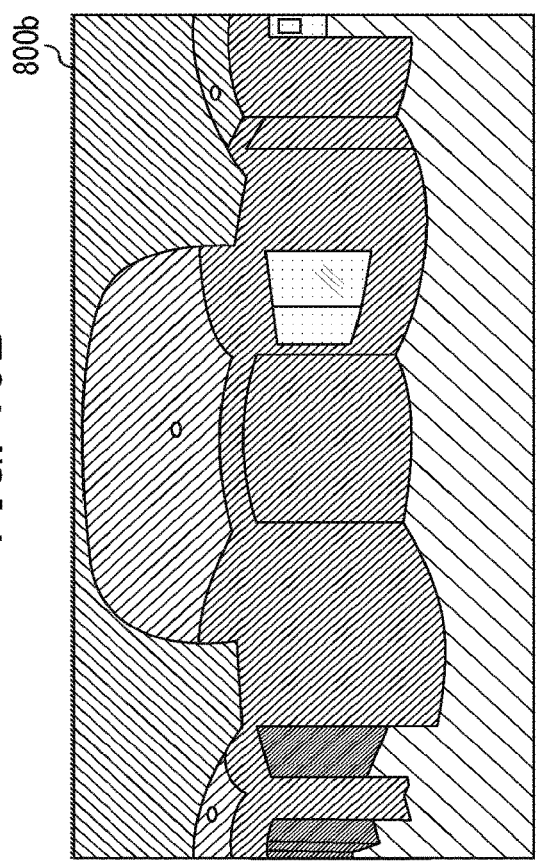
FIGS. 15A to 15D are illustrations of the captured images according to the first embodiment.
Figure 15D:
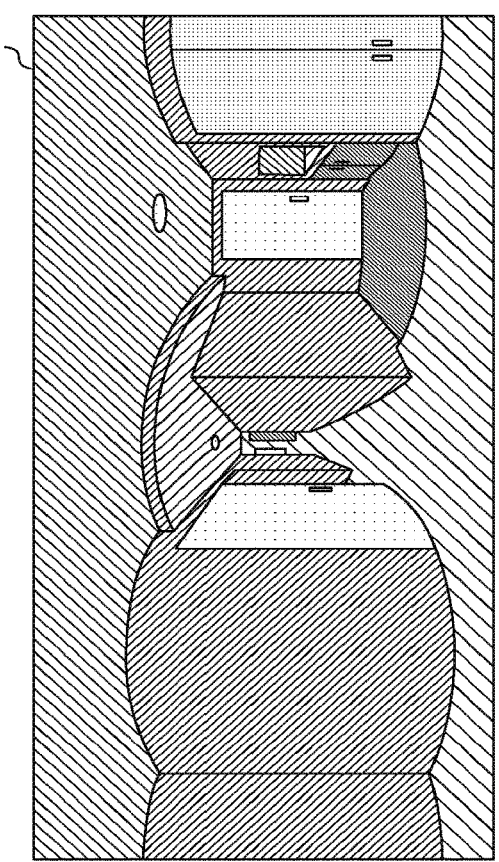
Figure 15A:
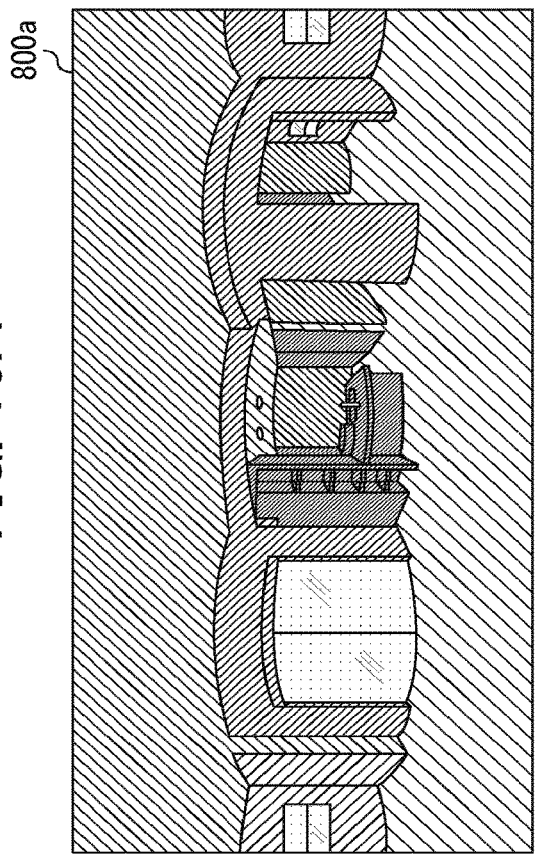
Figure 15C:
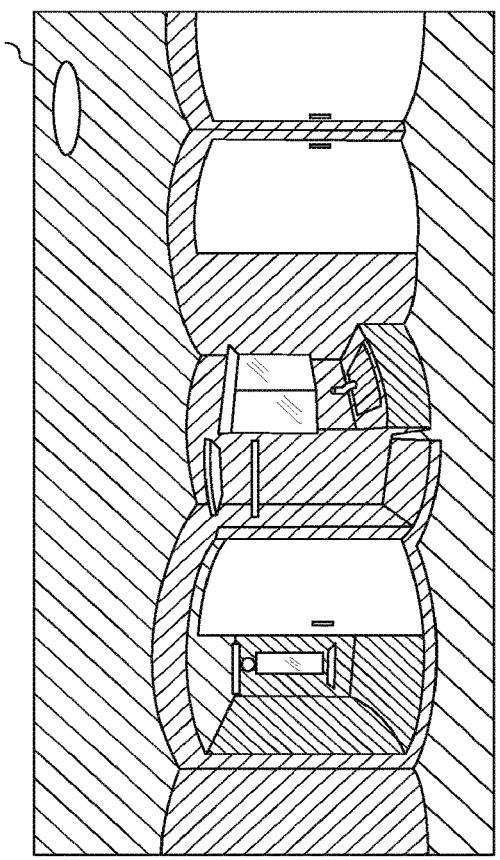
Figure 16A:
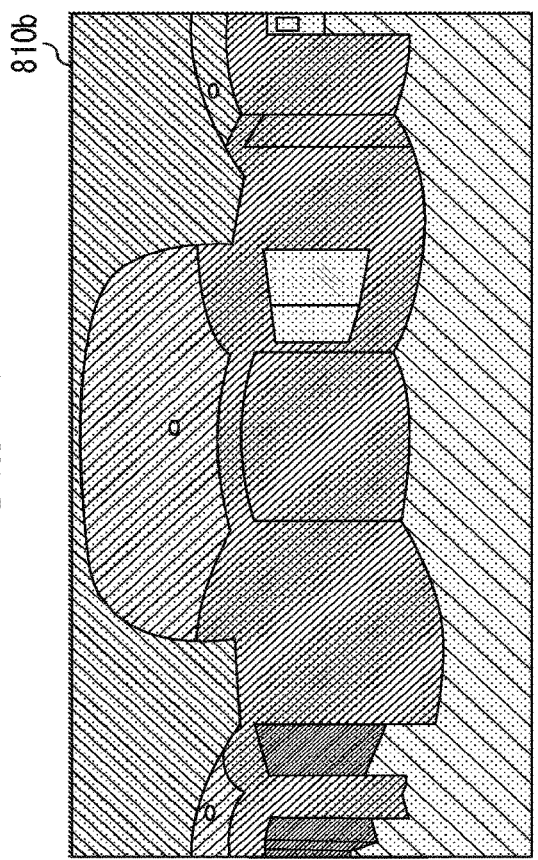
FIGS. 16A to 16D are illustrations of the images on which the clustering process has been performed, according to the first embodiment.
Figure 16B:
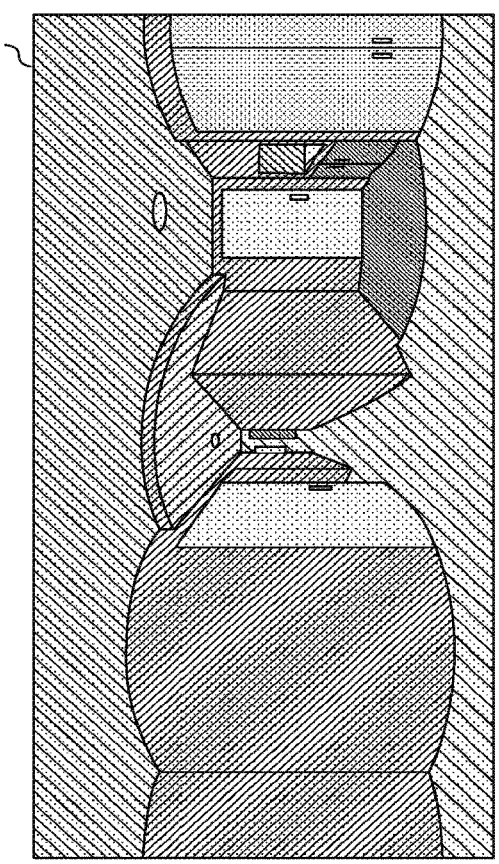
Figure 16C:
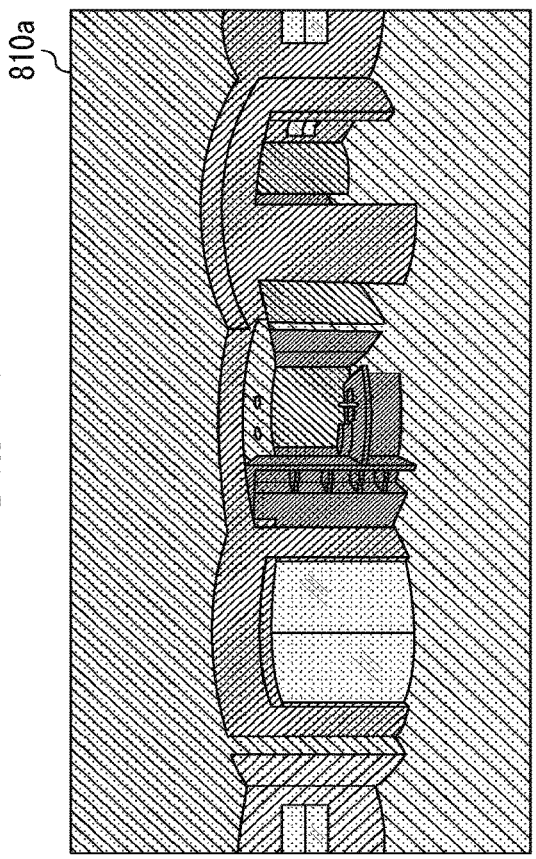
Figure 16D:
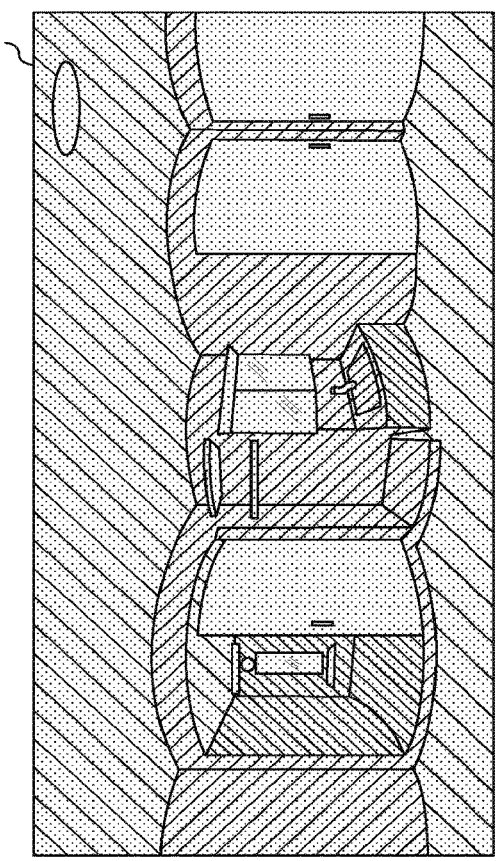

The process of calculating a representative pixel value is described in detail with reference to FIG. 14. FIG. 14 is a flowchart of an example of the process of calculating a representative color performed by the image processing apparatus according to the first embodiment. First, in step S102*a*-1, the representative pixel value calculation unit 131*a* calculates each pixel value of the pixels constituting the captured image 800 associated with the captured-image data 200 read by the image processing unit 12.

In step S102*a*-2, the representative pixel value calculation unit 131*a* classifies pixel values of the captured-image data 200 into a plurality of clusters through the clustering process on the calculated pixel values. The clustering process is performed by unsupervised learning using the calculated pixel value, for example. Unsupervised learning is a method of classifying predetermined data without an external standard such as labeling. Unsupervised learning is, for example, a technique such as K-means clustering (K-average method). The representative pixel value calculation unit 131*a* classifies the pixel values of the pixels constituting the captured image 800 associated with the captured-image data 200 into a predetermined number of clusters, so that regions belonging to the same cluster are expressed by the same color. The following describes the clustering process in step S102-2*a* with reference to FIGS. 15A to 15D and 16A to 16D. FIGS. 15A to 15D are illustrations of the captured images according to the first embodiment. FIGS. 16A to 16D are illustrations of the images on which the clustering process has been performed, according to the first embodiment. Processed images 810*a* to 810*d* illustrated in FIGS. 16A to 16D are obtained by performing the clustering process on the captured images 800*a* to 800*d* (see FIGS. 15A to 15D) associated with different pieces of captured-image data 200*a* to 200*d* so as to divide pixel values as input data into a plurality of clusters (regions). The representative pixel value calculation unit 131*a* divides the pixel values of each of the captured images 800*a* to 800*d* into groups based on a predetermined distance scale, so that each group includes approximate pixel values. The distance measure employs a spatial distance of pixel values (RGB values) for each pixel.

Next, in step S102*a*-3, the representative pixel value calculation unit 131*a* calculates a representative pixel value that is a pixel value representing each cluster. The representative pixel value calculation unit 131*a* calculates, as a representative pixel value, the cluster central pixel that is the center of each of the clusters into which the pixel values are grouped by the process of the step S102*a*-2. Further, the representative pixel value calculation unit 131*a* calculates the number of pixels belonging to each cluster. This is achieved with information regarding the cluster that each pixel (pixel value) belongs to, through the clustering process using the K-means method in step S102*a*-2. The relation between pixels (pixel values) and clusters is referred to as labeling information. The representative pixel value calculation unit 131*a* calculates the number of pixels belonging to each cluster based on the labeling information.

In step S102*a*-4, the storage/read unit 19 stores, in the pixel-value management DB 1001, the number of pixels in associated with the representative pixel value for each cluster. As illustrated in FIG. 9, the number of pixels included in each cluster and the cluster central pixel that is the representative pixel value of the corresponding cluster for each cluster number are stored in association with each other in the representative-color management table of the pixel-value management DB 1001.

Accordingly, the image processing apparatus 10*a* calculates, for each captured image 800 associated with the piece of captured-image data 200, a representative pixel value indicating a feature of a color representing a cluster. The cluster is obtained by performing the clustering process on each pixel value of pixels constituting the captured image 800 associated with the piece of the captured-image data 200.

Returning to FIG. 13, the description of the process of calculating the correction parameter is continued. In step S103*a*, the representative-color determination unit 132*a* of the image processing apparatus 10*a* determines (selects), as a representative color of the captured-image data 200, the representative pixel value of the cluster in which the greatest number of pixels are included, among the representative pixel values calculated by the representative pixel value calculation unit 131*a*. The representative color is a pixel value indicating a feature of a color that represents a piece of captured-image data 200 determined based on each pixel value of the pixels constituting the captured image 800 associated with the captured-image data 200. For example, in the case of the processing result indicated by the representative-color management table in FIG. 9, the representative color of the captured-image data 200 (for example, the captured image 800*a* illustrated in FIG. 15A) identified by the image ID "P01" is the cluster central pixel (representative pixel value) of (R, G, B)=(109, 107, 100) with cluster No. 1. Further, the representative color of the captured-image data 200 (for example, the captured image 800*b* illustrated in FIG. 15B) identified by the image ID "P02" is the cluster central pixel (representative pixel value) of (R, G, B)=(118, 108, 96) with cluster No. 1. Further, the representative color of the captured-image data 200 (for example, the captured image 800*c* illustrated in FIG. 15C) identified by the image ID P03" is the cluster central pixel (representative pixel value) of (R, G, B)=(127, 115, 86) with cluster No. 3. Further, the representative color of the captured-image data 200 (for example, the captured image 800*d* illustrated in FIG. 15D) identified by the image ID "P04" is the cluster central pixel (representative pixel value) of (R, G, B)=(115, 110, 102) with cluster No. 2.

The method of calculating the representative color is not limited to this, and the representative color of the captured-image data 200 may be determined from a weighted average of the number of the pixels included in each cluster. For example, when there is a plurality of clusters including the greatest number of pixels, the representative-color determination unit 132a may determine, as the representative color, the average value or the median value of the cluster central pixels (representative pixel values) of the clusters including the greatest number of pixels.

In step S104a, the storage/read unit 19 stores the representative color determined by the representative-color determination unit 132a in the correction-parameter management DB 1003. As illustrated in FIG. 11, the pixel value of the representative color corresponding to the captured-image data 200 is stored for each image ID for identifying the captured-image data 200, in the correction-parameter management table.

In step S105a, when the image processing apparatus 10a has read all of the pieces of captured-image data 200 received by the network communication unit 11, the process proceeds to step S106a. When the captured-image data 200 that has not been read yet remains among the captured-image data 200 received by the network communication unit 11, the process returns to step S101a.

In step S106a, the calculation unit 13a of the image processing apparatus 10a calculates a general representative color using the representative color determined by the process in step S103a. The general representative color is a pixel value indicating a feature of a color that represents a plurality of pieces of captured-image data 200, determined based on the representative colors of the plurality of pieces of captured-image data 200.

Figure 17:
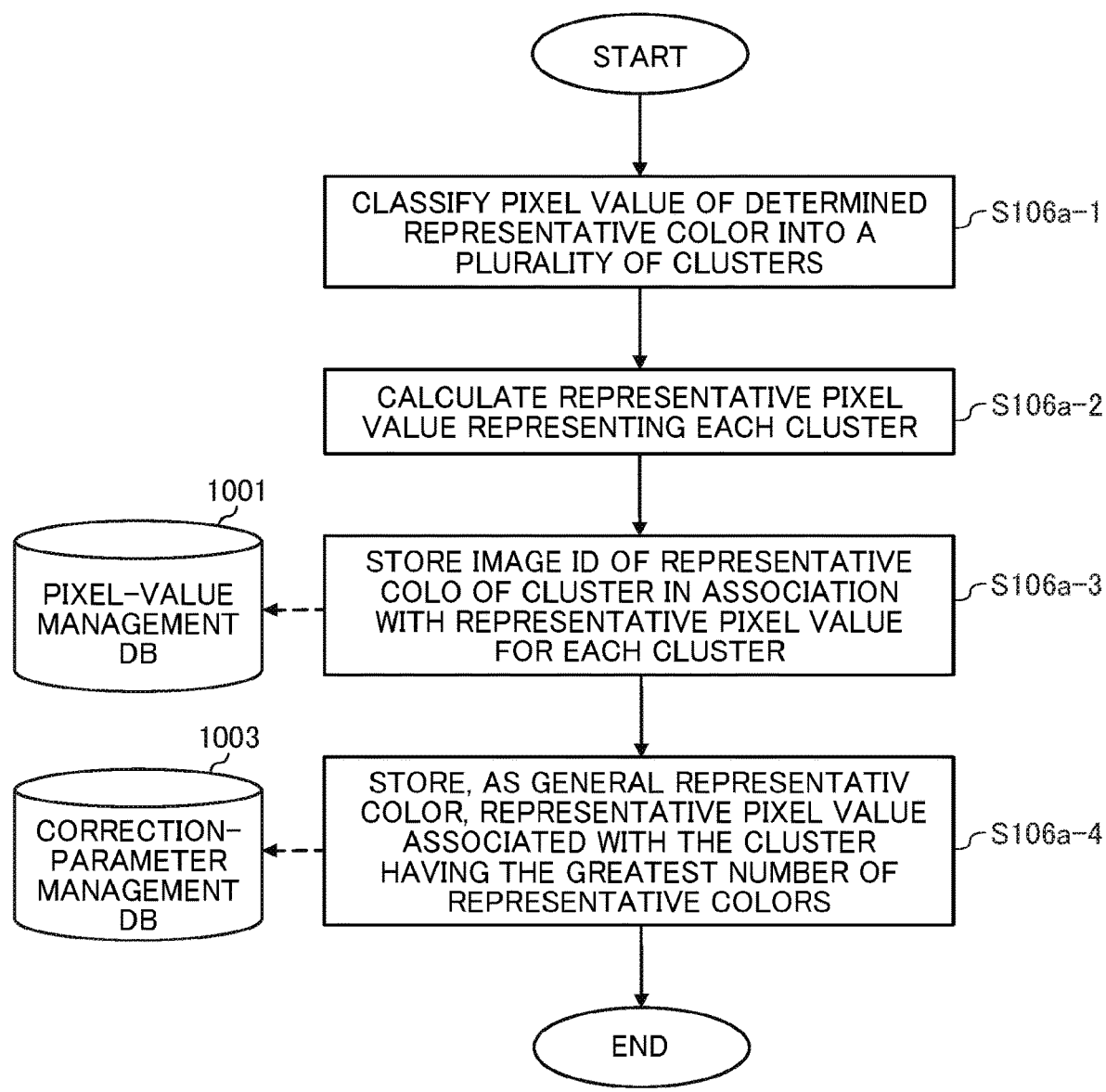
FIG. 17 is a flowchart of an example of the process of calculating a general representative color performed by the image processing apparatus according to the first embodiment.
Figure 18A:
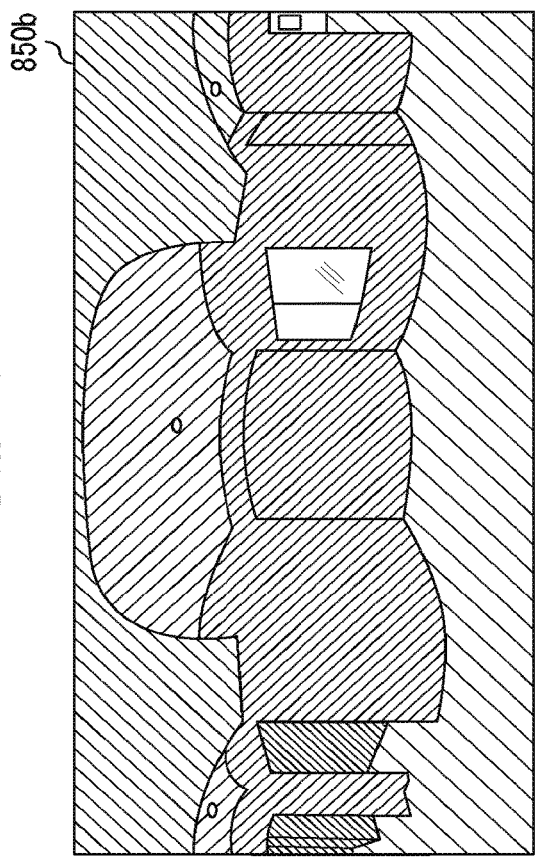
FIGS. 18A to 18D are illustrations of examples of a corrected image according to the first embodiment.
Figure 18B:
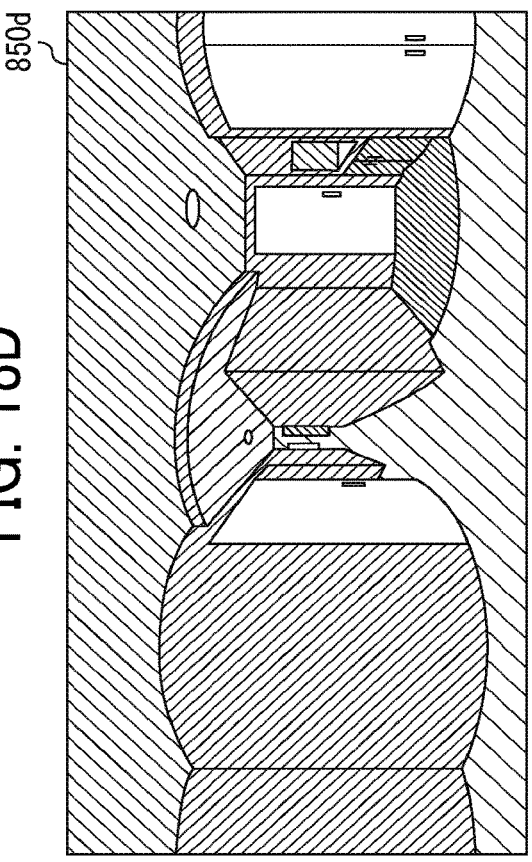
Figure 18C:
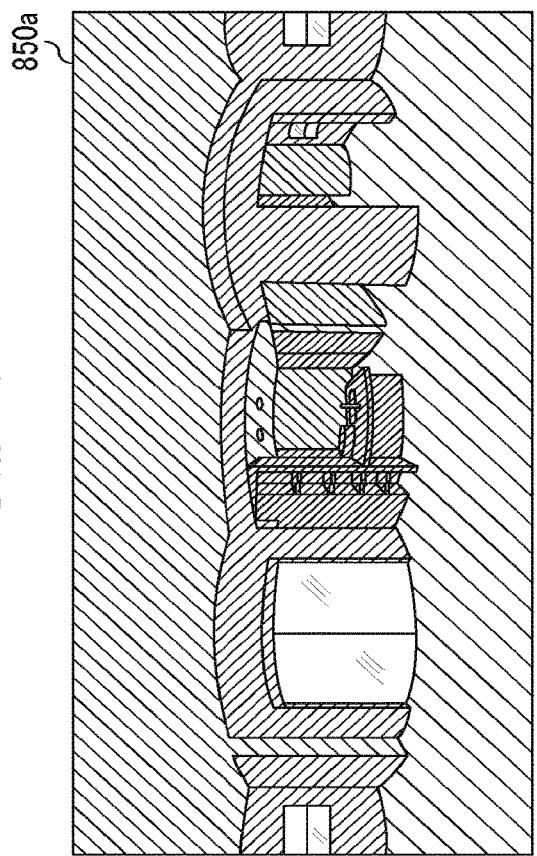
Figure 18D:
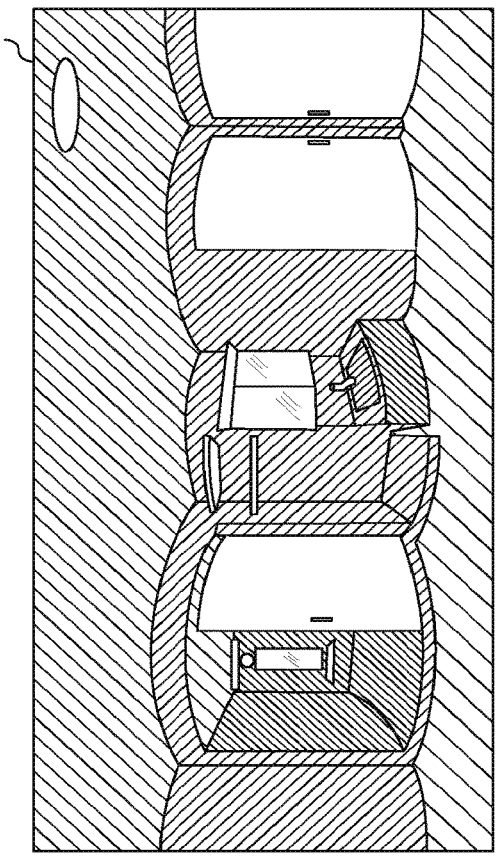

The process of calculating a general representative color is described in detail with reference to FIG. 17. FIG. 17 is a flowchart of an example of the process of calculating a general representative color performed by the image processing apparatus according to the first embodiment.

In step S106a-1, the general representative color calculation unit 133a classifies the pixel values into a plurality of clusters by performing the clustering process on the pixel values indicated by the representative colors determined by the representative-color determination unit 132a. The clustering process is performed using the K-average method, similarly to the clustering process (see step S102a-2) by the representative pixel value calculation unit 131a. In this case, the input data is pixel values of a plurality of representative colors determined by the representative-color determination unit 132a, and is grouped into clusters using the distances in a space of the pixel values (RGB values).

Next, in step S106a-2, the general representative color calculation unit 133a calculates a representative pixel value that is a pixel value representing each divided cluster. The general representative color calculation unit 133a calculates, as a representative pixel value, the cluster central pixel that is the center of each of the clusters into which the pixel values are grouped by the process of the step S106a-1.

In step S106a-3, the storage/read unit 19 stores, in the pixel-value management DB 1001, the representative pixel value of the representative color belonging to each cluster in association with the corresponding image ID for each cluster. As illustrated in FIG. 10, the cluster central pixel that is the representative pixel value of each cluster is stored and managed in association with the image ID in the general-representative-color management table of the pixel-value management DB 1001.

In step S106a-4, the storage/read unit 19 stores, as a general representative color, the representative pixel value associated with the cluster, in which the greatest number of representative colors are included, in the correction-parameter management DB 1003. As illustrated in FIG. 11, the general representative color indicating a feature of a color that represents a plurality of pieces of captured-image data 200 is stored and managed in the correction-parameter management table of the correction-parameter management DB 1003. For example, in the case of the processing result indicated by the general-representative-color management table in FIG. 10, the general representative color is the cluster central pixel of (R, G, B)=(114, 108, 99) with cluster No. 1.

Accordingly, the general representative color calculation unit 133a calculates a general representative color indicating a feature of a color representing a plurality of pieces of captured-image data 200 based on the representative colors of all the pieces of the captured-captured-image data 200 acquired by the image processing unit 12. Note that the method for calculating the general representative color is not limited to the method illustrated in FIG. 17. Alternatively, for example, the general representative color may be obtained from a simple average of a plurality of representative colors determined by the representative-color determination unit 132a. Further, the general representative color calculation unit 133a may calculate a general representative color, using only the representative color whose brightness, color tone, or color saturation falls within a standard range among a plurality of representative colors determined by the representative-color determination unit 132a.

Returning to FIG. 13, the description of the process of calculating the correction parameter is continued. In step S107a, the RGB gain calculation unit 134a calculates an RGB gain value as a correction parameter based on the representative color determined by the representative-color determination unit 132a and the general representative color calculated by the general representative color calculation unit 133a. Specifically, the RGB gain calculation unit 134a calculates a correction parameter by dividing the general representative color by the representative color. Note that the correction parameter is an RGB gain value, by which each pixel value of the pixels constituting the captured image 800 associated with a piece of captured-image data 200 is multiplied. The correction parameter is calculated for each set of the captured-image data 200. Further, since the general representative color is one representative color calculated based on the representative color representing each captured-image data 200, it can be said that the general representative color is a pixel value representing a data set of a plurality of captured-image data 200. In other words, the image processing apparatus 10a corrects the brightness and color tone based on a plurality of pieces of captured-image data 200 by correcting the pixel value of each of the captured image 800, assuming that the general representative color calculated by the general representative color calculation unit 133a is a target value of the correction of brightness and color tone.

As described above, in the process of step S15 in FIG. 12, the correction unit 14 performs the color correction on each of the plurality of pieces of captured-image data 200. The correction unit 14 multiplies each pixel value of the pixels constituting the captured image 800 related to the piece of the captured-image data 200 by an RGB gain value that is a correction parameter, so as to generate corrected-image data whose brightness and color tone have been corrected. Since the RGB value of each pixel has information on both brightness and color tone, both the brightness and the color tone can be changed by multiplying each pixel value of the pixels constituting the captured image 800 associated with the captured-image data 200 by the RGB gain value that is a correction parameter. Further, when a value (multiplication result) that exceeds the maximum value of 255 of the 8-bit image is obtained, the correction unit 14 may execute a process of clipping the value to 255.

The following describes the corrected image displayed on the display terminal 90. FIGS. 18A to 18D are illustrations of examples of a corrected image according to the first embodiment. The corrected images 850a to 850d illustrated in FIGS. 18A to 18D are images obtained by performing the color correction on each of the captured images 800a to 800d (see FIGS. 15A to 15D). With the color correction, the corrected image 850a to 850d can be displayed without variation in brightness and color tone between a plurality of images as illustrated in FIGS. 18A to 18D.

Figure 20:
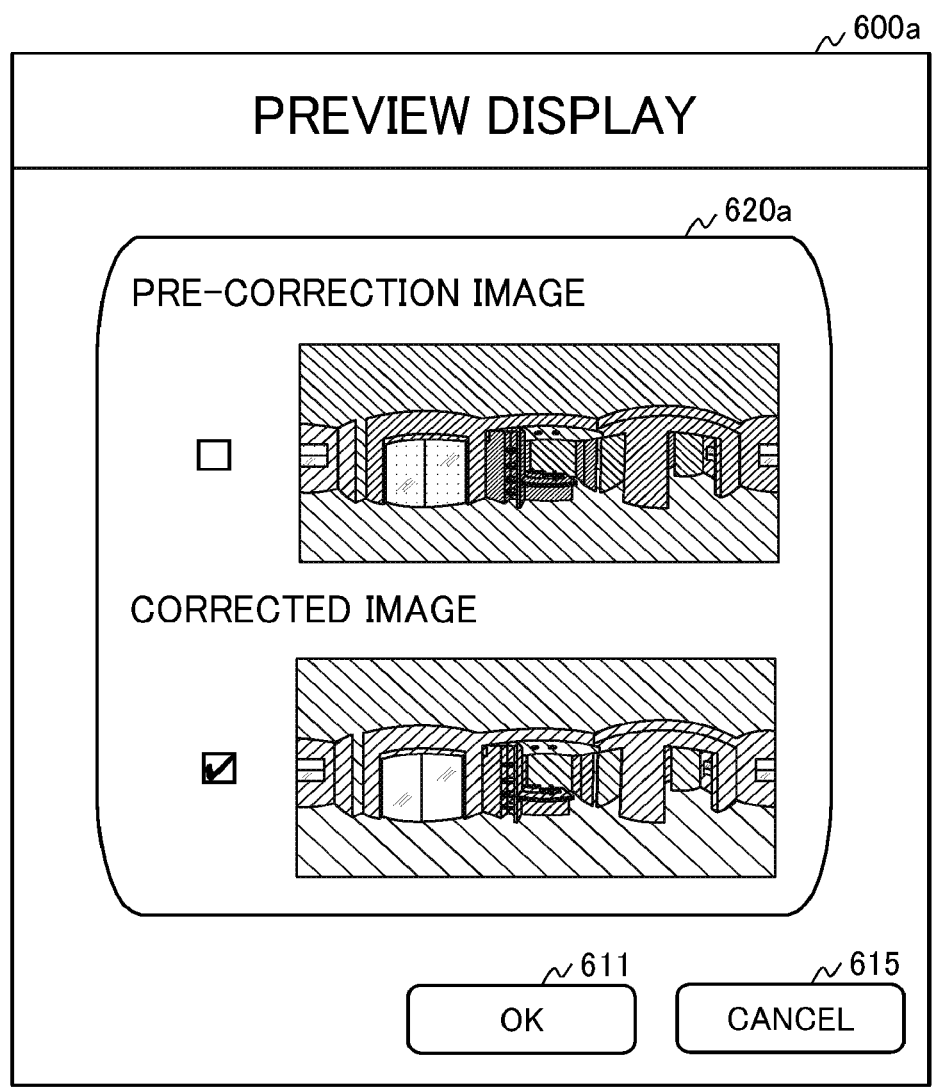
FIG. 20 is an illustration of an example of the preview screen according to the first embodiment.

The process of causing the user (the administrator X in FIG. 1) using the communication terminal 50 to check in advance an image to be provided to another user (the viewer Y in FIG. 1), with reference to FIGS. 19 and 20. FIG. 19 is a sequence diagram of an example of the process of displaying a preview image in the communication terminal according to the first embodiment. The process in FIG. 19 is performed after the process of step S14 in FIG. 12 is performed. Note that the process in FIG. 19 may be omitted.

In step S151, the display screen generation unit 16 of the image processing apparatus 10a generates preview image data. Specifically, when the calculation unit 13a calculates a correction parameter, the correction unit 14 of the image processing apparatus 10a performs color correction on image data using the image data whose size has been resized (reduced) to a predetermined size in step S101a of FIG. 13. The display screen generation unit 16 generates preview image data including image data whose color has been corrected using the correction parameter.

In step S152, the network communication unit 11 of the image processing apparatus 10a transmits preview image data to the communication terminal 50 via the communication network 5. Accordingly, the network communication unit 51 of the communication terminal 50 receives the preview screen data.

In step S153, the display control unit 54 of the communication terminal 50 causes the display 908 to display the preview screen 600a associated with the preview image data received by the network communication unit 51.

Referring to FIG. 20, the preview screen 600a is described. FIG. 20 is an illustration of an example of the preview screen according to the first embodiment. The preview screen 600a illustrated in FIG. 20 includes a display image selection area 620a that enables a selection of an image to be provided to a user (the viewer Y), an OK button 611, and a cancel button 615. The OK button 611 is pressed to perform the color correction that corresponds to the selected image. The cancel button is pressed to cancel the selection process. In the display image selection area 620a, two pieces of preview image data before and after color correction are displayed, so that these two pieces of image data can be selected. In the example of FIG. 20, a pre-correction image (for example, captured images 800 in FIGS. 15A to 15D) that is before the color correction in step S151 and a corrected image (for example, corrected images 850 in FIGS. 18A to 18D) on which the color correction has been performed are displayed in the display image selection area 620a. Accordingly, the user (for example, the administrator X in FIG. 1) using the communication terminal 50 checks the preview screen 600a displayed on the display 517 and selects an image to be provided to another user (the viewer Y in FIG. 1) from the images having different degrees of brightness and color tone. In FIG. 20, the pre-correction image and the corrected image, which are associated with one captured image 800, are indicated. Alternatively, the pre-correction image and the corrected image associated with a plurality of captured images 800 may be displayed side by side so that it is easier to recognize the difference in the degree of the brightness and color tone between the plurality of captured images 800.

In step S154, the reception unit 53 of the communication terminal 50 receives a selection for the display image selection area 620a and the OK button 611 on the preview screen 600a. In the example of FIG. 20, the reception unit 53 receives a selection of the corrected image, for example.

In step S155, the network communication unit 51 of the communication terminal 50 transmits the information on the selection result received by the reception unit 53 to the image processing apparatus 10a via the communication network 5. The network communication unit 11 of the image processing apparatus 10a receives the information on the selection result. In response to the reception of the selection result, the image processing apparatus 10a performs the color correction on the captured-image data 200 using a correction parameter corresponding to an image associated with the received selection result as indicated in step S15 in FIG. 12.

Note that the image processing apparatus 10a may calculate different correction parameters for the same captured-image data 200, and display a plurality of corrected images whose colors have been corrected with the different correction parameters, on the preview screen 600a. In this case, the user of the communication terminal 50 can select an image, whose color has been optimally corrected, from the plurality of corrected images with different patterns. The different correction parameters may be adjustable (set) according to environmental conditions such as the brightness of the site P and the shooting conditions of the image capturing device 30. In the above-described process in FIG. 19, the preview screen 600a is displayed on the communication terminal 50. Alternatively, the image processing system 1a may display the preview screen 600a on the display terminal 90. In the process of FIG. 19, the preview image data is generated using the image data whose size has been resized (reduced). Alternatively, the image processing apparatus 10a may generate preview image data using actual image data (the captured-image data 200).

The image processing system 1a according to the first embodiment determines a representative color for each of the captured images 800 associated with the plurality of pieces of captured-image data 200 having different degrees of brightness and color tone, and calculates a general representative color representing the determined representative colors.

The image processing system 1a calculates, for each set of captured-image data 200, a correction parameters for the color correction using the representative color of each of the captured images 800 and the general representative color of the plurality of the captured images 800. Then, the image processing system 1a performs the color correction on the captured-image data 200 using the calculated correction parameters. As a result, the image processing system 1a can generate the corrected-image data 250 having the same degree of brightness and color tone from the plurality of pieces of captured-image data 200 having different degrees of brightness and color tone.

The image processing system according to a second embodiment is described below. The same configurations and functions as those in the first embodiment are denoted by the same reference numerals, and the description thereof is omitted. The image processing system 1b according to the second embodiment performs the brightness correction using the luminance value of the captured image 800 associated with the captured-image data 200, instead of the image processing system 1a's performing the color correction using the correction parameter calculated based on the general representative color.

Figure 21:
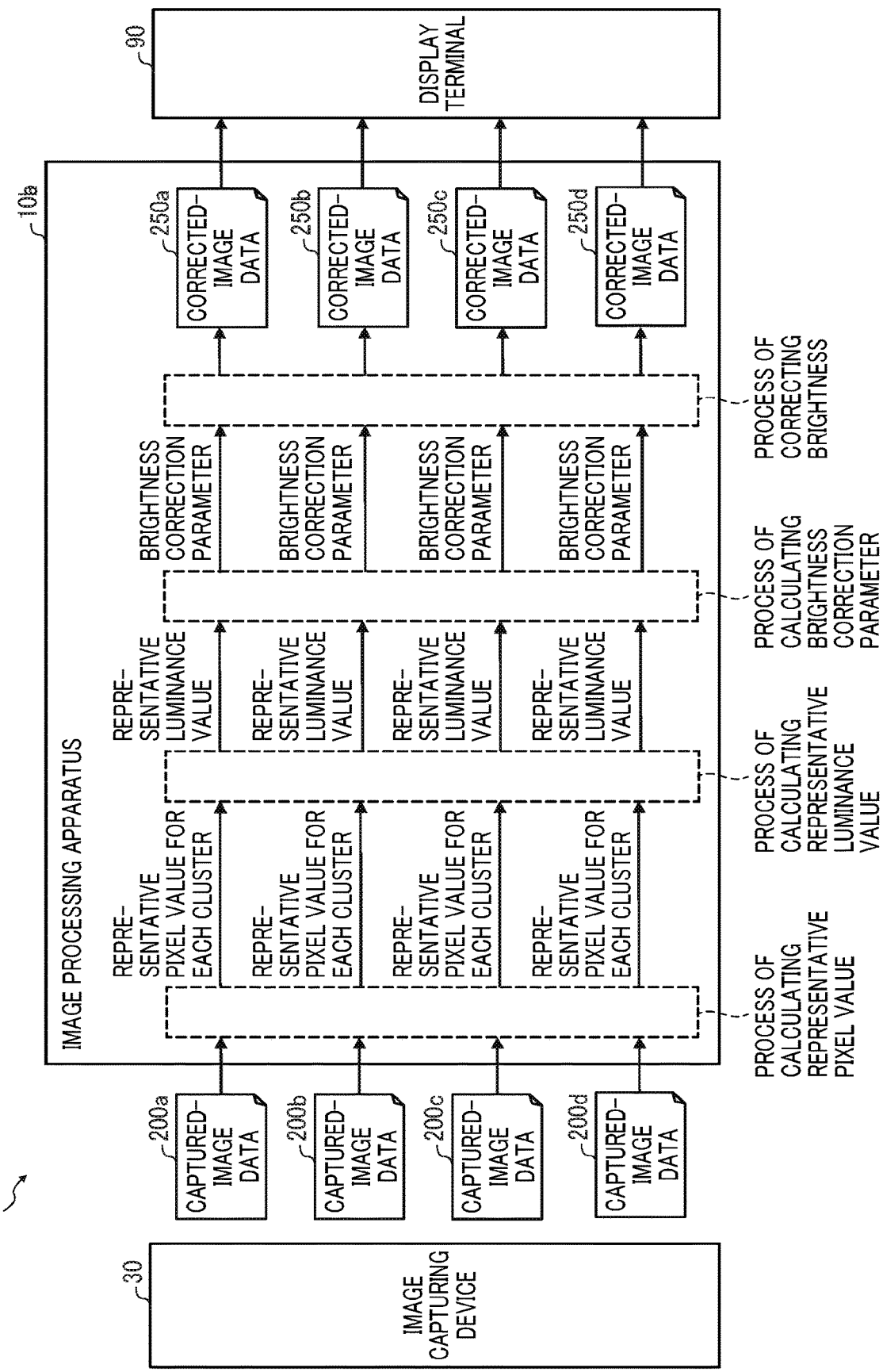
FIG. 21 is a diagram illustrating an example of a process of the image processing system according to the second embodiment.

FIG. 21 is a block diagram of an example of the image processing system according to the second embodiment. FIG. 21 is an illustration of a schematic configuration of the image processing system 1b according to the second embodiment. The functions implemented by the image processing system 1b are described in detail with reference to the figure to be described later.

First, the image processing apparatus 10b acquires a plurality of pieces of captured-image data 200 (200a, 200b, 200c, 200d) in which different subjects are captured by the image capturing device 30. The image processing apparatus 10b calculates, for each cluster, a representative pixel value indicating a feature of a color representing a cluster obtained by the clustering process performed on each pixel value of the pixels constituting the captured image 800 associated with the acquired captured-image data 200.

Next, the image processing apparatus 10b calculates, for each set of the captured-image data 200, a representative luminance value indicating the luminance characteristics that represent the corresponding set of the captured-image data 200, using the representative pixel value calculated by the process of calculating a representative pixel value. Then, the image processing apparatus 10b calculates, for each piece of captured-image data 200, a brightness correction parameter for the brightness correction to be performed on the brightness of the captured-image data 200 using the representative luminance value calculated by the process of calculating a representative luminance value.

The image processing apparatus 10b performs the brightness correction on each set of captured-image data 200 using the brightness correction parameter calculated by the process of calculating a brightness correction parameter. Then, the image processing apparatus 10b transmits the corrected-image data 250 (250a, 250b, 250c, 250d) whose brightness has been corrected, to the display terminal 90. In response to receiving the data, the display terminal 90 displays the plurality of pieces of corrected-image data 250 in which different subjects are captured. This enables the user to check the images captured by the image capturing device 30 at the site P.

That is, the image processing system 1b calculates a representative luminance value of the captured image 800 associated with the captured-image data 200, and calculates a brightness correction parameter used for the brightness correction, using the calculated representative luminance value. Further, the image processing system 1a corrects the brightness of the captured image 800 using the calculated brightness correction parameter. As a result, the image processing system 1b can generate a corrected image 850 by correcting the brightness of the captured image 800. This provides an image correction that enables adjusting of the brightness of each captured image 800 according to the needs of a service provider or a user who desires to improve convenience for the users viewing the images.

As illustrated in FIG. 21, in the following description, the brightness correction is performed on each of captured images 800a associated with a plurality of pieces of captured-image data 200 captured by the image processing apparatus 10b. Alternatively, the image processing apparatus 10b may acquire one set of captured-image data 200 and perform the brightness correction on a captured image 800 associated with the acquired captured-image data 200 because the brightness correction according to the second embodiment is performed on each captured image 800.

The functional configuration of the image processing system according to the second embodiment is described.

Since the functions other than the calculation unit 13b implemented by the image processing apparatus 10b are the same as those of the image processing system 1a (see FIG. 7), the description thereof is omitted.

Figure 22:
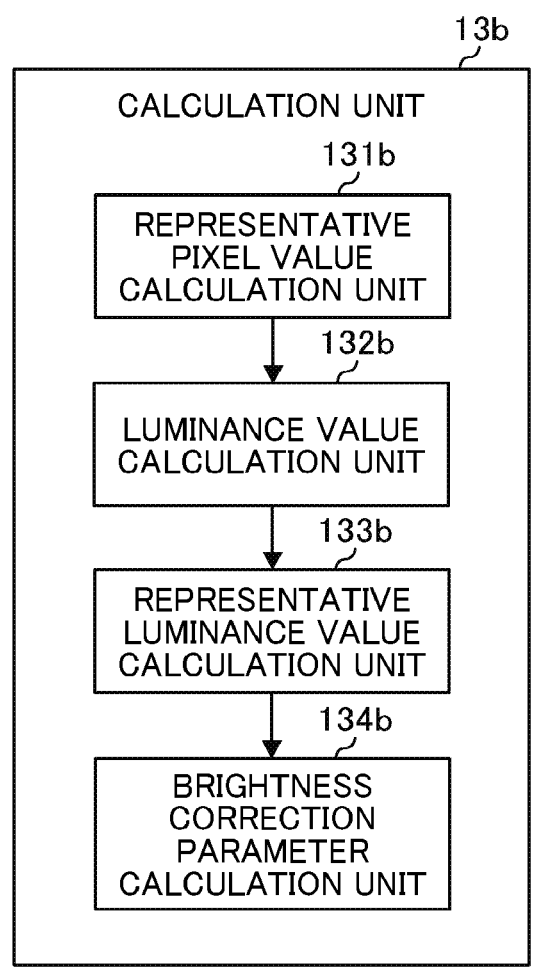
FIG. 22 is a functional block diagram of a calculation unit according to the second embodiment.

FIG. 22 is a block diagram of the functional configuration of the calculation unit according to the second embodiment. The calculation unit 13b illustrated in FIG. 22 includes a representative pixel value calculation unit 131b, a luminance value calculation unit 132b, a representative luminance value calculation unit 133b, and a brightness correction parameter calculation unit 134b. Note that, since the representative pixel value calculation unit 131b is the same as the representative pixel value calculation unit 131a, a description thereof is omitted.

The luminance value calculation unit 132b calculates a luminance value based on the representative pixel value calculated by the representative pixel value calculation unit 131b. The luminance value calculation unit 132b converts each representative pixel value calculated by the representative pixel value calculation unit 131 into a luminance value.

The representative luminance value calculation unit 133b calculates a representative luminance value for each set of captured-image data 200 using the luminance value calculated by the luminance value calculation unit 132b. The representative luminance value is a luminance value indicating the luminance characteristics that represent the corresponding set of the captured-image data 200. The representative luminance value calculated by the representative luminance value calculation unit 133b is an example of a first representative luminance value.

The brightness correction parameter calculation unit 134b calculates a brightness correction parameter for correcting the brightness of the captured image 800, using the representative luminance value calculated by the representative luminance value calculation unit 133b. The brightness correction parameter calculation unit 134b calculates the brightness correction parameter using the representative luminance value and a look up table (LUT) (see FIG. 25) stored in the storage unit 1000.

FIG. 23 is an example of a representative luminance value management table according to the second embodiment. The representative luminance value management table in FIG. 23 constitutes the image-value management DB 1001 included in the storage unit 1000. In the representative luminance value management table in FIG. 23, the luminance value is managed in association with the image ID for identifying each set of the captured-image data 200. The luminance value is calculated based on the result of the clustering process performed on each pixel value of the pixels constituting the captured image 800 associated with the captured-image data 200. In the representative luminance value management table, the cluster No. for identifying divided clusters, the number of pixels included in a cluster, the central pixel of the cluster, and the luminance value calculated using the cluster central pixel are stored and managed in association with each other. Further, in the representative luminance value management table, the representative luminance value indicating the luminance characteristics that represent a corresponding set of captured-image data 200 is stored and managed for each set of captured-image data 200. Specific process for obtaining the result illustrated in FIG. 23 is described later.

The processes and operations of the image processing system 1b according to the second embodiment are described with reference to FIGS. 24 to 26. The processes other than the process of calculating a correction parameter at step S14 in FIG. 12 are the same as the processes or operations of the image processing system 1a, and the description thereof is omitted.

Figure 24:
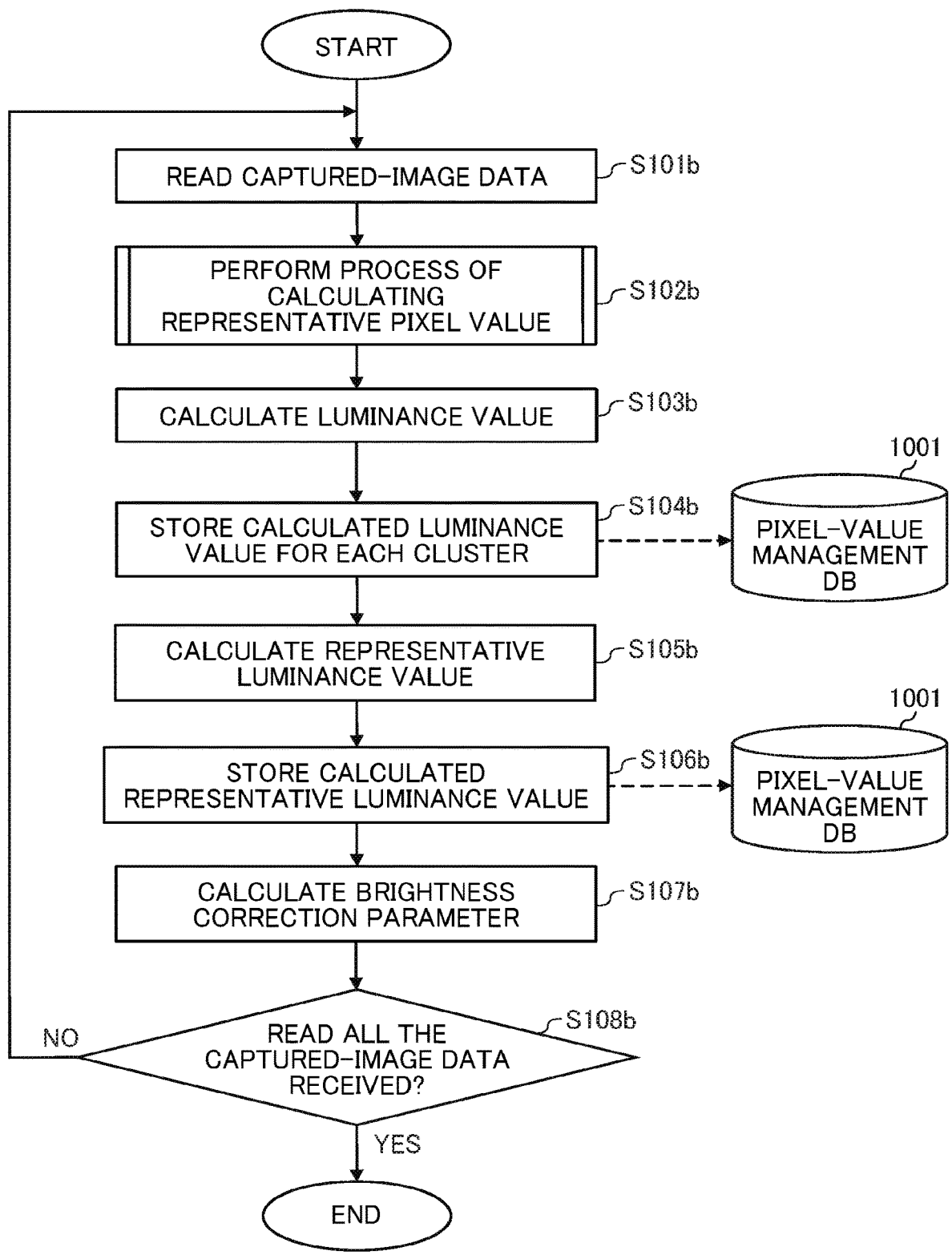
FIG. 24 is a flowchart for explaining an example of a process of calculating a correction parameter performed by the image processing apparatus according to the second embodiment.

FIG. 24 is a flowchart of an example of the process of calculating a correction parameter performed by the image processing apparatus according to the second embodiment. Note that the processes in step S101b and the in step S102b are the same as those in steps S101a and S102a illustrated in FIG. 13, and the description thereof is omitted.

In step S103b, the luminance value calculation unit 132b of the calculation unit 13b calculates a luminance value of each cluster using the cluster central pixel calculated by the representative pixel value calculation unit 131b. Specifically, the luminance value calculation unit 132b calculates a luminance value from the RGB pixel values using a known conversion formula. As an example of the conversion formula, the luminance value calculation unit 132b uses an ITU-RBT.601 conversion formula in Formula 1 below.

[Formula 1]

$$Y=0.299R+0.587G+0.114B \quad (1)$$

More appropriately, since the conversion formula changes depending on the color space in which the pixel value of the RGB is calculated, it is preferable that the luminance value calculation unit 132b selects the appropriate conversion formula and calculates the luminance value.

In step S104b, the storage/read unit 19 stores the number of pixels included in a cluster calculated by the representative pixel value calculation unit 131b, the cluster central pixel of the cluster, and the luminance value calculated by the luminance value calculation unit 132b in the pixel-value management DB 1001. As illustrated in FIG. 23, the number of pixels included in each cluster, the cluster central pixel of the corresponding cluster, and the luminance value are stored and managed in association with the image ID in the representative-luminance value management table of the pixel-value management DB 1001.

In step S105b, the representative luminance value calculation unit 133b calculates a representative luminance value indicating luminance characteristics representing the captured-image data 200 using the luminance value calculated by the luminance value calculation unit 132b. Specifically, the representative luminance value calculation unit 133b calculates a representative luminance value of the captured-image data 200 using k luminance values calculated by the luminance value calculation unit 132b and the number of pixels belonging to the corresponding cluster.

In this case, the representative luminance value calculation unit 133b calculates the representative luminance value from a weighted average using the number of pixels belonging to the cluster corresponding to the k luminance values. In this example, the case where the representative luminance value is calculated using the weighted average is described. However, no limitation is intended thereby. Alternatively, the representative luminance value may be calculated by increasing the weight of a cluster including a large number of pixels or decreasing the weight of a cluster including a small number of pixels, instead of using the weight based on the number of pixels.

In step S106b, the storage/read unit 19 stores the representative luminance value calculated by the representative luminance value calculation unit 133b, in the pixel-value management DB 1001. As illustrated in FIG. 23, the representative luminance value of the corresponding set of captured-image data 200 is stored and managed in association with the image ID for identifying each set of the captured-image data 200, in the pixel-value management DB 1001.

In step S107b, the brightness correction parameter calculation unit 134b calculates a brightness correction parameter for correcting the brightness of the captured-image data 200, using the representative luminance value calculated by the representative luminance value calculation unit 133b. The process of calculating a brightness correction parameter is described with reference to FIG. 25. FIG. 25 is a graph of a brightness correction parameter according to the second embodiment. FIG. 25 indicates the case where the LUT used to change the brightness of a captured image according to the representative luminance value calculated by the representative luminance value calculation unit 133b is calculated as a brightness correction parameter. FIG. 25 indicates three types of LUTs as an example of the brightness correction parameter. The LUT is used to convert input data into a form suitable for the processing. The horizontal axis indicates the input value and the vertical axis indicates the output value. In this case, the input data is the brightness (luminance value) of each set of captured-image data 200. In FIG. 25, the relation between the range of pixel values and the output is normalized to a value of 0-1. The example 1 is a LUT that greatly increases from a low luminance value to a high luminance value, the example 2 is a LUT in which the conversion is about half degree of the conversion of the example 1, and the example 3 is a LUT that linearly changes with no change in input/output.

The brightness correction parameter calculation unit 134b determines a LUT to be used, according to the representative luminance value calculated by the representative luminance value calculation unit 133b. For example, when the representative luminance value is less than 100, the brightness correction parameter calculation unit 134b calculates (adopts) the LUT of the example 1 because it is determined that the brightness of the image is low (dark). When the representative luminance value is greater than 150, the brightness correction parameter calculation unit 134b calculates (adopts) the LUT of the example 3 because it is determined that the brightness of the image is high (bright). Further, when the representative luminance value is greater than or equal to 100 and less than or equal to 150, the brightness correction parameter calculation unit 134b calculates (adopts) a LUT whose slope has been changed according to the value (representative luminance value). For example, the LUT of the example 2 is an example of the LUT where the representative luminance value is 125.

The brightness correction parameter calculation unit 134b selects an appropriate LUT as the brightness correction parameter according to the representative luminance value calculated by the representative luminance value calculation unit 133b, using a plurality of LUTs preliminarily stored in the storage unit 1000. Note that the brightness correction parameter calculation unit 134b may dynamically calculate the LUT having the input/output characteristics of an S-shape suitable for the correction of the brightness of the image, according to the calculated representative luminance value by using a sigmoid curved line (sigmoid function). FIG. 25 indicates the example of three types of LUTs (example 1 to example 3). However, no limitation is intended thereby. Alternatively, the brightness correction parameter calculation unit 134b may calculate a brightness correction parameter more precisely, using four or more types LUTs.

In step S108b, when the image processing unit 12 has not read all of the pieces of captured-image data 200 received by the network communication unit 11 (NO in step S108b), the image processing apparatus 10b returns to the process in step S101b. When the image processing unit 12 has read all of the pieces of captured-image data 200 received by the network communication unit 11 (YES in step S108b), the image processing apparatus 10b ends the process.

As a result, the correction unit 14 of the image processing apparatus 10b corrects the brightness of the captured-image data 200 using the brightness correction parameter calculated by the calculation unit 13b, as illustrated in step S15 of FIG. 12. In the brightness correction using the brightness correction parameter (LUT), when the captured-image data 200 is RGB data, for example, the RGB image format is converted into a YCbCr image format representing luminance and color difference, and the brightness correction parameter (LUT) is adapted only to the luminance, so that the brightness can be changed with the color tone maintained. Note that when the brightness correction parameter (LUT) is applied to each of the RGB pixels, an image, whose brightness has been changed to a substantially desired degree of brightness, can be generated although there is a slight change in the color tone.

The preview screen 600b is described with reference to FIG. 26. FIG. 26 is an example of a preview screen according to the second embodiment. Unlike the display image selection area 620a in FIG. 20, a display image selection area 620b included in a preview screen 600b in FIG. 26 displays preview image data associated with a plurality of pieces of captured-image data 200. In addition, the preview screen 600b displays a pre-correction image before the brightness correction and a corrected image whose brightness has been corrected for each piece of the captured-image data 200, so that the pre-correction image and the corrected image are selectable for each piece of the captured-image data 200. Accordingly, the user (for example, the administrator X in FIG. 1) using the communication terminal 50 checks the preview screen 600b displayed on the display 517 and selects an image to be provided to another user from the images having different degrees of brightness (images before and after the brightness correction).

Further, the user using the communication terminal 50 can check the images before and after the correction associated with the plurality of pieces of captured-image data 200 at the same time. With this configuration, for example, the user can select preview image data associated with each captured image 800 so as to prevent another user who views a plurality of captured images 800 from feeling uncomfortable. Note that the image processing apparatus 10b may be configured to display only a pre-correction image and a corrected image, which are associated with one set of the captured-image data 200, as displayed on the preview screen 600a in FIG. 20. Similarly, the image processing apparatus 10a according to the first embodiment may be configured to display pre-correction images and corrected images, which are associated with a plurality of pieces of the captured-image data 200, as displayed on the preview screen 600b in FIG. 26.

The image processing system 1b according to the second embodiment calculates a representative luminance value of a captured image 800 associated with a piece of captured-image data 200, and calculates a brightness correction parameter for the brightness correction using the calculated representative luminance value. Then, the image processing system 1b according to the second embodiment performs the brightness correction on the captured image 800 using the calculated brightness correction parameter. As a result, the image processing system 1b generates corrected-image data 250 in which only the brightness has been corrected from the captured-image data 200.

Next, an image processing system according to a first modification of the second embodiment is described. The image processing system 1bb according to the first modification of the second embodiment is a system that corrects the brightness of (performs the brightness correction on) a plurality of pieces of captured-image data using a general representative luminance value indicating the luminance characteristics that represent the plurality of pieces of captured-image data. The image processing system 1bb can perform the brightness correction on each of a plurality of captured images 800 based on the characteristics regarding the luminance of the plurality of captured images 800, as compared to the case where the brightness of each of a plurality of captured images 800 is corrected using the representative luminance value of the corresponding one of the captured images 800. Accordingly, the difference in the degree of brightness between a plurality of captured images 800 can be automatically adjusted to be uniformed when the user views the captured images 800. In the above-described image processing system 1b, the captured-image data 200 captured by the image processing apparatus 10b is one or more pieces of data. However, the image processing apparatus 10bb according to the first modification of the second embodiment is assumed to capture (acquire) a plurality of pieces of captured-image data 200 because the image processing system 1bb is configured to uniform the degree of brightness between a plurality of captured images 800.

The functional configuration of the image processing system according to the first modification of the second embodiment is described below. Since the functions other than the calculation unit 13bb implemented by the image processing apparatus 10bb are the same as those of the image processing system 1a (see FIG. 7), the description thereof is omitted.

Figure 27:
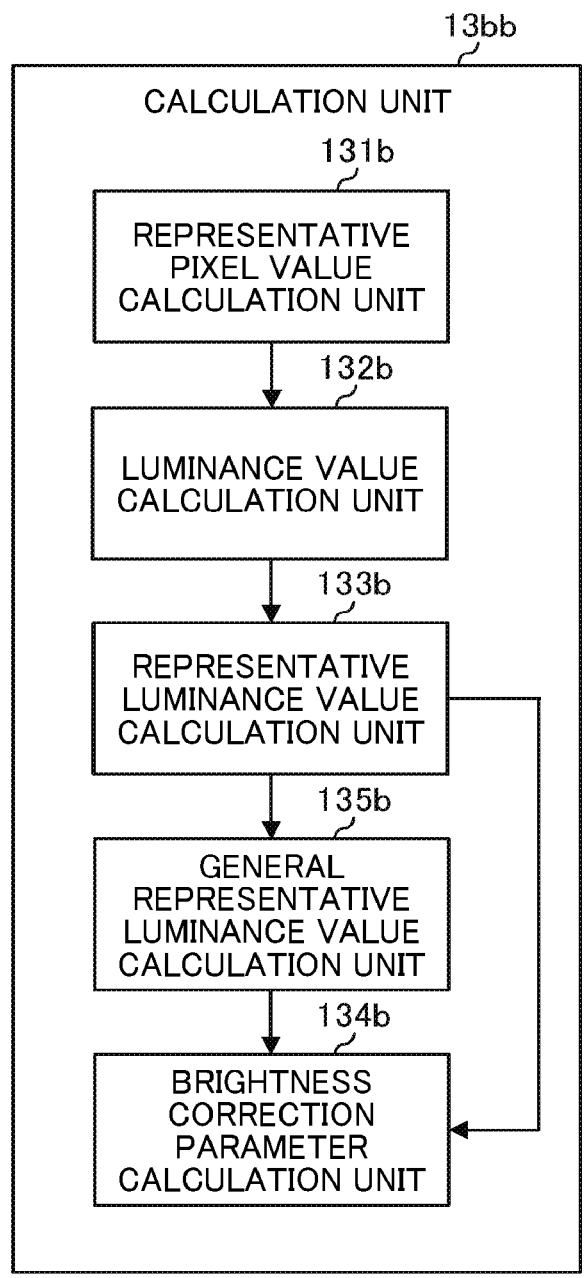
FIG. 27 is a block diagram of the functional configuration of the calculation unit according to the first embodiment of the second embodiment.

FIG. 27 is a block diagram of the functional configuration of the calculation unit according to the first embodiment of the second embodiment. The calculation unit 13bb illustrated in FIG. 27 includes a general representative luminance value calculation unit 135b in addition to the calculation unit 13b in FIG. 22.

The general representative luminance value calculation unit 135b calculates a general representative luminance value indicating the luminance characteristics that represent a plurality of pieces of captured-image data 200 using the representative luminance value calculated by the representative luminance value calculation unit 133b. The general representative luminance value calculated by the general representative luminance value calculation unit 135b is an example of a second representative luminance value.

The brightness correction parameter calculation unit 134b of the calculation unit 13bb calculates a brightness correction parameter for correcting the brightness of each captured image 800 based on the representative luminance value calculated by the representative luminance value calculation unit 133b and the general representative luminance value calculated by the general representative luminance value calculation unit 135b.

FIG. 28 is an example of a general representative luminance value management table according to the first modification of the second embodiment. The general representative luminance value management table in FIG. 28 constitutes the pixel-value management DB 1001 included in the storage unit 1000.

The general representative luminance value management table in FIG. 28 indicates the result of the clustering process performed on a plurality of representative luminance values calculated by the representative luminance value calculation unit 133b. In the general representative luminance value management table, the central luminance of a cluster (hereinafter, referred to also as cluster central luminance), which is the barycenter of the cluster, and the image ID for identifying the captured-image data 200 that corresponds to the representative luminance value of the corresponding cluster are stored and managed in association with each other for each cluster No. for identifying the divided clusters. In the example of FIG. 28, the cluster with the cluster number "1" has the cluster central luminance of "117.31771", and the representative luminance value that corresponds to one set of captured-image data 200 identified by the image ID "P01". In the example of FIG. 28, the cluster with the cluster number "2" has the cluster central luminance of "122. 58848", and the representative luminance value that corresponds to three pieces of captured-image data 200 identified by the image ID "P04".

FIG. 29 is an example of a correction-parameter management table according to the first modification of the second embodiment. The correction-parameter management table in FIG. 29 constitutes the correction-parameter management DB 1003 included in storage unit 1000. In the correction-parameter management table in FIG. 29, the representative luminance value calculated by the representative luminance value calculation unit 133b is stored and managed for each image ID for identifying the captured-image data 200. In the correction-parameter management table in FIG. 29, the general representative luminance value calculated by the general representative luminance value calculation unit 135b is stored and managed in common for a plurality of image IDs.

Figure 30:
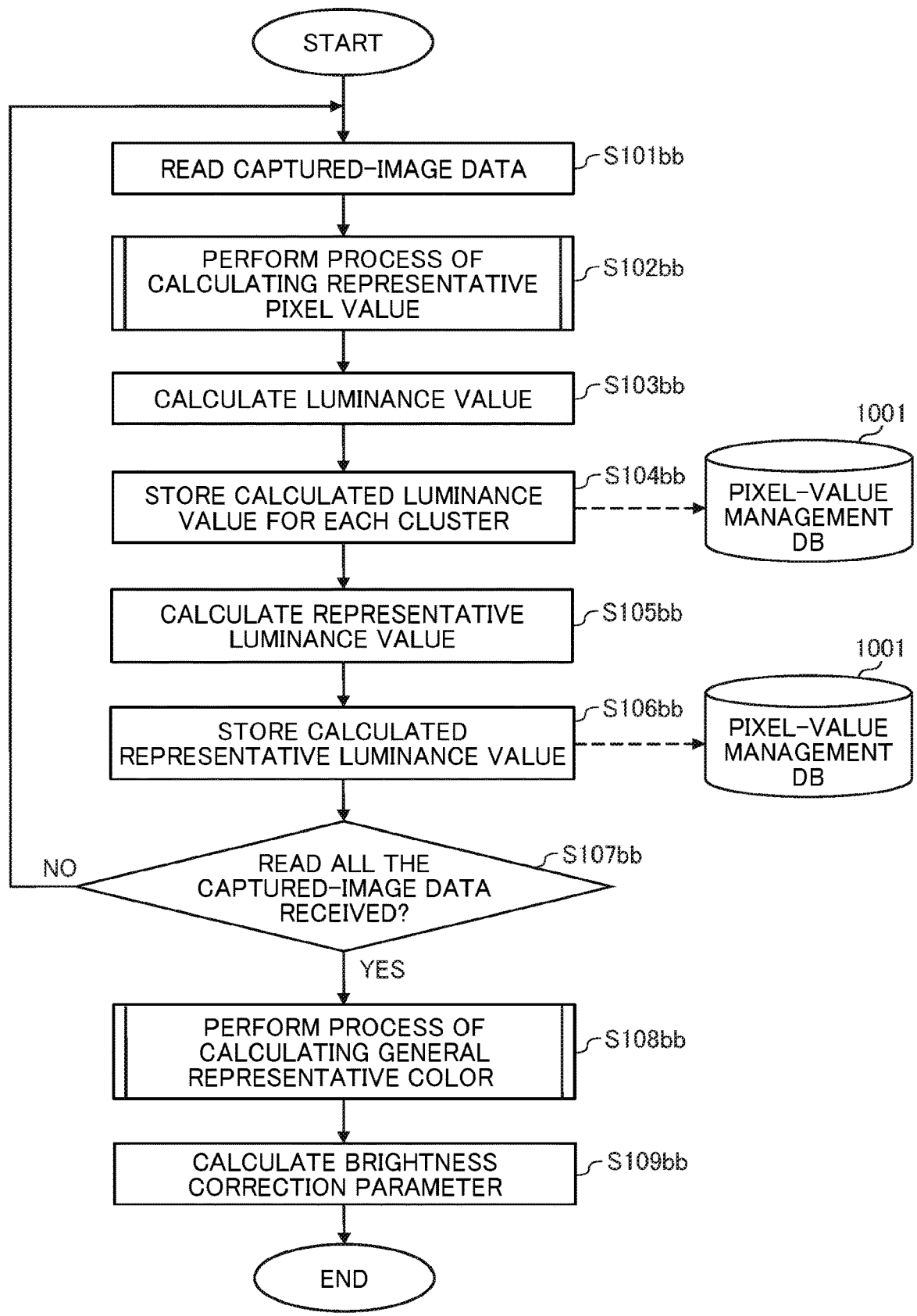
FIG. 30 is a flowchart of an example of the process of calculating a correction parameter performed by the image processing apparatus according to the first modification of the second embodiment.

The processes and operations of the image processing system 1bb according to the first modification of the second embodiment are described with reference to FIGS. 30 to 33. FIG. 30 is a flowchart of an example of the process of calculating a correction parameter performed by the image processing apparatus according to the first modification of the second embodiment. Note that the processes from step S101bb to step S106bb in FIG. 30 are the same as the processes from step S101b to step S106b illustrated in FIG. 24, and thus the description thereof is omitted.

In step S107bb, when the image processing unit 12 has not read all of the pieces of captured-image data 200 received by the network communication unit 11 (NO in step S107bb), the image processing apparatus 10bb returns to the process in step S101bb. When the image processing unit 12 has read all of the pieces of captured-image data 200 received by the network communication unit 11 (YES in step S107bb), the image processing apparatus 10bb proceeds to step S108bb.

Figure 31:
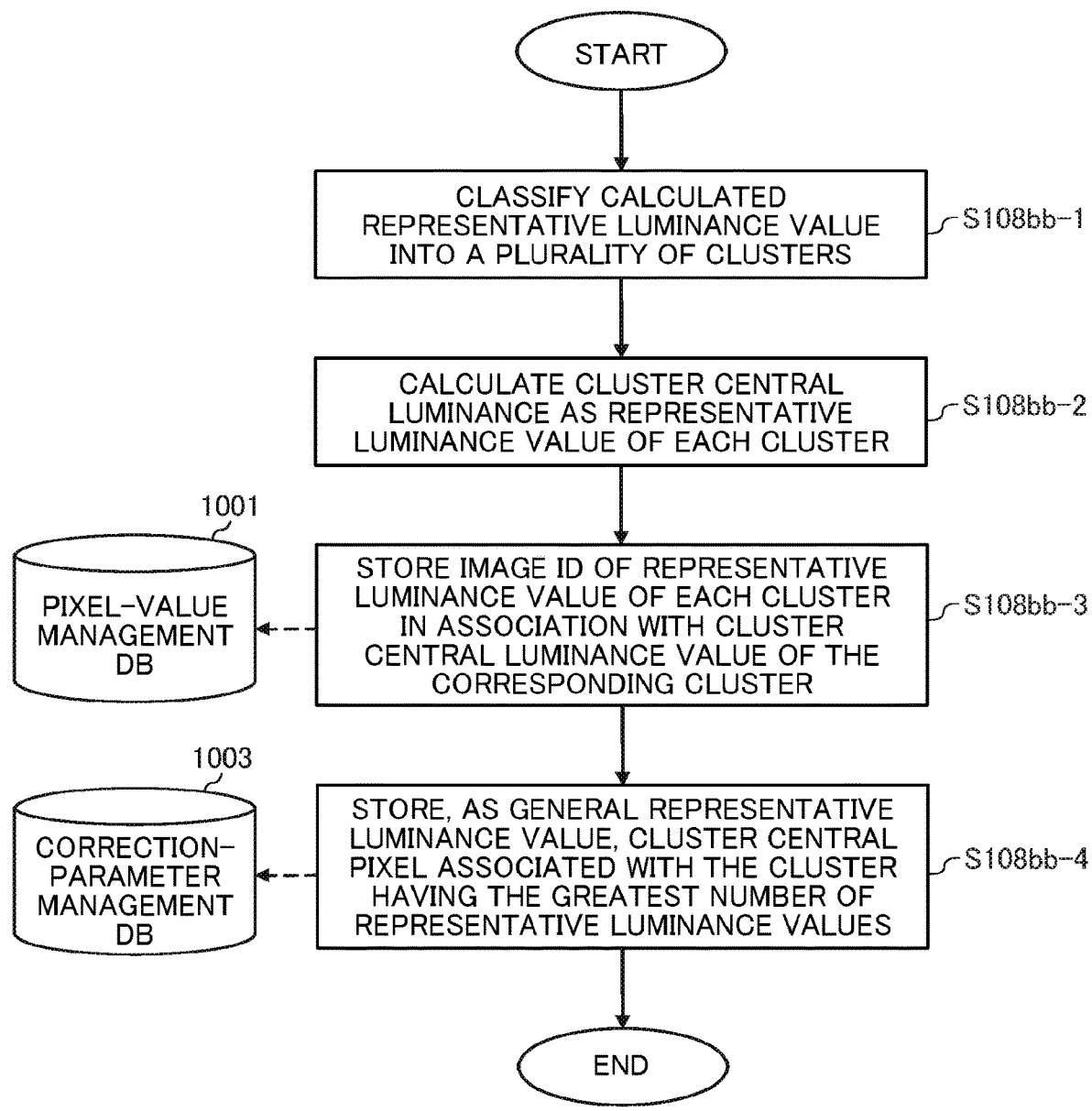
FIG. 31 is a flowchart of an example of the process of calculating a general representative luminance value performed by the image processing apparatus according to the first modification of the second embodiment.

In step S108bb, the calculation unit 13bb of the image processing apparatus 10bb calculates a general representative luminance value using the representative luminance value calculated in step S105bb. The process of calculating a general representative luminance value is described in detail with reference to FIG. 31. FIG. 31 is a flowchart of an example of the process of calculating a general representative luminance value performed by the image processing apparatus according to the first modification of the second embodiment.

In step S108bb-1, the general representative luminance value calculation unit 135b classifies the representative luminance values calculated by the representative luminance value calculation unit 133b into a plurality of clusters by the clustering process. The clustering process performed by the general representative luminance value calculation unit 135b is performed using the K-average method, similarly to the clustering process by the representative pixel value calculation unit 131b. In this case, the input data is a plurality of representative luminance values calculated by the representative luminance value calculation unit 133b, and is grouped into clusters using the distances in space of the luminance values.

In step S108bb-2, the general representative luminance value calculation unit 135b calculates a cluster central luminance that is a luminance value representing each of the clusters into which the values are classified. The general representative luminance value calculation unit 135b calculates, as the cluster central luminance, the luminance value of the center of each of the clusters into which the luminance values are grouped (classified) in step S108bb-1.

In step S108bb-3, the storage/read unit 19 stores, in the pixel-value management DB 1001, the image ID for the representative luminance value of each cluster and the cluster central luminance of a corresponding cluster in association with each other. As illustrated in FIG. 28, the cluster central luminance of each cluster is stored and managed in association with the image ID in the general-representative-color management table of the pixel-value management DB 1001.

In step S108bb-4, the storage/read unit 19 stores, as a general representative luminance value, the cluster central luminance of a cluster, in which the greatest number of representative luminance values are included, in the correction-parameter management DB 1003. As illustrated in FIG. 29, the general representative luminance value indicating the luminance characteristics that represent a plurality of pieces of captured-image data 200 is stored and managed in the correction-parameter management table of the correction-parameter management DB 1003. For example, in the case of the processing result indicated by the general representative luminance value management table in FIG. 28, the general representative luminance value is the cluster central luminance of "122.58848" with cluster No. 2.

Accordingly, the general representative luminance value calculation unit 135b calculates a general representative luminance value indicating the luminance characteristics that represent a plurality of pieces of captured-image data 200 based on the representative luminance values of all the pieces of the captured-captured-image data 200 acquired by the image processing unit 12. Note that the method for calculating the general representative luminance value is not limited to the method illustrated in FIG. 31. Alternatively, for example, the general representative luminance value may be obtained from a simple average of a plurality of representative luminance values calculated by the representative luminance value calculation unit 133b.

Returning to FIG. 30, the description of the process of calculating the correction parameter is continued. In step S109bb, the brightness correction parameter calculation unit 134b calculates a brightness correction parameter for correcting the brightness of the captured-image data 200, using the representative luminance value calculated by the representative luminance value calculation unit 133b and the general representative luminance value calculated by the general representative luminance value calculation unit 135b. The process of calculating a brightness correction parameter is described with reference to FIGS. 32, 33A, and 33B.

Figure 25:
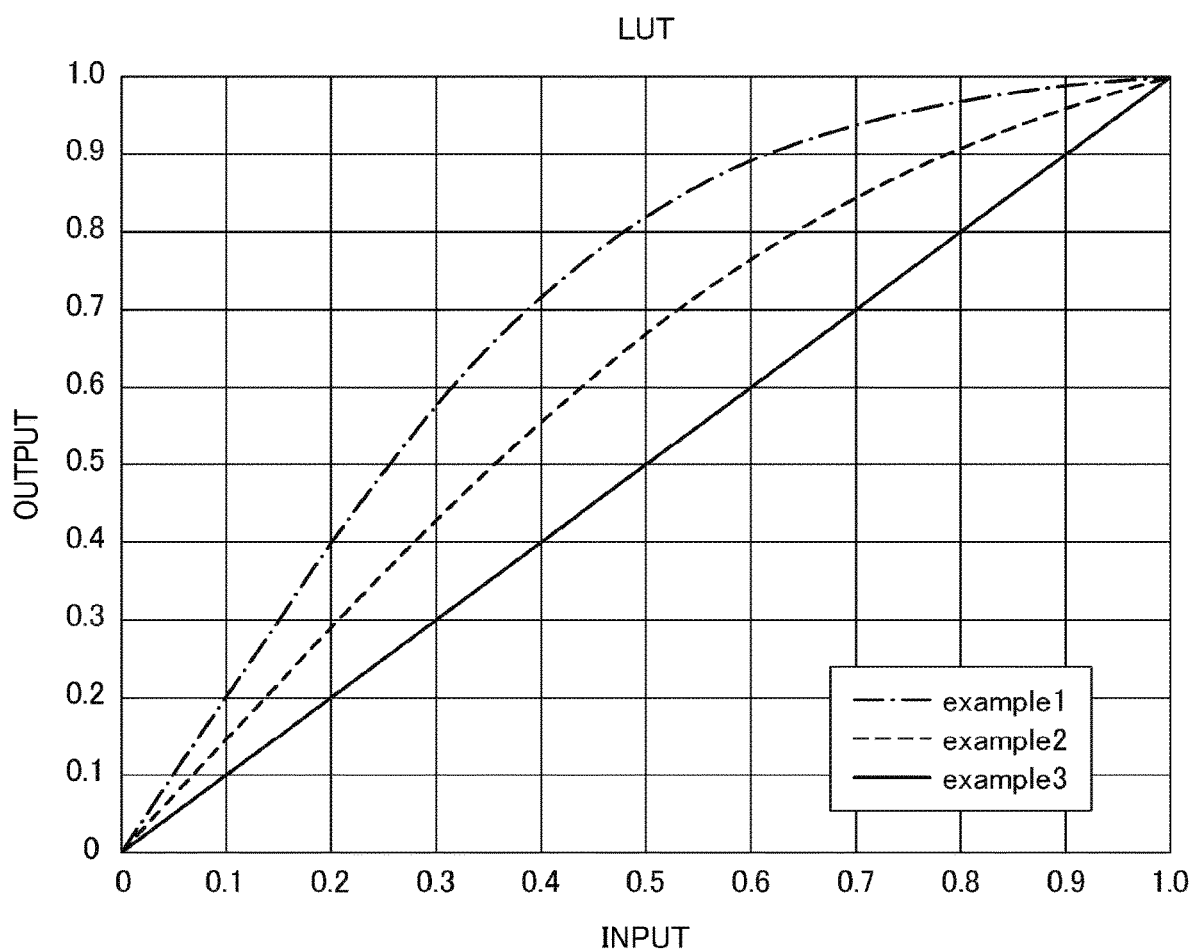
FIG. 25 is a graph of a brightness correction parameter according to the second embodiment.
Figure 26:
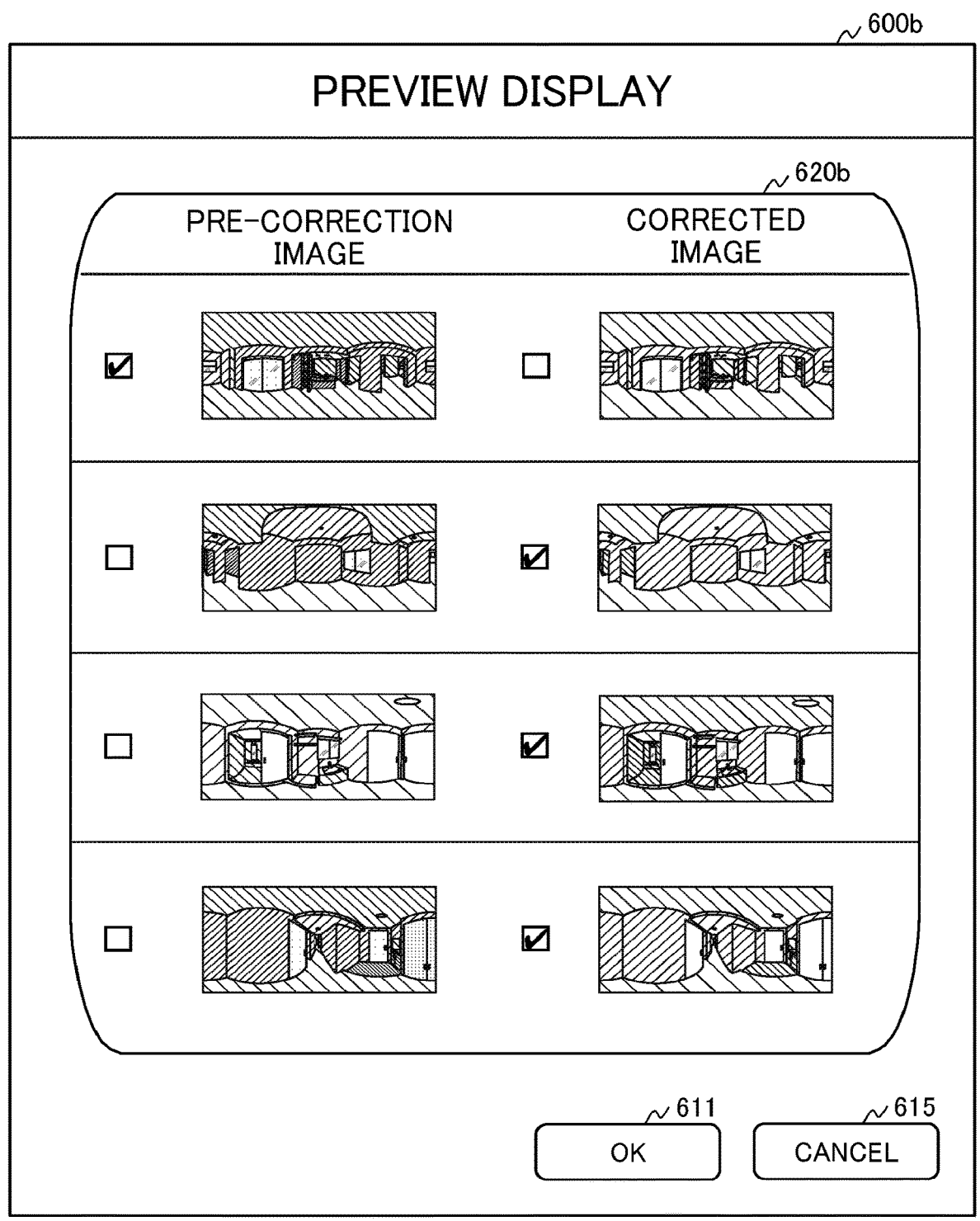
FIG. 26 is an example of a preview screen according to the second embodiment.
Figure 32:
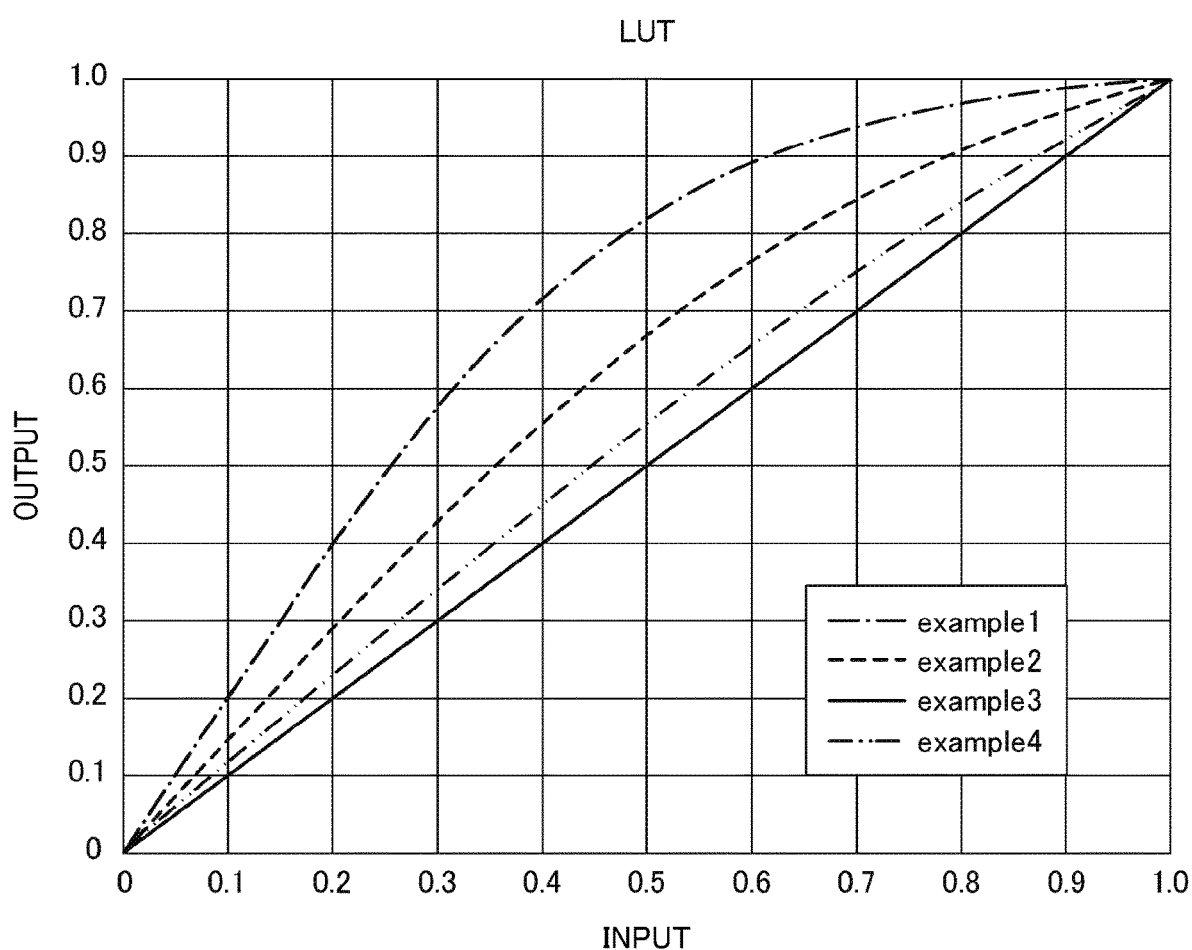
FIG. 32 is a graph of a brightness correction parameter according to the first modification of the second embodiment.
Figure 33A:
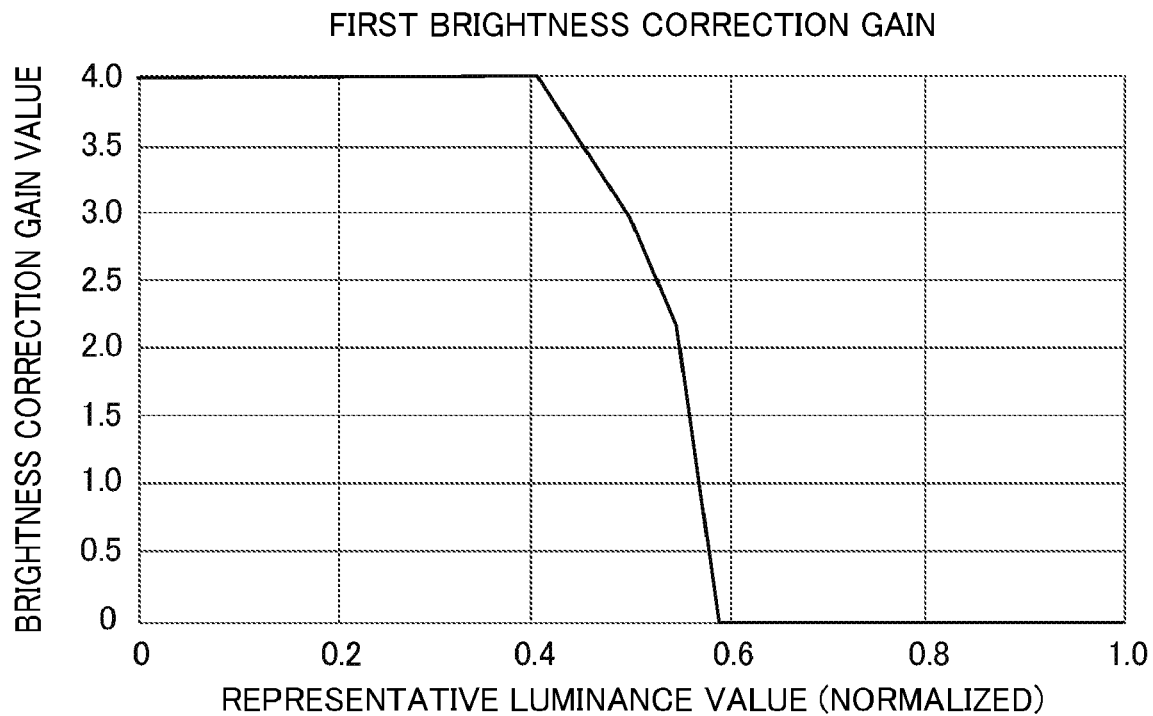
FIGS. 33A and 33B are graphs of the brightness correction gain according to the first modification of the second embodiment.
Figure 33B:
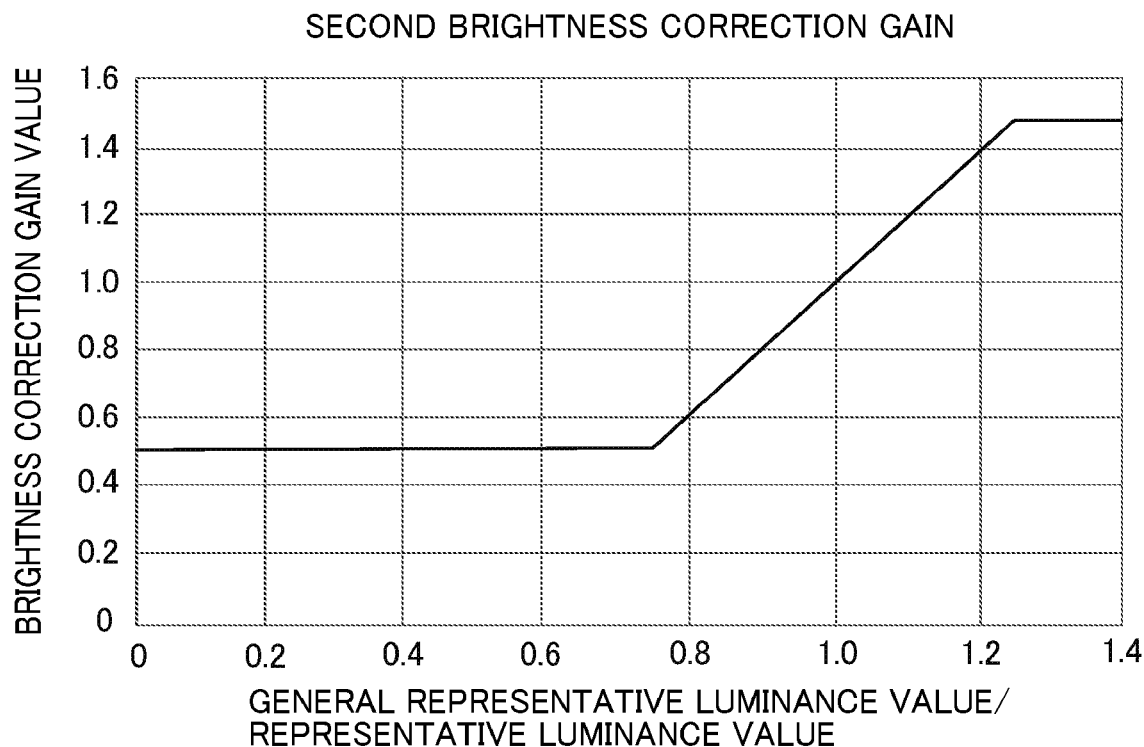

FIG. 25 is a graph of a brightness correction parameter according to the first modification of the second embodiment. FIGS. 33A and 33B are graphs of the brightness correction gain according to the first modification of the second embodiment. FIGS. 33A and 33B indicate the case where the LUT used to change the brightness of a captured image according to the representative luminance value calculated by the representative luminance value calculation unit 133b and the general representative luminance value calculated by the general representative luminance value calculation unit 135b is calculated as a brightness correction parameter. FIG. 32 indicates four types of LUTs as an example of the brightness correction parameter. The examples 1, 2, and 3 in FIG. 32 are the same as the examples in FIG. 25 except for the LUT of the example 4 in FIG. 32.

The brightness correction parameter calculation unit 134b determines a LUT to be used, according to the representative luminance value calculated by the representative luminance value calculation unit 133b and the general representative luminance value calculated by the general representative luminance value calculation unit 135b. For example, when the representative luminance value is less than 100, the brightness correction parameter calculation unit 134b calculates (adopts) the LUT of the example 1 because it is determined that the brightness of the image is low (dark). When the representative luminance value is greater than 150, the brightness correction parameter calculation unit 134b calculates (adopts) the LUT of the example 3 because it is determined that the brightness of the image is high (bright). Further, when the representative luminance value is greater than or equal to 100 and less than or equal to 150, the brightness correction parameter calculation unit 134b calculates (adopts) a LUT whose slope has been changed according to the value (representative luminance value) and the general representative luminance value.

FIGS. 33A and 33B indicate the brightness correction gain that is a parameter used for determining the brightness correction parameter. The brightness correction gain is a parameter for calculating the slope of the LUT, which is a brightness correction parameter, and the slope of the LUT is calculated based on the first brightness correction gain in FIG. 33A and the second brightness correction gain in FIG. 33B. In FIG. 33A, the relation between the range of pixel values and the brightness correction gain value (the first brightness correction gain value) is normalized to 0-1, and the relation between the brightness correction gain value (the second brightness correction gain value) and the value obtained by dividing the general representative luminance value by the representative luminance value is indicated.

The following describes an example of the method of calculating the brightness correction parameter in the case where the representative luminance value is 125 and the general representative luminance value is 100. When the captured image 800 whose brightness is to be corrected is an 8-bit image, the brightness correction parameter calculation unit 134b performs calculation assuming that the first brightness correction gain value is 3.0 based on FIG. 33A, which corresponds to the brightness normalized to 0-1 of "125/255=0.5". Further, the brightness correction parameter calculation unit 134b performs calculation assuming that the second brightness correction gain value is 0.6 based on FIG. 33B, which corresponds to a value of 0.8 as the ratio of the general representative luminance value (100) to the representative luminance value (125). Then, the brightness correction parameter calculation unit 134b multiplies the first brightness correction gain value by the second brightness correction gain value ("3.0×0.8=2.4") to obtain the slope of the LUT.

As described above, the brightness correction parameter calculation unit 134b calculates a brightness correction parameter using both the representative luminance value calculated by the representative luminance value calculation unit 133b and the general representative luminance value calculated by the general representative luminance value calculation unit 135b. That is, as described above in the second embodiment, when only the representative luminance value is used for calculating the brightness correction parameter, the brightness correction parameter calculation unit 134b calculates the LUT of the example 2 as the brightness correction parameter. However, by using the general representative luminance value, the brightness correction parameter calculation unit 134b calculates the LUT of the example 4 as the brightness correction parameter.

Note that the brightness correction parameter calculation unit 134b may select, as the brightness correction parameter, a LUT suitable for the brightness correction gain value, using a plurality of LUTs preliminarily stored in the storage unit 1000. Alternatively, the brightness correction parameter calculation unit 134b may dynamically calculate the LUT having the input/output characteristics of an S-shape suitable for the correction of the brightness of the image, using a sigmoid curved line (sigmoid function). When only the representative brightness values is used for the brightness correction as described in the second embodiment, the brightness correction parameter calculation unit 134b may calculate the LUT having the slope (the first brightness correction gain value) as the brightness correction parameter, using the first brightness correction parameter illustrated in FIG. FIG. 33A.

As a result, the correction unit 14 of the image processing apparatus 10bb corrects the brightness of the plurality of pieces of captured-image data 200 using the brightness correction parameter calculated by the calculation unit 13bb, as indicated in step S15 of FIG. 12. Accordingly, the correction unit 14 of the image processing apparatus 10bb can generate corrected-image data 250 from each piece of the captured-image data 200, such that the brightness of the corrected-image data 250 is close to the brightness that meets the reference brightness (the general representative luminance value) calculated from the plurality of pieces of captured-image data 200. This provides an image correction that enables adjusting of the brightness of each of a plurality of captured images 800 according to the needs of a service provider or a user who desires to improve convenience for the users viewing the images.

Next, an image processing system according to a second modification of the second embodiment is described. An image processing system 1bbb according to the second modification of the second embodiment is a system that selects a representative luminance value to be used for the process of calculating a general representative luminance value (see FIG. 31) in the above-described first modification. For example, when a night view image from a terrace is reflected in an image used for the real estate preview service, a significant difference in brightness occurs between a plurality of captured images 800. When the process of correcting the brightness is performed on such an image using the general representative luminance value as described in the first modification, the brightness between the plurality of captured images 800 is uniformed. However, an image with inappropriate brightness might adversely affect the brightness of another image. In view of such circumstances, the image processing system 1*bbb* according to the second modification of the second embodiment sets predetermined conditions for a representative luminance value to be used for the process of calculating the general representative luminance value, and performs the process using only the luminance value that satisfies the predetermined conditions.

Specifically, the general representative luminance value calculation unit 135*b* of the calculation unit 13*bbb* according to the second modification of the second embodiment determines whether each representative luminance value calculated by the representative luminance value calculation unit 133*b* is within a predetermined luminance range, which a pre-processes of step S108*bb*-1 in FIG. 31. Then, the general representative luminance value calculation unit 135*b* performs the processes following step S108*bb*-1 using the representative luminance value determined to be within the predetermined luminance range. It should be noted that the brightness correction is not performed on the captured image 800 that correspond to the representative luminance value that has been determined to be outside the predetermined luminance range and that has not been used for the process of the general representative luminance value calculation unit 135*b*.

Accordingly, the image processing apparatus 10*bbb* according to the second modification of the second embodiment may use only the luminance value of an image to be corrected, for calculating the general representative luminance value, without using the luminance value of an image with inappropriate brightness, even when the brightness correction is performed using a plurality of captured images 800. This configuration enables a brightness correction that meets the needs of the service provider and user even when the brightness between a plurality of captured images 800 is adjusted.

Next, an image processing system according to the third embodiment is described. The same configurations and functions as those in the first embodiment are denoted by the same reference numerals, and the description thereof is omitted. In the image processing system 1*c* according to the third embodiment, the image processing apparatus 10*c* calculates both the correction parameter as described in the first embodiment and the brightness correction parameter as described in the second embodiment.

The functional configuration of the image processing system according to the third embodiment is described. Since the functions other than the calculation unit 13*c* implemented by the image processing apparatus 10*c* are the same as those of the image processing system 1*a* (see FIG. 7), the description thereof is omitted.

Figure 34:
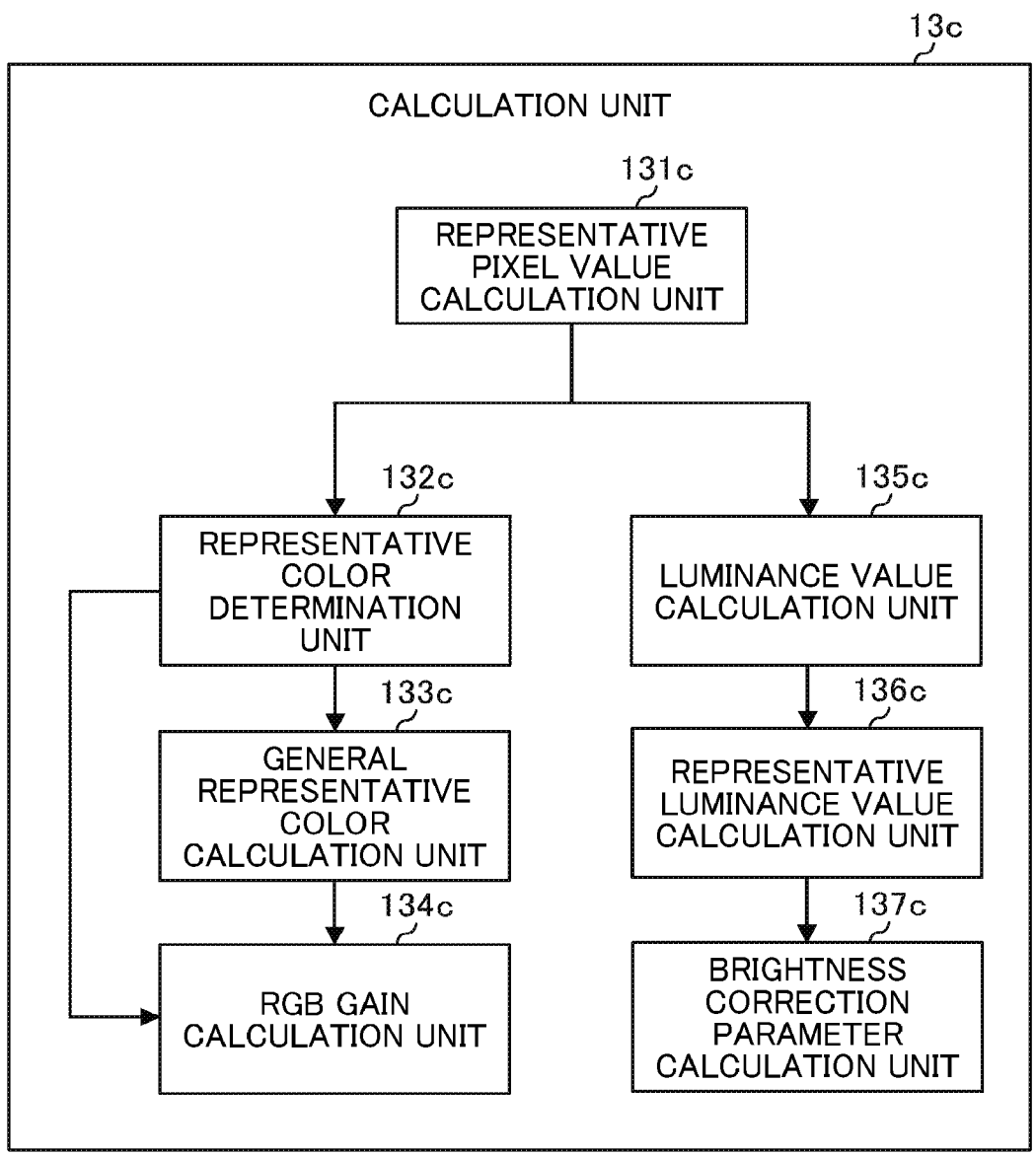
FIG. 34 is a functional block diagram of a calculation unit according to a third embodiment.

FIG. 34 is a block diagram of the functional configuration of the calculation unit according to the third embodiment. The calculation unit 13*c* in FIG. 34 includes a representative pixel value calculation unit 131*c*, a representative color determination unit 132*c*, a general representative color calculation unit 133*c*, an RGB gain calculation unit 134*c*, a luminance value calculation unit 135*c*, a representative luminance value calculation unit 136*c*, and a brightness correction parameter calculation unit 137*c*.

The representative pixel value calculation unit 131*c*, the representative color determination unit 132*c*, the general representative color calculation unit 133*c*, and the RGB gain calculation unit 134*c* has the same functions of those of the representative pixel value calculation unit 131*a*, the representative-color determination unit 132*a*, the general representative color calculation unit 133*a*, and the RGB gain calculation unit 134*a*, respectively. The luminance value calculation unit 135*c*, the representative luminance value calculation unit 136*c*, and the brightness correction parameter calculation unit 137*c* have the same functions as those of the luminance value calculation unit 132*b*, the representative luminance value calculation unit 133*b*, and the brightness correction parameter calculation unit 134*b*. The calculation unit 13*c* calculates either one or both of an RGB gain value using the RGB gain calculation unit 134*c* and a brightness correction parameter using the brightness correction parameter calculation unit 137*c*, based on the setting designated by the user or preliminarily stored. The image processing apparatus 10*c* performs the image correction on the captured image 800 associated with the captured-image data 200, using either one or both of the correction parameter calculated by the RGB gain calculation unit 134*c* and the brightness correction parameter calculated by the brightness correction parameter calculation unit 137*c*.

That is, the image processing system 1*c* according to the third embodiment can calculate both the correction parameter as the RGB gain value and the brightness correction parameter by using the calculation unit 13*c* of the image processing apparatus 10*c*. By calculating two correction parameters, the image processing apparatus 10*c* corrects color tone with the RGB gain value and also corrects the brightness of a captured image 800 with the brightness correction parameter. For the tour display provided by the real estate preview service, the images displayed as described above preferably have a uniform color tone and appropriate brightness. To achieve such a goal, the image processing apparatus 10*c* corrects (adjusts) both the color tone and the brightness so as to display more preferable images on the display terminal 90. Further, as the image processing apparatus 10*c* has RGB gain values mainly used for the color correction and LUTs mainly used for the brightness correction, by combining the RGB gain value and the LUT, an optimum correction process can be performed according to the conditions of the captured image 800. That is, the image processing apparatus 10*c* can perform different types of correction processes such as a process of correcting the color tone and brightness, a process of correcting only the color tone, and a process of correcting only the brightness. Further, the image processing apparatus 10*c* can incorporate the result of correction obtained from the multiplication of the RGB gain value into the calculation of the representative luminance value, by calculating an average of the luminance value calculated by the luminance value calculating unit 135*c* using the result obtained by multiplication of the RGB gain value calculated by the RGB gain calculating unit 134*c* and the representative luminance value calculated by the representative luminance value calculation unit 136*c*.

Next, an image processing system according to a first modification of the third embodiment is described. The image processing system 1*cc* according to the first modification of the third embodiment is capable of calculating both the correction parameter as described in the first embodiment and the brightness correction parameter as described in the first and second modifications of the second embodiment.

The functional configuration of the image processing system according to the first modification of the third embodiment is described below. Since the functions other than the calculation unit 13*cc* implemented by the image processing apparatus 10cc are the same as those of the image processing system 1a (see FIG. 7), the description thereof is omitted.

Figure 35:
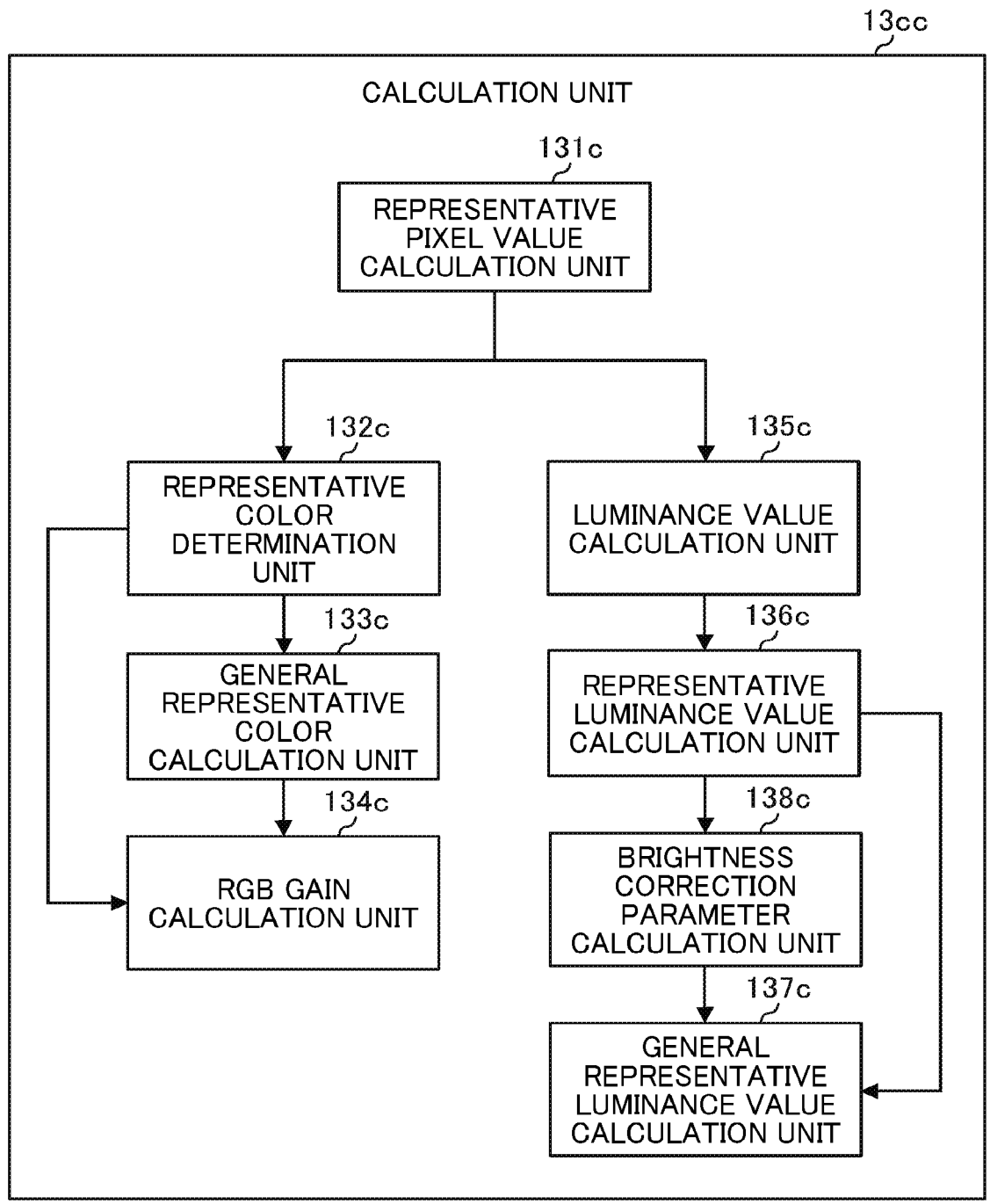
FIG. 35 is a block diagram of the functional configuration of the calculation unit according to a first embodiment of the third embodiment.

FIG. 35 is a block diagram of the functional configuration of the calculation unit according to the first embodiment of the third embodiment. The calculation unit 13cc in FIG. 35 includes a general representative luminance value calculation unit 138c in addition to the calculation unit 13c in FIG. 34. The general representative luminance value calculation unit 138c has the same function as the general representative luminance value calculation unit 135b. Similar to the calculation unit 13c according to the third embodiment, the calculation unit 13cc performs either one or both of the calculation of RGB gain values using the RGB gain calculation unit 134c and the calculation of the brightness correction parameter using the brightness correction parameter calculation unit 137c, based on the setting designated by the user or preliminarily stored. The image processing apparatus 10cc performs an image correction on a captured image 800 associated with the captured-image data 200, using either one or both of the correction parameter calculated by the RGB gain calculation unit 134c and the brightness correction parameter calculated by the brightness correction parameter calculation unit 137c.

Subsequently, the configuration of an image processing system according to another embodiment is described. Note that the same configurations and the same functions as those in the above embodiments are denoted by the same reference numerals, and the description thereof is omitted.

Figure 36:
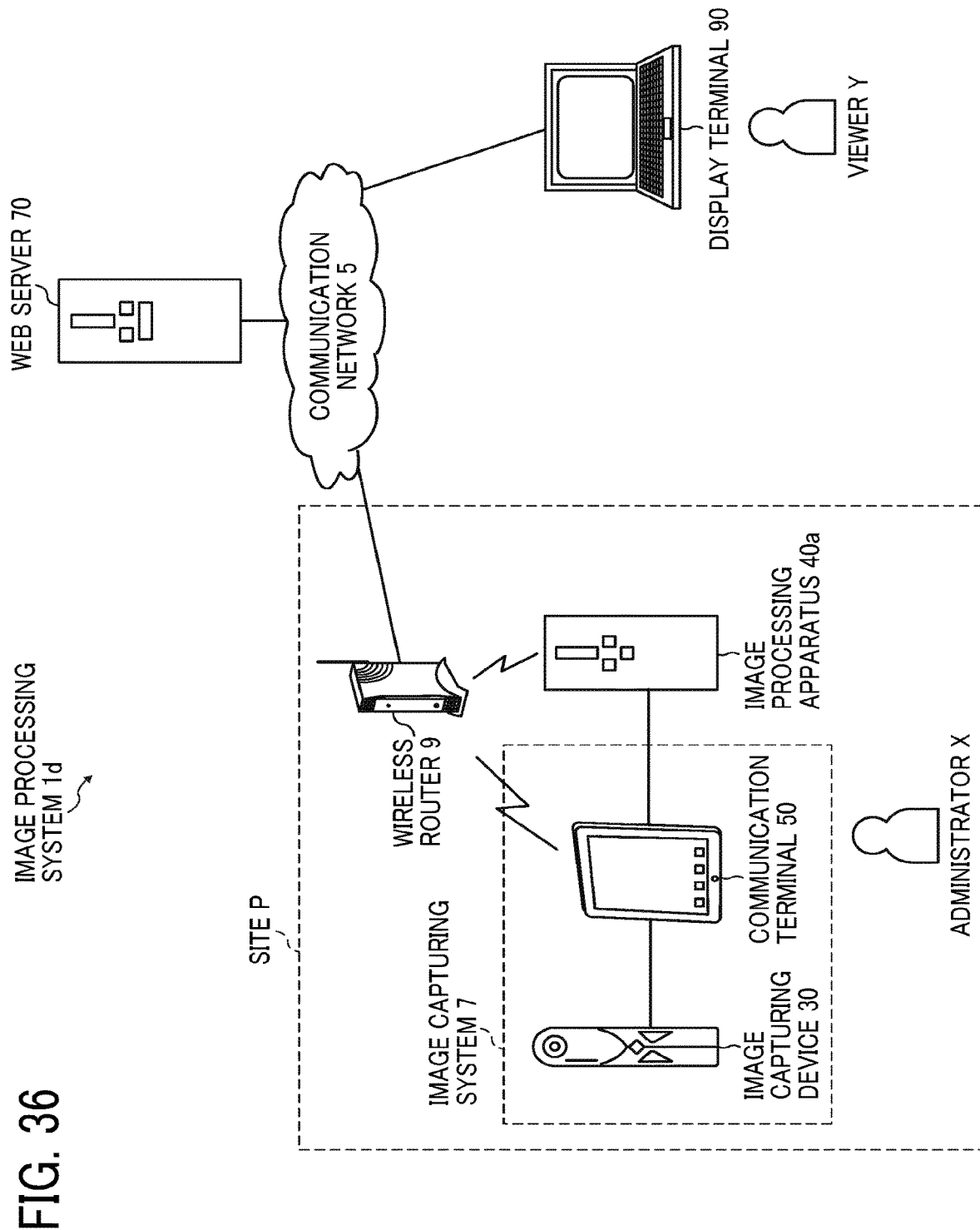
FIG. 36 is an illustration of an example of a system configuration of an image processing system according to another embodiment.
Figure 37:
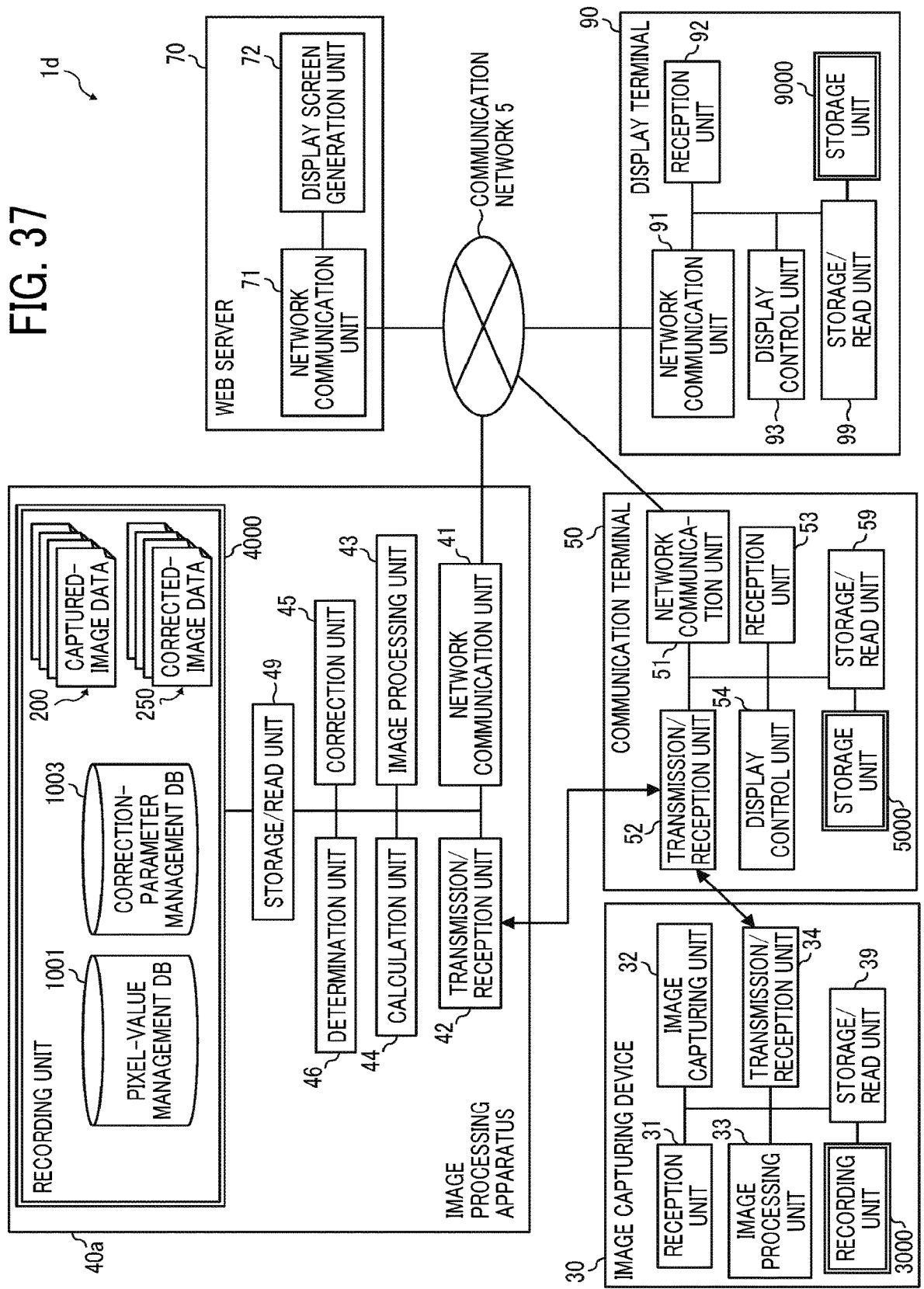
FIG. 37 is a block diagram of the functional configuration of the image processing device according to another embodiment.

In the case of the image processing system 1d as illustrated in FIGS. 36 and 37, the image processing apparatus 40a, which is configured to perform the color correction or the brightness correction on the captured-image data 200, is located within the site P. FIG. 36 is an illustration of an example of a system configuration of an image processing system according to another embodiment. The image processing system 1d in FIG. 36 differs from the image processing system according to the above-described embodiments in that the image processing system 1d in FIG. 36 includes an image processing apparatus 40a and a Web server 70.

The image processing apparatus 40a performs the correction process on the captured-image data 200 to be corrected based on a plurality of pieces of captured-image data 200 transmitted from the communication terminal 50 same as the above-described image processing apparatus 10a, 10b, 10bb, 10bbb, 10c, 10cc. The web server 70 is a web server that provides a predetermined web application via the communication network 5. The Web server 70 provides a Web application for causing the display terminal 90 to display a corrected image that has been corrected by the image processing apparatus 40a. In the following description, the image processing apparatus 40a and the Web server 70 are assumed to have the same hardware configuration as that of the image processing apparatus 10a in FIG. 3.

FIG. 37 is a block diagram of the functional configuration of the image processing device according to another embodiment. The functions implemented by the image processing apparatus 40a includes a network communication unit 41, a transmission/reception unit 42, an image processing unit 43, a calculation unit 44, a correction unit 45, a determination unit 46, a storage/read unit 49, and a storage unit 4000. The network communication unit 41, the image processing unit 43, the correction unit 45, the determination unit 46, the storage/read unit 49, and the storage unit 4000 have the same configuration as those of the network communication unit 11, the image processing unit 12, the correction unit 14, and the determination unit 15 described above, respectively. The calculation unit 44 may have any of the functions of the calculation unit 13a, the calculation unit 13b, the calculation unit 13bb, the calculation unit 13bbb, the calculation unit 13c, and the calculation unit 13cc described above.

The transmission/reception unit 42 communicates data with the communication terminal 50 through the short-range wireless communication technology such as Wi-Fi. The transmission/reception unit 42 is mainly implemented by the network I/F 109, which operates under control of the CPU 101 illustrated in FIG. 3.

The functions implemented by the Web server 70 include a network communication unit 71 and a display screen generation unit 72. The network communication unit 71 transmits and receives various pieces of data (or information) between the image processing apparatus 40a, the communication terminal 50, and the display terminal 90 via the communication network 5. For example, the network communication unit 71 receives the corrected-image data 250 corrected by and transmitted from the image processing apparatus 40a. Further, the network communication unit 71 transmits the corrected-image data 250 transmitted from the image processing apparatus 40a to the display terminal 90 via the communication network 5. The network communication unit 71 is mainly implemented by the network I/F 109 and the CPU 101 illustrated in FIG. 3.

The display screen generation unit 72 generates various display screens to be displayed on the communication terminal 50 or the display terminal 90. The display screen generation unit 72 generates a preview screen for displaying data on the communication terminal 50, for example. The display screen generation unit 72 generates a display screen for displaying corrected-image data on the display terminal 90, for example. The display screen generation unit 72 is implemented by the CPU 101 in FIG. 3.

With such a configuration, the image processing system 1d performs the correction process as described above using the image processing apparatus 40a located at the site P, and also displays corrected image on the display terminal 90 via the Web server 70.

Figure 38:
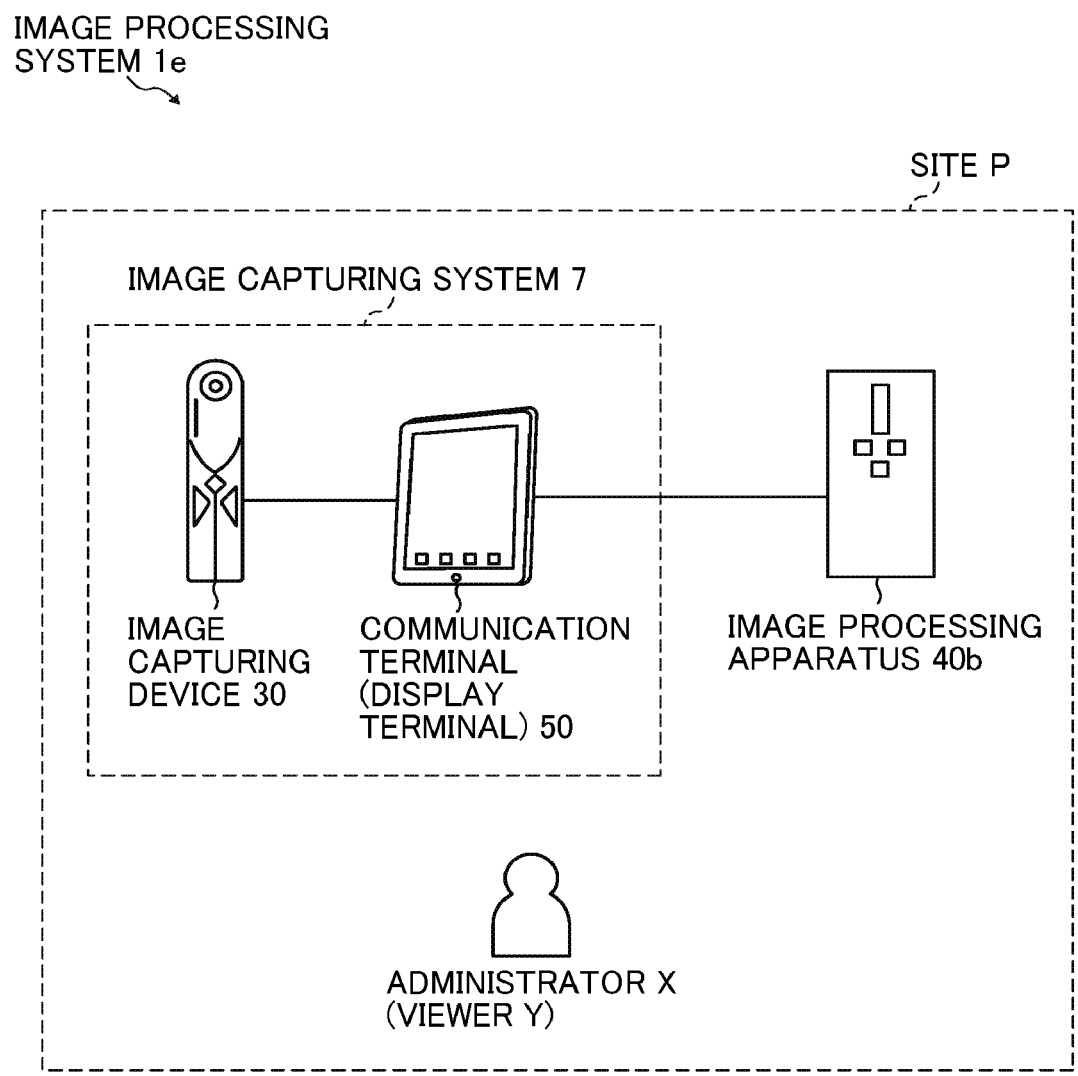
FIG. 38 is a diagram illustrating an example of a system configuration of an image processing system according to another embodiment.

Subsequently, another example of the image processing system according to another embodiment is described with reference to FIGS. 38 and 39. FIG. 38 is a diagram illustrating an example of a system configuration of an image processing system according to another embodiment. In the image processing system 1e illustrated in FIG. 38, the image processing apparatus 40b within the range of the site P that performs the color correction or the brightness correction on the captured-image data 200, and the communication terminal 50 displays a corrected image corrected by the image processing apparatus 40b.

Figure 39:
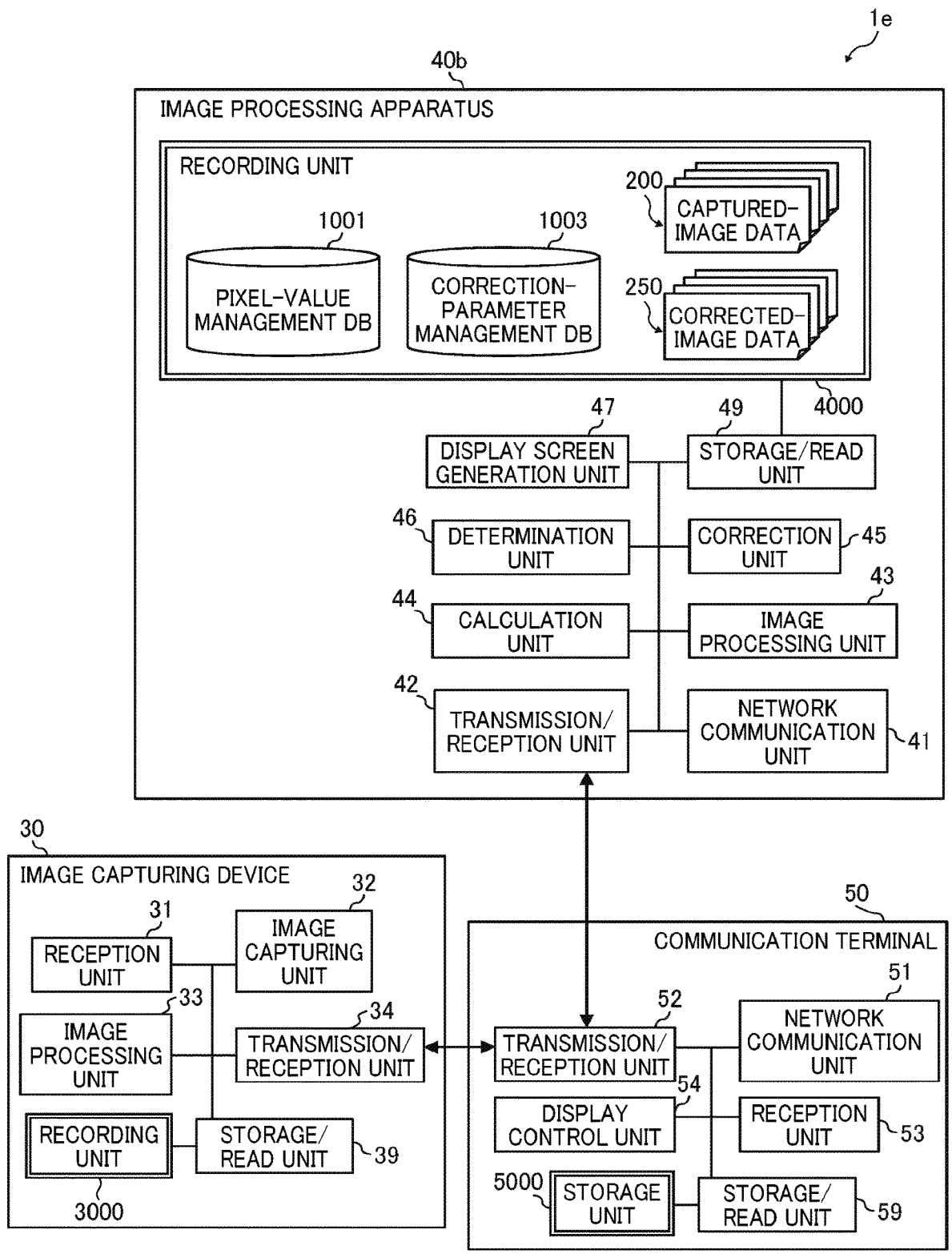
FIG. 39 is a block diagram of the functional configuration of the image processing device according to another embodiment.

FIG. 39 is a block diagram of the functional configuration of the image processing device according to another embodiment. The image processing apparatus 40b in FIG. 39 differs from the image processing apparatus 40a having the same function as that of the image processing apparatus 40b (see FIG. 37) in that the image processing apparatus 40b further includes a display screen generation unit 47. The display screen generation unit 47 generates various display screens displayed on the communication terminal 50. The display screen generation unit 47 generates a preview screen for display on the communication terminal 50, for example. For example, the display screen generation unit 72 generates a display screen for displaying the corrected image data on the communication terminal 50. The display screen generation unit 47 is implemented by the CPU 101 in FIG. 3.

Accordingly, the image processing system 1e enables using of the service provided by the image processing system 1e without using the communication network 5.

In each of the above embodiments, the image processing apparatus (10a, 10b, 10bb, 10bbb, 10c, 10cc, 40a, 40b) corrects an image of captured-image data 200 using a correction parameter or a brightness parameter calculated based on the captured-image data 200 (captured image 800). However, no limitation is intended therein. Alternatively, the image processing apparatus may correct a newly captured-image data 200 using a parameter calculated and stored in the storage unit 1000 or 4000. In this case, for example, when the image processing apparatus corrects captured images 800 each having the same shooting scene, there is no need to calculate a correction parameter for each time of correction, which reduces the processing burden.

As described above, the image processing apparatus (10a, 10c, 10cc, 40a, 40b) according to an embodiment of the present invention performs color correction on the captured-image data 200 to be corrected based on a plurality of pieces of captured-image data 200 (an example of image data). The image processing apparatus determines, for each piece of captured-image data 200, a representative color (an example of a first representative color) indicating a feature of a color that represents a corresponding one set of captured-image data 200. Then, the image processing apparatus calculates a general representative color (an example of a second representative color) indicating a feature of a color that represents the plurality of pieces of captured-image data 200 based on the determined representative color for each piece of the plurality of captured-image data 200.

The image processing apparatus (10a, 10c, 10cc, 40a, 40b) calculates a correction parameter for the color correction to be performed on the pieces of captured-image data 200 to be corrected, using a representative color for a corresponding set of captured-image data 200 and the general representative color, and performs the color correction on the set of captured-image data 200 to be corrected using the calculated correction parameter. With this configuration, the image processing apparatus (10a, 10c, 10cc, 40a, 40b) corrects the plurality of pieces of captured-image data 200 in which different subjects are captured so that the degrees of the brightness and color tone of the plurality of pieces of captured-image data 200 are uniformed. Further, the case where a spherical(360°) panoramic image is an example of a captured image is described above. However, no limitation is intended thereby. The image processing apparatus according to the embodiments of the present disclosure is applicable to general photo images captured by a typical digital camera or a smartphone.

Further, the image processing apparatus according to an embodiment of the present invention calculates, for each cluster, a representative pixel value indicating a feature of a color that represents a corresponding one of clusters into which pixel values are classified through the clustering process. The image processing apparatus further determines, as a representative color (an example of a first example color) indicating a feature of the color that represents a corresponding set of captured-image data 200, the representative pixel value corresponding to a cluster in which the greatest number of pixels are included among the clusters. Accordingly, the image processing apparatus (10a, 10c, 10cc, 40a, 40b) calculates, for each captured image 800 associated with the captured-image data 200, a representative pixel value indicating a feature of a color representing a cluster. The cluster is obtained by performing the clustering process on each pixel value of pixels constituting the captured image 800 associated with the captured-image data 200. Thus, the correction parameter for the color correction on the set of captured-image data 200 is obtained.

Further, the image processing apparatus according to an embodiment of the present invention calculates, as a general representative color (an example of a second representative color) indicating a feature of a color that represents the plurality of pieces of captured-image data 200, a representative pixel value indicating a color that represents a cluster, in which the greatest number of representative colors is included, from the clusters into which the representative colors (an example of the first representative color) indicating the colors that represent the plurality of pieces of the captured-image data 200 (an example of image data), respectively. With this configuration, the image processing apparatus (10a, 10c, 10cc, 40a, 40b) corrects a pixel value of a captured image 800 associated with each piece of the captured-image data 200 assuming that general representative color that is common between the plurality of pieces of captured-image data 200 is a target value of the brightness and color-tone correction. Thus, the process of correcting the brightness and color tone is performed based on the plurality of pieces of captured-image data 200.

Further, the image processing apparatus according to an embodiment of the present invention calculates a correction parameter as an RGB gain value by dividing the general representative color (and example of the second representative color) indicating the feature of a color that represents the plurality of pieces of captured-image data 200 (an example of image data), by the representative color (an example of the first representative color) indicating the color that represents each of the plurality of pieces of captured-image data 200. With this configuration, the image processing apparatus (10a, 10c, 10cc, 40a, 40b) performs the process of correcting the brightness and color tone of the plurality of pieces of captured-image data 200, in which different subjects are captured, using the representative color obtained for each piece of captured-image data 200 and the general representative color common between the plurality of pieces of captured-image data 200, so as to uniform the brightness and color tone between the plurality of pieces of captured-image data 200.

Further, the image processing apparatus according to an embodiment of the present invention determines a representative luminance value indicating the luminance characteristics that represent a piece of captured-image data 200 to be corrected, based on each pixel value of the pixels constituting an image associated with the set of captured-image data 200 to be corrected. Then, the image processing apparatus calculates, based on the determined representative luminance value, a brightness correction parameter for the brightness correction to be performed on the set of captured-image data 200 to be corrected, and performs, based on the correction parameter and the brightness correction parameter for the color correction of the set of captured-image data 200 to be corrected. Accordingly, the image processing apparatus (10c, 40a, and 40b) performs the brightness correction on a plurality of pieces of captured-image data 200 in which different subjects are captured.

The image processing system (1a, 1c, and 1d) according to an embodiment is communicable with the image processing apparatus (10a, 10c, 10cc, and 40a) via the communication network 5, and includes the imaging system 7 that includes the image capturing device 30 for capturing an image of a subject. The image processing apparatus (10a, 10c, 10cc, and 40a) reduces the image size of each piece of the captured-image data 200 (an example of image data), and transmits a plurality of pieces of preview image data obtained by correcting the color of the image data, whose size has been reduced, to the imaging system 7. Then, the imaging system 7 receives a selection of a specific set of preview image data from the plurality of pieces of preview image data transmitted from the image processing apparatus (10a, 10c, 10cc, and 40a), and transmits the specific set of preview image data according to the received selection, to the image processing apparatus (10a, 10c, 10cc, and 40a). Then, the image processing apparatus (10a, 10c, 10cc, and 40a) perform the color correction on each piece of captured-image data 200 using the correction parameter corresponding to the specific preview image data transmitted from the imaging system 7. As a result, the image processing system (1a, 1c, 1d) enables the user (for example, the administrator X in FIG. 1) using the imaging system 7 to check the preview screen 600a, so that the user can select an image to be provided to another user (the viewer Y in FIG. 1) from the images having different degrees of brightness and color tone.

Further, the image processing system (1a, 1c, 1d) according to an embodiment of the present invention includes a display terminal 90 communicable with the image processing apparatus (10a, 10c, 10cc, 40a) via the communication network 5. The image processing apparatus (10a, 10c, 10cc, 40a) transmits a plurality of pieces of corrected-image data 250, whose color has been corrected, to the display terminal 90. Then, the display terminal 90 causes the display 908 (an example of a display unit) to display the plurality of pieces of corrected-image data 250 transmitted from the image processing apparatus (10a, 10c, 10cc, 40a). As a result, the image processing system (1a, 1c, and 1d) causes the display terminal 90 to display a plurality of corrected images whose brightness and color tone have been corrected by the image processing apparatus (10a, 10c, 10cc, 40a) to be uniformed between the plurality of corrected images.

An image processing method according to an embodiment of the present invention is performed by the image processing apparatus (10a, 10c, 10cc, 40a, 40b) that performs color correction on a piece of captured-image data 200 to be corrected based on a plurality of pieces of captured-image data 200 (an example of image data). The image processing method includes: determining, for each piece of captured-image data 200, a representative color (an example of a first representative color) indicating a feature of a color that represents a corresponding one of the plurality of pieces of captured-image data 200; calculating a general representative color (a second representative color) indicating a feature of a color that represents the plurality of pieces of captured-image data 200 based on the determined representative color for each piece of the plurality of captured-image data 200; calculating a correction parameter for the color correction of a piece of captured-captured-image data 200 to be corrected by using the representative color corresponding to the set of captured-representative color to be corrected and the general representative color calculated in the calculating the general representative color; and correcting a color of the set of captured-image data 200 to be corrected, using the calculated correction parameter. With this configuration of the image processing method according to an embodiment of the present invention uniform the brightness and color tone between the plurality of pieces of captured-image data 200 in which different subjects are captured.

Further, the image processing apparatus according to an embodiment of the present invention is an image processing apparatus (10b, 10c, 40a, 40b) that performs brightness correction on each piece of captured-image data 200 (an example of image data). The image processing apparatus according to the embodiment of the present invention calculates a representative pixel value for each cluster, the representative pixel value indicating a feature of a color that represents a corresponding one of the clusters into which the pixel values of the pixels constituting the captured image 800 associated with each piece of the captured-image data 200 are classified through the clustering process. Then, the image processing apparatus according to the embodiment determines, based on the calculated representative pixel value, a representative luminance value (an example of the first representative luminance value) indicating the luminance characteristics that represent a corresponding set of captured-image data 200.

Then, the image processing apparatus (10b, 10c, 40a, 40b) calculates, for each piece of captured-image data 200, a brightness correction parameter for the brightness correction to be performed on the brightness of the captured-image data 200 using the calculated representative luminance value. Accordingly, the image processing apparatus (10b, 10c, 40a, 40b) can perform brightness correction on each piece of the captured-image data 200.

The functions of each embodiment can be implemented by a computer executable program described in a legacy programming language such as assembler, C, C++, C #, Java (registered trademark) or an object oriented programming language, etc. Programs for performing the functions of each embodiment can be distributed through telecommunication lines.

The programs for executing the functions of the embodiments may be stored and distributed on equipment readable recording media such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc, an SD card, a magneto-optical (MO) disc, and the like.

Further, all or some of the functional units according to the embodiments of the present disclosure may be implemented, for example, on a programmable device (PD) such as a field programmable gate array (FPGA), or as an application specific integrated circuit (ASIC). To implement such functional units on the programmable device, circuit configuration data (bit stream data) to be downloaded to the programmable device can be distributed using a recording medium that stores data written in, for example, hardware description language (HDL), Very High Speed Integrated Circuit Hardware Description Language (VHDL), or Verilog HDL.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

What is claimed is:

1. An image processing apparatus comprising circuitry configured to:

classify pixels of image data into clusters;
calculate, for each of the clusters, a representative pixel value indicating a feature of a color representative of the cluster;
determine a first representative luminance value indicating luminance characteristics representative of the image data based on the representative pixel value of each of the clusters; and
calculate a correction parameter for brightness correction of the image data using the determined first representative luminance value; and
perform the brightness correction on the image data using the calculated brightness correction parameter.

2. The image processing apparatus according to claim 1, wherein the circuitry is further configured to calculate the brightness correction parameter using a look up table (LUT) that corresponds to the determined first representative brightness value.

3. The image processing apparatus according to claim 1, wherein
the circuitry is further configured to:
determine the first representative luminance value for each of the plurality of pieces of image data;
calculate a second representative luminance value indicating luminance characteristics representative of the plurality of pieces of image data based on the determined first representative luminance value for each of the plurality of pieces of image data;
calculate the brightness correction parameter for the brightness correction of a piece of image data to be corrected, using the first representative luminance value and the calculated second representative luminance value for the piece of image data to be corrected; and
perform the brightness correction on the piece of image data to be corrected using the calculated brightness correction parameter.

4. The image processing apparatus according to claim 3, wherein the circuitry is further configured to:
determine whether the first representative luminance value of each of the plurality of pieces of image data is within a predetermined luminance range; and
calculate the second representative luminous value using the first representative luminance value determined to be within the predetermined luminance.

5. The image processing apparatus according to claim 2, wherein the circuitry is further configured to:
select a cluster including the greatest number of first representative luminance values from the clusters obtained by the clustering process; and
calculate, as the second representative luminance value, a representative luminance value representative of the selected cluster.

6. The image processing apparatus according to claim 3, wherein the circuitry is further configured to:
determine whether the first representative luminance value of each of the plurality of pieces of image data is within a predetermined luminance range;
calculate the brightness correction parameter using the first representative luminance value determined to be within the predetermined luminance range and the second representative luminance value calculated using the first representative luminance value determined to be within the predetermined luminance range when determining the first representative luminance value for the piece of image data to be corrected is within the predetermined luminance range; and
calculate the brightness correction parameter using the first representative luminance value determined to be outside the predetermined luminance range when determining the first representative luminance value for the piece of image data to be corrected is outside the predetermined luminance range.

7. The image processing apparatus according to claim 1, wherein the circuitry is further configured to:
determine, for each of the plurality of pieces of image data, a first representative color indicating a feature of a color representative of a corresponding set of image data, based on each pixel value of pixels constituting an image associated with the corresponding set of image data;
calculate a second representative color indicating a feature of a color representative of the plurality of pieces of image data based on the determined first representative color of each of the plurality of pieces of image data;
calculate a correction parameter for color correction of a piece of image data to be corrected, using the first representative color and the second representative color for the piece of image data to be corrected; and
perform the brightness correction and the color correction on the piece of image data to be corrected, using the brightness correction parameter and the correction parameter.

* * * * *